(12) United States Patent
Kim et al.

(10) Patent No.: US 10,244,041 B2
(45) Date of Patent: Mar. 26, 2019

(54) SYSTEM AND METHOD OF PROVIDING RECOMMENDATION CONTENT

(71) Applicant: SAMSUNG ELECTRONICS CO., LTD., Suwon-si, Gyeonggi-do (KR)

(72) Inventors: Jae-hong Kim, Yongin-si (KR); Dae-hyun Ban, Seoul (KR); Eun-ho Heo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 221 days.

(21) Appl. No.: 14/811,232

(22) Filed: Jul. 28, 2015

(65) Prior Publication Data

US 2016/0036897 A1 Feb. 4, 2016

(30) Foreign Application Priority Data

Jul. 31, 2014 (KR) .......................... 10-2014-0098631
Jun. 4, 2015 (KR) .......................... 10-2015-0079197

(51) Int. Cl.
*H04L 29/08* (2006.01)
*G06F 3/0482* (2013.01)
(Continued)

(52) U.S. Cl.
CPC ............ *H04L 67/10* (2013.01); *G06F 3/0482* (2013.01); *G06F 17/30053* (2013.01);
(Continued)

(58) Field of Classification Search
CPC ............ G06F 3/0482; G06F 17/30053; G06F 17/30174; G06F 17/30194;
(Continued)

(56) References Cited

U.S. PATENT DOCUMENTS 8,666,961 B1    3/2014  Qureshi et al.
9,990,365 B1 *  6/2018  Kilpatrick .......... G06F 17/30126
(Continued)

FOREIGN PATENT DOCUMENTS

KR  10-2014-0085626 A    7/2014
WO  2004-064296          7/2004
WO  2014-056370          4/2014

OTHER PUBLICATIONS

Extended Search Report dated Dec. 22, 2015 in counterpart European Patent Application No. 15178978.1.
(Continued)

*Primary Examiner* — Chris Parry
*Assistant Examiner* — Weiwei Y Stiltner
(74) *Attorney, Agent, or Firm* — Nixon & Vanderhye P.C.

(57) ABSTRACT

A system and method for providing recommendation content is disclosed. A cloud storage server for recommending content includes a storage unit for providing a folder that stores content of a user in the cloud storage server; a communication unit for providing a device of the user with information regarding the content stored in the folder of the user; and a control unit for determining recommendation content that is to be recommended to the user among contents in the cloud storage server based on the content of the user stored in the folder, storing reference information for accessing the determined recommendation content in the folder of the user included in the cloud storage server, and controlling the communication unit to provide the device of the user with the reference information of the recommendation content such that the device of the user accesses the recommendation content.

15 Claims, 41 Drawing Sheets

(51) Int. Cl.

| | |
|---|---|
| *G06F 17/30* | (2006.01) |
| *H04L 12/58* | (2006.01) |
| *H04L 29/06* | (2006.01) |
| *H04L 12/18* | (2006.01) |
| *H04W 56/00* | (2009.01) |
| *G06Q 30/02* | (2012.01) |
| *H04N 21/258* | (2011.01) |
| *H04N 21/274* | (2011.01) |
| *H04N 21/482* | (2011.01) |

(52) U.S. Cl.
 CPC .. *G06F 17/30174* (2013.01); *G06F 17/30194* (2013.01); *G06F 17/30867* (2013.01); *G06Q 30/02* (2013.01); *H04L 12/1822* (2013.01); *H04L 51/32* (2013.01); *H04L 65/4084* (2013.01); *H04L 65/60* (2013.01); *H04L 67/04* (2013.01); *H04L 67/06* (2013.01); *H04L 67/1095* (2013.01); *H04L 67/22* (2013.01); *H04L 67/26* (2013.01); *H04L 67/42* (2013.01); *H04N 21/25891* (2013.01); *H04N 21/274* (2013.01); *H04N 21/4826* (2013.01); *H04W 56/001* (2013.01)

(58) Field of Classification Search
 CPC ............ G06F 17/30867; H04W 84/12; H04W 56/001; H04L 67/10; H04L 67/42; H04L 12/1822; H04L 65/60; H04L 51/32; H04L 65/4084; H04L 67/26; H04L 67/04; H04L 67/06; H04L 67/1095; H04L 67/22; G06Q 30/02; H04N 21/4826; H04N 21/25891; H04N 21/274
 USPC .................................................. 709/204, 219
 See application file for complete search history.

(56) References Cited

U.S. PATENT DOCUMENTS

| | | | |
|---|---|---|---|
| 2003/0233241 | A1 | 12/2003 | Marsh |
| 2008/0301173 | A1* | 12/2008 | Ryu .................. G06F 17/30056 |
| 2012/0215868 | A1 | 8/2012 | Oliver et al. |
| 2013/0097101 | A1* | 4/2013 | Ortiz ....................... G06Q 30/02 706/11 |
| 2013/0178241 | A1 | 7/2013 | Duggirala et al. |
| 2013/0218961 | A1 | 8/2013 | Ho |
| 2013/0268396 | A1 | 10/2013 | Agevik et al. |
| 2014/0136600 | A1 | 5/2014 | Kao |
| 2015/0007264 | A1* | 1/2015 | Maldaner ............ H04L 67/1097 726/3 |
| 2015/0105145 | A1* | 4/2015 | Scheer .................. A63F 13/335 463/29 |
| 2015/0120763 | A1* | 4/2015 | Grue ................. G06F 17/30386 707/754 |
| 2015/0149594 | A1* | 5/2015 | Lu ........................... H04L 67/10 709/219 |
| 2015/0169705 | A1* | 6/2015 | Korbecki .......... G06F 17/30554 707/736 |
| 2015/0213136 | A1 | 7/2015 | Tan et al. |
| 2015/0334144 | A1* | 11/2015 | Kauffmann ........ H04N 21/6405 709/219 |
| 2016/0021089 | A1* | 1/2016 | Adams ................. H04L 63/083 726/9 |

OTHER PUBLICATIONS

PCT International Search Report for PCT/KR2015/007840 dated Sep. 25, 2015.
European Office Action dated Apr. 4, 2018 for EP Application No. 15178978.1.
"Symbolic link—Wikipedia, the free encyclopedia", Jul. 22, 2014; pp. 1-9; XP055463200.

* cited by examiner

FIG. 23

| USER220 | CONTENT PROVIDING SERVER222 | USER ID224 | PW226 |
|---|---|---|---|
| USER A | Melon | aaaaa | asdfd |
|  | Spotify | bbbbb | csdfg |
| USER B | Naver Music | ccccc | cfsgxb |
|  | Melon | ddddd | hfhjfc |
| USER C | Spotify | eeeee | dfsxhc |

FIG. 26A
FIG. 26B
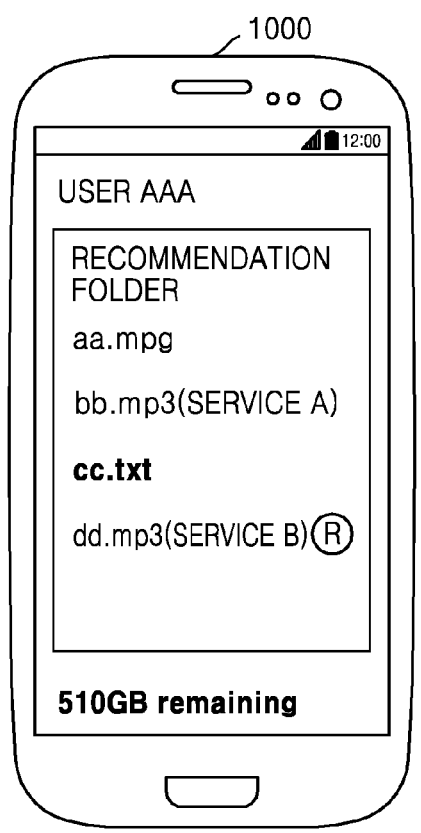
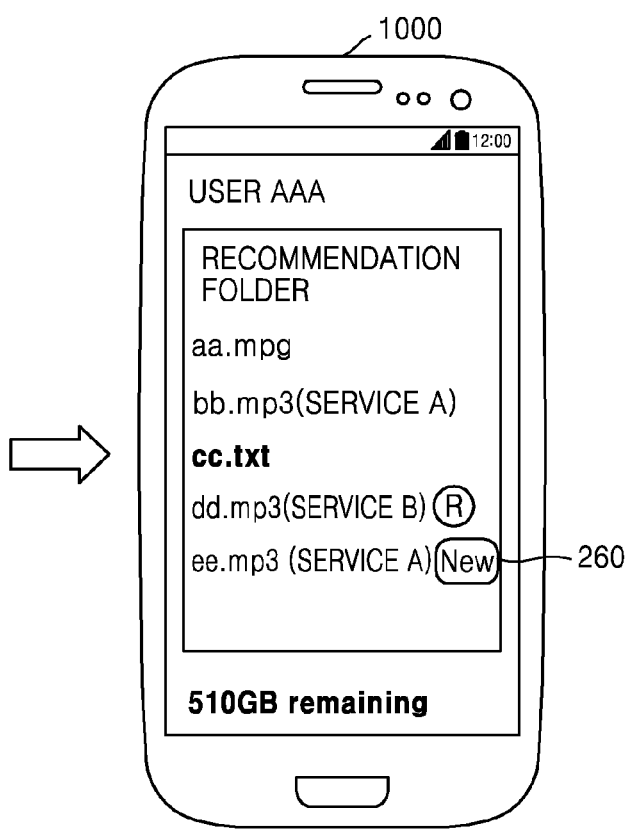

FIG. 28A
FIG. 28B
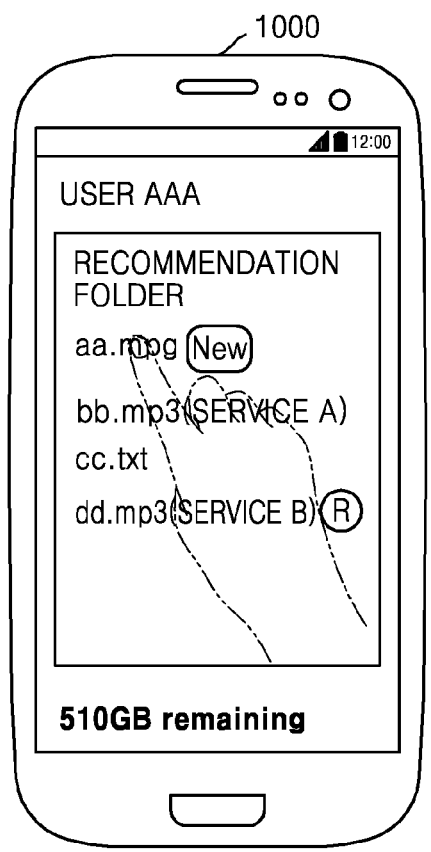
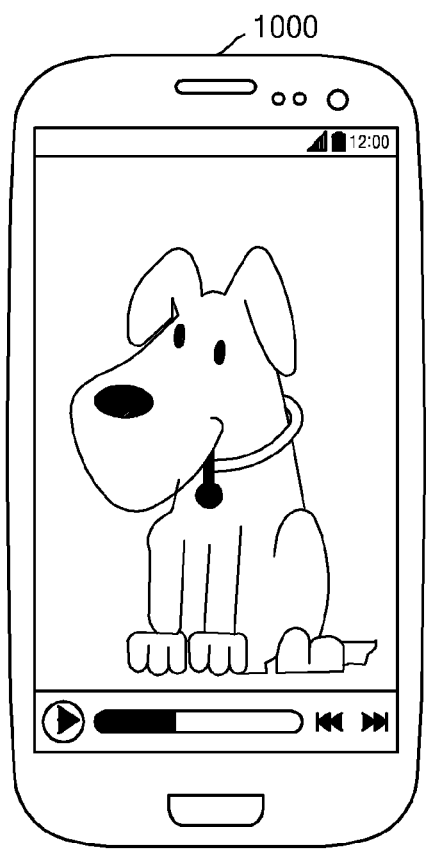

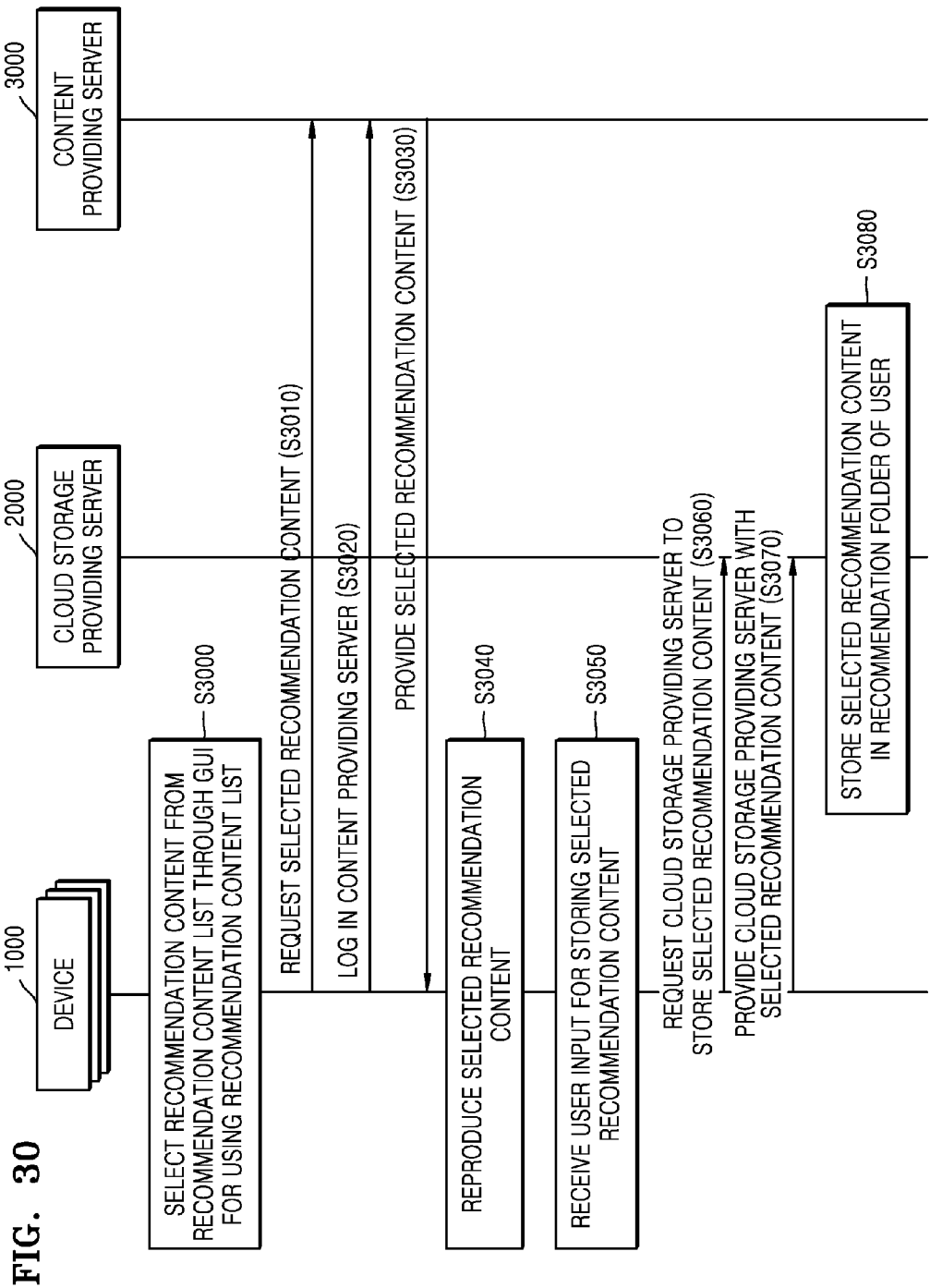

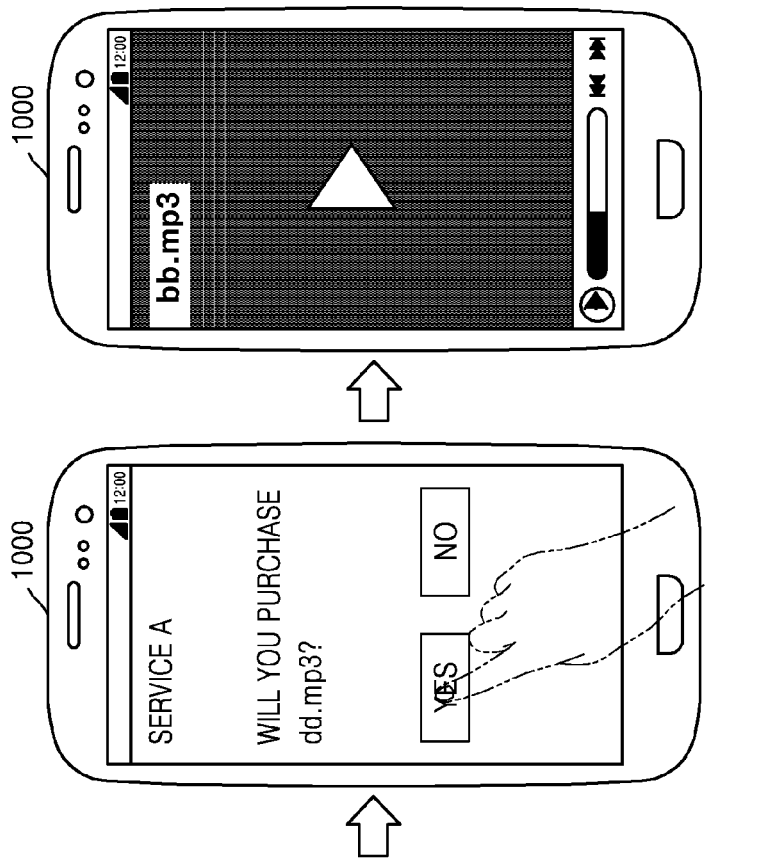

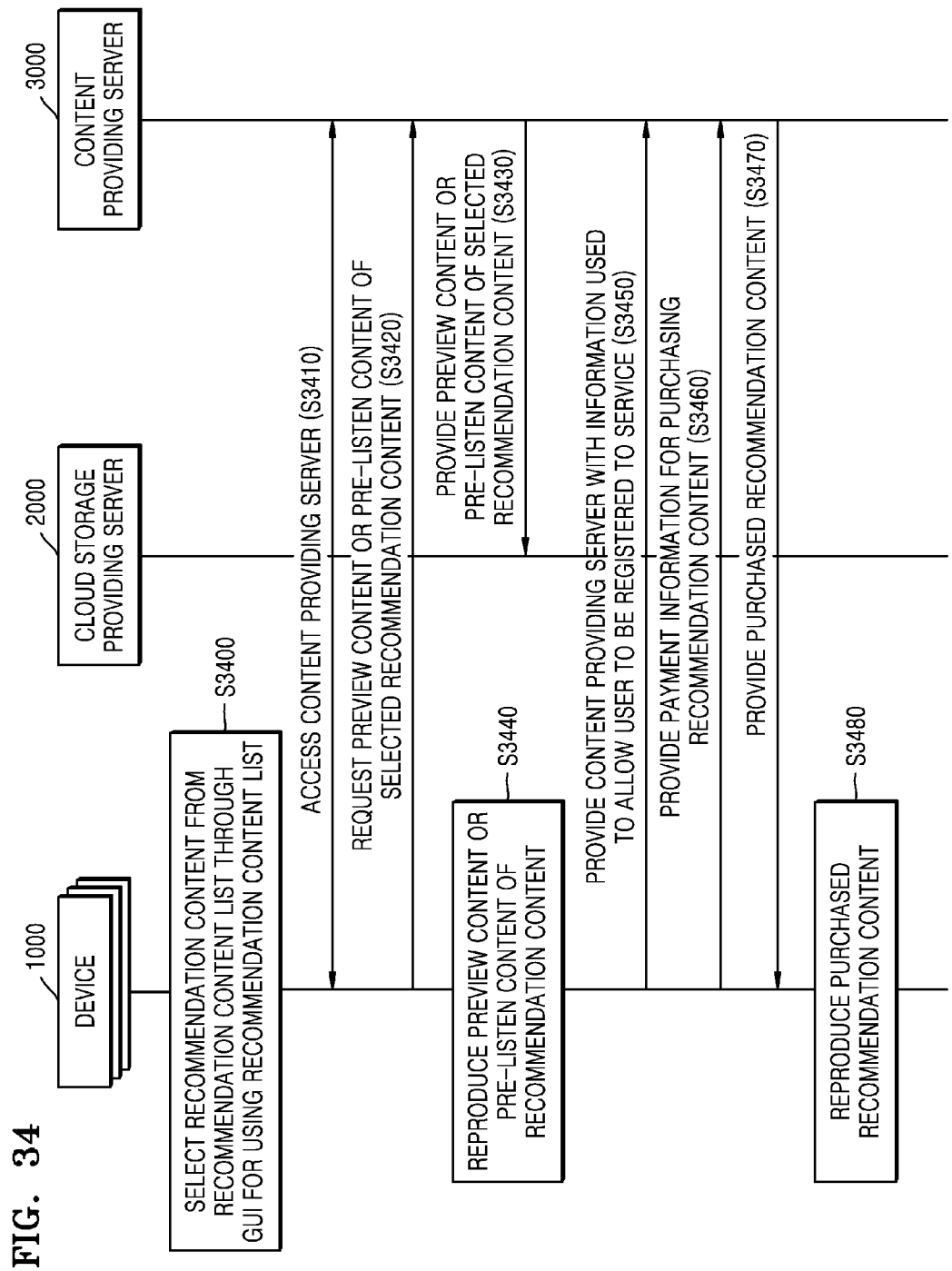

SYSTEM AND METHOD OF PROVIDING RECOMMENDATION CONTENT

CROSS REFERENCE TO RELATED APPLICATIONS

This application is based on and claims priority under 35 U.S.C. § 119 to Korean Patent Application Nos. 10-2014-0098631, filed on Jul. 31, 2014, and 10-2015-0079197, filed on Jun. 4, 2015 in the Korean Intellectual Property Office, the disclosures of which are incorporated by reference herein in their entireties.

BACKGROUND

1. Field

One or more example embodiments relate to a system and method for providing recommendation content, and more particularly to, a system and method for providing recommendation content capable of storing reference information of the recommendation content in cloud storage of a user.

2. Description of Related Art

Due to developments in network and multimedia technologies, users may store and use various types of contents in users' cloud storages over a network. However, types and amount of contents provided through various services are massive, and thus contents unnecessary for users are difficult to manage and access. In addition, users have difficulty in effectively being recommended and using desired contents. Accordingly, there is a demand for a technique that allows users to effectively provide recommendation contents to users' cloud storage and effectively use the recommendation contents.

SUMMARY

One or more example embodiments include a system and method for providing recommendation content capable of storing reference information of the recommendation content in cloud storage of a user.

One or more example embodiments include a system and method for providing recommendation content capable of storing link information of the recommendation content in cloud storage of a user based on user membership information for a service of a content providing server.

Additional aspects will be set forth in part in the description which follows and, in part, will be apparent from the description.

According to one or more example embodiments, a cloud storage server for recommending content includes storage including a folder that stores content of a user in the cloud storage server; a communication circuit for providing a device of the user with information regarding the content stored in the folder of the user; and a controller configured to determine recommendation content that is to be recommended to the user among contents in the cloud storage server based on the content of the user stored in the folder, to store reference information for accessing the determined recommendation content in the folder of the user included in the cloud storage server, and controlling the communication unit to provide the device of the user with the reference information of the recommendation content such that the device of the user accesses the recommendation content.

According to one or more example embodiments, a content recommending method performed by a cloud storage server includes determining recommendation content that is to be recommended to a user among contents in the cloud storage server based on the content stored in a folder of the cloud storage server; storing reference information for accessing the determined recommendation content in the folder of the user included in the cloud storage server; and providing a device of the user with the reference information of the recommendation content such that the device of the user accesses the recommendation content.

According to one or more example embodiments, there is provided a non-transitory computer-readable recording medium having recorded thereon a program, which, when executed by a computer, performs the content recommending method, by using a computer.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein:

FIGS. 22 and 23 illustrate examples of a membership information table of a user with respect to a service of a content providing server, according to some exemplary embodiments;

FIGS. 26A and 26B illustrate examples of updating a recommendation content list, according to various example embodiments;

FIGS. 28A and 28B illustrate examples in which a device reproduces recommendation content in response to a user input for selecting the recommendation content, according to various example embodiments;

FIG. 30 is a flowchart of a method in which a device receives recommendation content from a content providing server and stores the recommendation content in cloud storage, according to various example embodiments;

FIGS. 32A through 32D illustrate examples in which a device receives and reproduces recommendation content from a content providing server that a user is registered to, according to some exemplary embodiments;

FIG. 34 is a flowchart of a method in which a device receives preview content or pre-listen content of recommendation content from a content providing server and purchases the recommendation content, according to various example embodiments;

DETAILED DESCRIPTION

Figure 1:
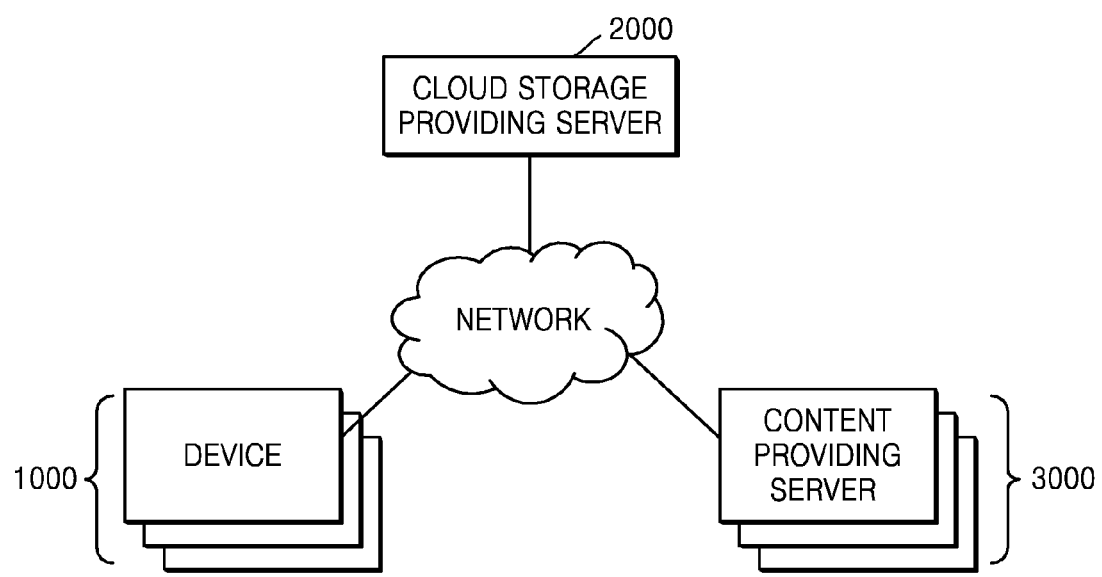
FIG. 1 is an abstract view of a cloud storage providing system, according to various example embodiments.

Hereinafter, one or more example embodiments will be described with reference to the accompanying drawings. However, the one or more example embodiments may be embodied in many different forms and should not be construed as being limited to the one or more exemplary embodiments set forth herein; rather, these example embodiments are provided, and will convey the concept of the one or more example embodiments to those of ordinary skill in the art. In the following description, well-known functions or constructions will not be described in detail so as not to obscure the one or more example embodiments with unnecessary detail. Also, throughout the specification, like reference numerals in the drawings denote like elements.

Throughout the specification, it will also be understood that when an element is referred to as being "connected to"

another element, it can be directly connected to the other element, or electrically connected to the other element while intervening elements may also be present.

Throughout the specification, the term "cloud storage providing server" may, for example, be a server providing a service that allows a user to use a specific storage space over a network and may include storage space and cloud storage that is to be provided to a user subscribing the cloud storage providing server over the network.

Throughout the specification, the term "content providing server" may, for example, include a server providing a service that allows the user to reproduce or execute content through a device by providing the content to a user's device. The content providing server may include, for example, a music content providing server, a moving image content providing server, and a broadcasting content providing server but is not limited thereto.

The content may, for example, include digital information provided over a wired and/or wireless communication network. The content may, for example, include, moving image content (for example, a TV program image, video on demand (VOD), user-created contents (UCC), music video, Youtube image, etc.), still image content (for example, a photo, a picture, etc.), text content (for example, e-book (poem and novel), letter, and a work file), music content (for example, music, instrumental music, radio broadcast, etc.), a web page, application execution information, etc. but is not limited thereto.

Throughout the specification, the term "recommendation content" may, for example, including content recommended for the user among contents stored in at least one cloud storage provided by the cloud storage providing server but is not limited thereto. The recommendation content may, for example, include content recommended for the user among contents provided by the content providing server that the user of the device is registered to. The recommendation content may be content recommended for the user among contents provided by the content providing server that the user of the device is not registered to.

Reference information of the recommendation content stored in the cloud storage may, for example, include information indicating a path for approaching the recommendation content stored in the cloud storage server. The reference information may indicate, for example, the path for approaching the recommendation content in a file system of the cloud storage server.

Link information of the recommendation content provided by the content providing server may, for example, include information indicating an address for accessing the content providing server and downloading or streaming the recommendation content.

Throughout the specification, the expression "to push the reference information and/or link information of the recommendation content to a previously set folder" may, for example, include storing the reference information and/or link information of the recommendation content in the previously set folder of the user without a request from the user. For example, if the user of the cloud storage is set to receive the recommendation content, although there is no request from the user later, the cloud storage providing server may automatically store and update the reference information and/or link information of the recommendation content that is to be recommended for the user in the cloud storage of the user.

Additional information of the recommendation content may include, for example, a genre of the recommendation content, a writer, a generation date, and abstract information including characters of the recommendation content, capacity of the recommendation content, etc. The additional information of the recommendation content may include, for example, information indicating whether the user is authorized to use the recommendation content, an identification value of the content providing server providing the recommendation content, and information regarding a use fee of the recommendation content, etc. However, the example embodiments are not limited thereto. As used herein, the term "and/or" includes any and all combinations of one or more of the associated listed items. Expressions such as "at least one of," when preceding a list of elements, modify the entire list of elements and do not modify the individual elements of the list.

Hereinafter, one or more example embodiments will be described more fully with reference to the accompanying drawings.

FIG. 1 is an abstract view of a cloud storage providing system, according to various example embodiments. The cloud storage providing system according to various example embodiments may include at least one device 1000, a cloud storage providing server 2000, and at least one content providing server 3000.

The device 1000 may access the cloud storage providing server 2000 to use cloud storage provided by the cloud storage providing server 2000. The device 1000 may receive a recommendation content list recommended by the cloud storage providing server 2000 and store recommendation content selected from the recommendation content list in the cloud storage of a user of the device 1000. The device 1000 may receive and reproduce the recommendation content from the cloud storage providing server 2000 or the content providing server 3000.

The cloud storage providing server 2000 may provide the user of the device 1000 with cloud storage to allow the user of the device 1000 to store content of the user in the cloud storage and use the stored content, such as, for example, stored content of the user. The cloud storage providing server 2000 may recommend the recommendation content to the user and may provide the device 1000 with a graphic user interface (GUI) for using the recommendation content list. The cloud storage providing server 2000 may provide the device 1000 with the recommendation content selected by the user from the recommendation content list. The recommendation content may, for example, be content stored in at least one cloud storage provided by the cloud storage providing server 2000, content provided by the content providing server 3000 that the user of the device 1000 is registered to, and content provided by the content providing server 3000 that the user of the device 1000 is not registered to.

The cloud storage providing server 2000 may push reference information and/or link information of the recommendation content that is to be recommended to the user to a previously set folder of the cloud storage of the user. To push the reference information and/or the link information of the recommendation content to the previously set folder may, for example, include storing the recommendation content list in the previously set folder without a request from the user. For example, if the user of the cloud storage is set to receive the recommendation content, although there is no request from the user, the cloud storage providing server 2000 may determine the recommendation content that is to be recommended to the user and may automatically store the reference information and/or the link information of the recommendation content in the cloud storage of the user.

Specific recommendation content may be selected from the recommendation content list, and thus the cloud storage providing server 2000 may, for example, store the selected recommendation content in the previously set folder of the user of the cloud storage. Specific recommendation content may be selected from the recommendation content list, and thus the cloud storage providing server 2000 may, for example, stream the selected recommendation content to the device 1000. The recommendation content may, for example, be stored in the cloud storage of the user and simultaneously may be streamed to the device 1000 but is not limited thereto.

The content providing server 3000 may provide at least one of the cloud storage providing server 2000 and the device 1000 with the recommendation content. The content providing server 3000 may receive, from the cloud storage providing server 2000, the recommendation content selected by the device 1000 that is to be provided to the cloud storage providing server 2000 or the device 1000. The content providing server 3000 may receive membership information of the user while receiving a recommendation content providing request. The membership information of the user may include an identification value of the content providing server 3000 that the user is registered to and an ID and a password of the user who is registered to the content providing server 3000. In this case, the cloud storage providing server 2000 may store and manage the membership information of the user who is registered to the content providing server 3000.

The content providing server 3000 may receive, from the device 1000, the recommendation content selected by the device 1000 that is to be provided to the cloud storage providing server 2000 or the device 1000.

The device 1000 may, for example, be, but is not limited to, a smartphone, a tablet personal computer (PC), a PC, a smart television (TV), a mobile phone, a personal digital assistant (PDA), a laptop computer, a media player, a micro-server, a global positioning system (GPS) device, an electronic book terminal, a terminal for digital broadcasting, a navigation device, a kiosk, an MP3 player, a digital camera, other mobile or non-mobile computing device, or the like. The device 1000 may also include, for example, various devices such as an electronic blackboard, a touch table, etc. that may receive a touch input. The device 1000 may also be a watch, glasses, a hair band, or a ring that has a communication function and a data processing function. However, the examples of the device 1000 are not limited thereto, and thus, the device 1000 may include all types of devices capable of using the cloud storage provided by the cloud storage providing server 2000 over a network.

The cloud storage providing server 2000 may be a server providing a service that allows the user to use a specific storage space, and may include a storage space that is to be provided to the user who is registered to the cloud storage providing server 2000.

The content providing server 3000 may, for example, include a server providing a service that allows the user to reproduce or execute content through a device of the user by providing the content to the device. The content providing server 3000 may include, for example, a music content providing server, a moving image content providing server, and a broadcasting service providing server, but is not limited thereto.

The network may, for example, include a Local Area Network (LAN), a Wide Area Network (WAN), a Value Added Network (VAN), a mobile radio communication network, a satellite communication network, or any combination thereof, and may indicate a general-concept data communication network capable of allowing network parties shown in FIG. 1 to perform communication with one another and may include, for example, wired Internet, wireless Internet, a mobile wireless communication network, or the like.

Figure 2:
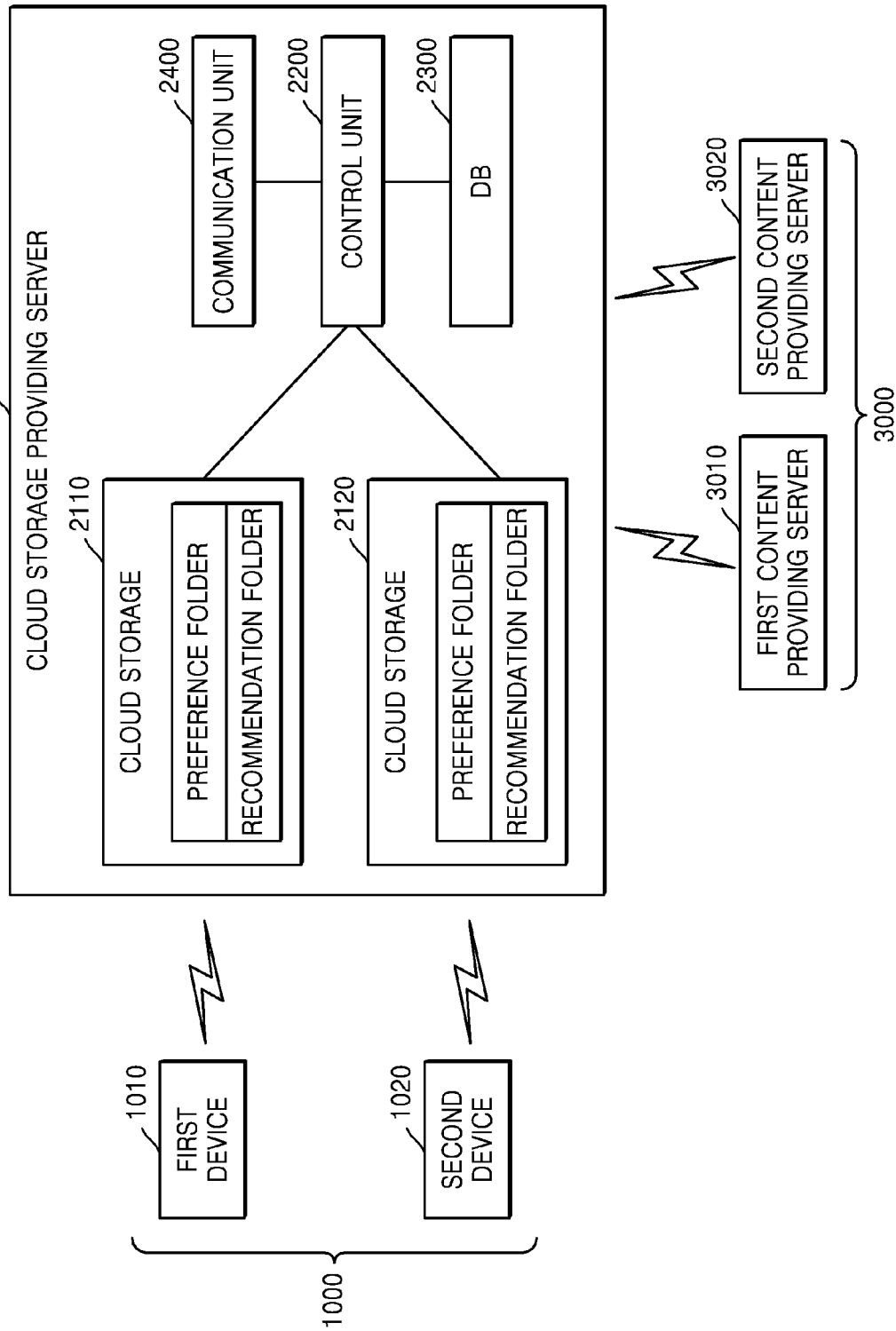
FIG. 2 is a block diagram of an example in which a first device and a second device receive recommendation content from a cloud storage providing server in a cloud storage providing system, according to various example embodiments.

FIG. 2 is a block diagram of an example in which a first device 1010 and a second device 1020 receive recommendation content from the cloud storage providing server 2000 in a cloud storage providing system, according to various example embodiments.

Referring to FIG. 2, the cloud storage providing server 2000 according to some exemplary embodiments may include a cloud storage 2110 of a first user and a cloud storage 2120 of a second user. The first user may be a user of the first device 1010. The second user may be a user of the second device 1020. The cloud storage 2110 of the first user may include a folder that stores content owned by the first user (not shown), a preference folder that stores content preferred by the first user, and a recommendation folder that stores recommendation content recommended to the first user.

The cloud storage providing server 2000 may determine the recommendation content that is to be recommended to the first user by using the content stored in the folder that stores content owned by the first user or the preference folder of the first user. The cloud storage providing server 2000 may push reference information and/or link information of the recommendation content to the recommendation folder. The cloud storage providing server 2000 may store and update, for example, a recommendation content list, the reference information of the recommendation content, the link information of the recommendation content, and additional information of the recommendation content in the recommendation folder although a request may not be received from the first user.

The reference information of the recommendation content stored in the cloud storage may be information indicating a path for accessing the recommendation content of the cloud storage server 2000. The reference information may indicate, for example, a path for approaching the recommendation content in a file system of the cloud storage server 2000.

The link information of the recommendation content provided by the content providing server 3000 may be information indicating an address for accessing the content providing server 300 and downloading or streaming the recommendation content but is not limited thereto.

The additional information of the recommendation content may include, for example, a genre of the recommendation content, a writer, a generation date, abstract information including characters of the recommendation content, capacity of the recommendation content, etc. The additional information of the recommendation content may include, for example, information indicating whether the user is authorized to use the recommendation content, an identification value of the content providing server 3000 providing the recommendation content, and information regarding use fees of the recommendation content, etc. However, the example embodiments are not limited thereto.

The cloud storage providing server 2000 may provide the first device 1010 with a GUI for using the cloud storage 2110 of the first user. The first user may read the recommendation folder by using the GUI and may check the recommendation content list. If the first user selects specific recommendation content from the recommendation content list, the first device 1010 may, for example, request the selected recommendation content from the cloud storage providing server 2000 or the content providing server 3000.

In this case, the reference information of the recommendation content recommended to the first user may be reference information newly generated with respect to the first user. For example, when content of the second user is recommended to the first user as the recommendation content, a path that the first user accesses the recommendation content may be different from a path that the second user accesses the recommendation content. For example, the path that the first user accesses the recommendation content may be " . . . /user1/app/movie.mpg", the path that the second user accesses the recommendation content may be " . . . /user2/content/movie.mpg", and a target accessed via the two paths may include the same content "movie.mpg". The reference information of the recommendation content may include, for example, hard link information.

The recommendation content provided by the content providing server 3000 may be stored in the cloud storage 2110 of the first user and may be streamed to the first device 1010.

A detailed configuration of the cloud storage providing server 2000 will be described with reference to FIG. 42 below.

Meanwhile, the preference folder and the recommendation folder may be included in each of the cloud storage 2110 and the cloud storage 2120 but are not limited thereto. The preference folder and the recommendation folder may not be included in the cloud storage 2110 and the cloud storage 2120. In this case, the cloud storage providing server 2000 may identify whether content stored in the cloud storage 2110 or the cloud storage 2120 is preference content of a user or recommendation content that is to be recommended to the user by using metadata of the content. For example, the metadata of the content may include a value indicating whether the content is the preference content or the recommendation content. The cloud storage providing server 2000 may identify whether the content is the preference content or the recommendation content according to the value indicating whether the content is the preference content or the recommendation content and included in the metadata of the content. For example, the metadata of the content may include a type of the content, user information of the user who uses the content, how many times the user reproduces the content, etc. The cloud storage providing server 2000 may determine whether the content is the preference content or the recommendation content based on the metadata of the content based on a previously set reference but is not limited thereto.

Figure 3:
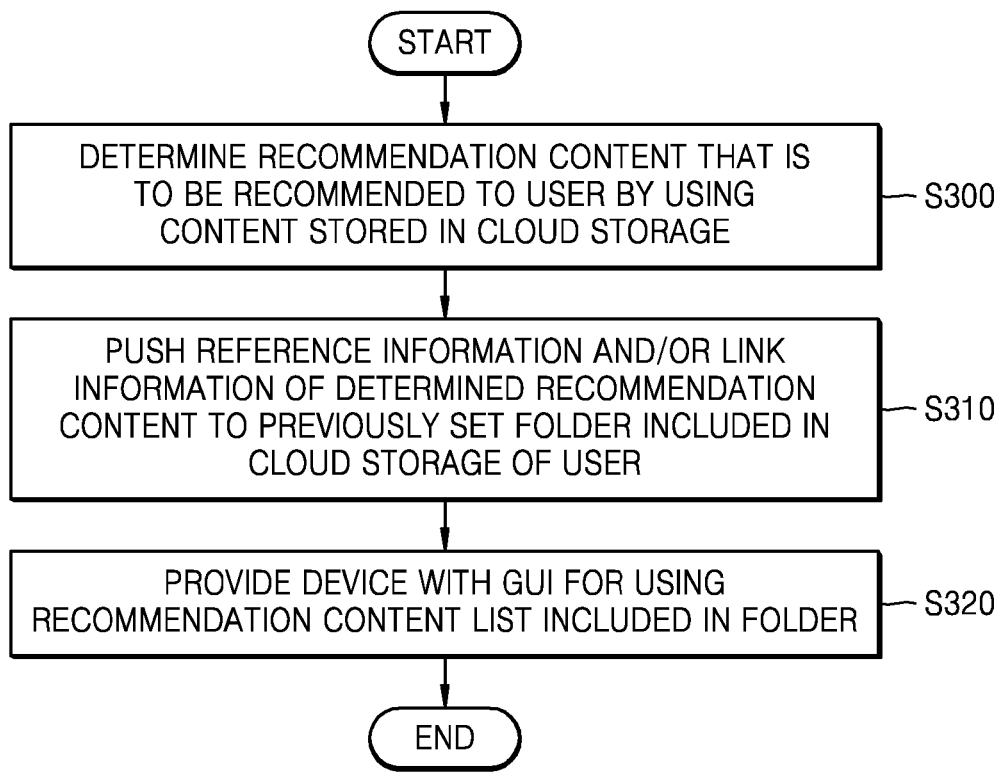
FIG. 3 is a flowchart of a method in which a cloud storage providing server pushes reference information and/or link information of recommendation content that is to be recommended to a user of a device to a cloud storage of the user, according to various example embodiments.

FIG. 3 is a flowchart of a method in which the cloud storage providing server 2000 pushes reference information and/or link information of recommendation content that is to be recommended to a user of the device 1000 to a cloud storage of the user, according to various example embodiments.

In operation S300, the cloud storage providing server 2000 may determine recommendation content that is to be recommended to a user of the device 1000 by using content stored in at least one cloud storage provided by the cloud storage providing server 2000.

The cloud storage providing server 2000 may determine the recommendation content based on the content stored in the cloud storage of the user of the device 1000. The cloud storage providing server 2000 may determine the recommendation content based on preference content of the user. For example, the cloud storage providing server 2000 may determine the recommendation content based on the content stored in a preference folder of the cloud storage of the user. For example, the cloud storage providing server 2000 may identify content executed by the user more than a predetermined number of times among the contents stored in the cloud storage of the user, and may determine the recommendation content preferred by the user in consideration of a genre and capacity of the identified content. However, the example embodiments are not limited thereto.

The cloud storage providing server 2000 may determine the recommendation content based on content stored in cloud storage of another user. For example, the cloud storage providing server 2000 may determine content executed more than a predetermined number of times among contents stored in the cloud storage of a user's acquaintance or another user having preference similar to user's preference as the recommendation content. However, the exemplary embodiments are not limited thereto.

The cloud storage providing server 2000 may generate recommendation ranking information of the content based on content used by a plurality of users or may collect recommendation ranking information of the content generated by another server (not shown) from another server (not shown). The cloud storage providing server 2000 may determine the recommendation content that is to be recommended to the user by using the generated recommendation ranking information or the collected recommendation ranking information.

However, a recommendation reference for determining the recommendation content is not limited thereto, and may be set by the user or the cloud storage providing server 2000 in various ways.

In operation S310, the cloud storage providing server 2000 may push reference information and/or link information of the determined recommendation content to a previously set folder included in the cloud storage of the user. The cloud storage providing server 2000 may automatically store the reference information and/or the link information of the recommendation content in the previously set folder of the cloud storage of the user of the device 1000 by pushing the reference information and/or the link information of the recommendation content. The previously set folder to which the reference information and/or the link information of the recommendation content is pushed may be, for example, a recommendation folder of the user.

The cloud storage providing server 2000 may push additional information of the recommendation content to the previously set folder of the user. The additional information of the recommendation content may include, for example, a genre of the recommendation content, a writer, a generation date, abstract information including characters of the recommendation content, capacity of the recommendation content, etc. The additional information of the recommendation content may include, for example, information indicating whether the user is authorized to use the recommendation content, an identification value of the content providing server 3000 providing the recommendation content, and information regarding use fees of the recommendation content, etc. However, the example embodiments are not limited thereto.

In operation S320, the cloud storage providing server 2000 may provide the device 1000 with a GUI for using a recommendation content list. The GUI for using the recommendation content list may be a GUI for using a service provided by the cloud storage providing server 2000 or a GUI for browsing and using data included in the cloud storage of the user. For example, the GUI for using the recommendation content list may be implemented as a browser for browsing a folder and a file.

The device 1000 may access the cloud storage providing server 2000 and display the GUI provided by the cloud storage on a screen of the device 1000. The user may input an ID and a password of the user through the displayed GUI. The device 1000 may display a folder list included in the cloud storage of the user through the GUI, and, if the user selects a folder to which the reference information and the link information of the recommendation content are pushed, may display the recommendation content list through the GUI. The user may, for example, check a file name of the recommendation content, the genre, and the capacity from the recommendation content list and may select the recommendation content that is to be reproduced, stored, or executed.

Figure 4:
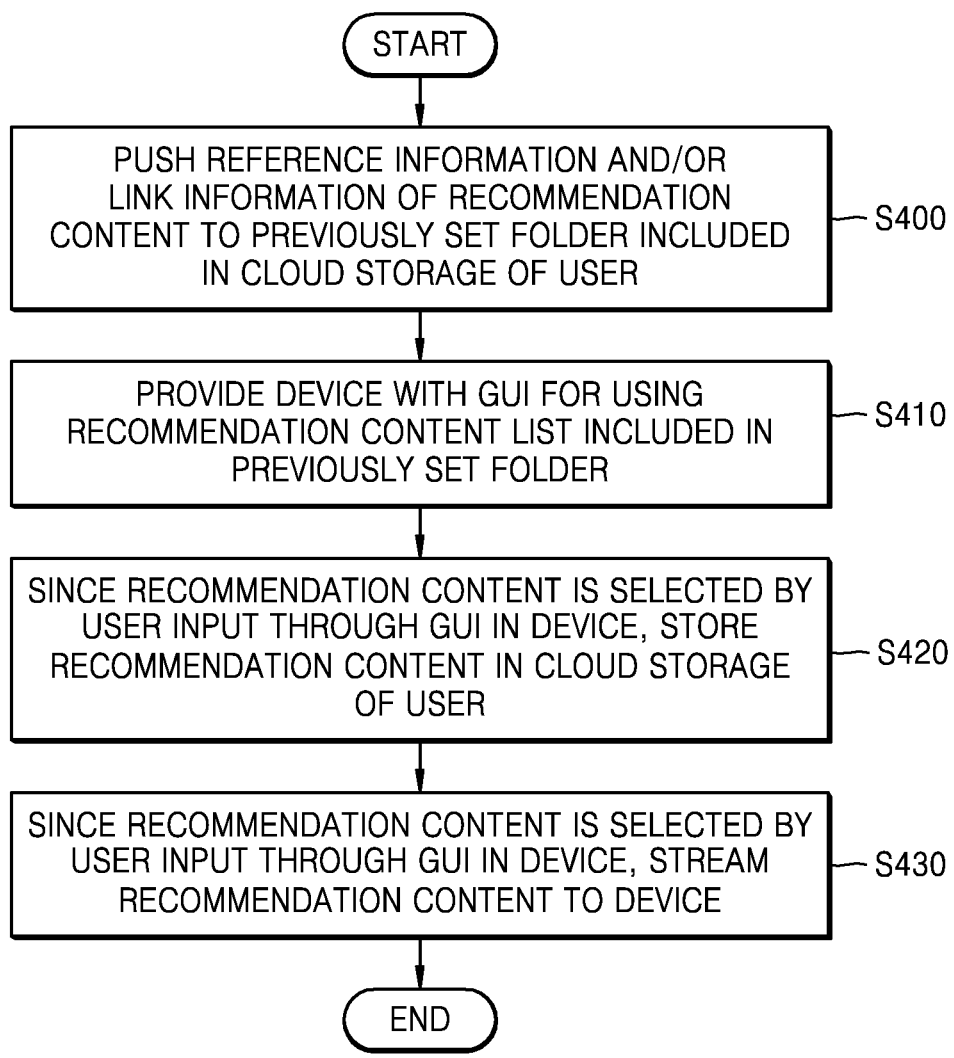
FIG. 4 is a flowchart of a method in which a cloud storage providing server provides a device with recommendation content, according to various example embodiments.

FIG. 4 is a flowchart of a method in which the cloud storage providing server 2000 provides the device 1000 with recommendation content, according to various example embodiments.

In operation S400, the cloud storage providing server 2000 may push reference information and/or link information of the recommendation content to a previously set folder included in cloud storage of a user. In operation S410, the cloud storage providing server 2000 may provide the device 1000 with a GUI for using a recommendation content list included in the previously set folder. Operations S400 and S410 may respectively correspond to operations S310 and S320 of FIG. 3, and thus detailed descriptions thereof are omitted for convenience of description.

In operation S420, since the recommendation content is selected by a user input through the GUI in the device 1000, the cloud storage providing server 2000 may store the selected recommendation content in the cloud storage of the user. If the recommendation content is selected through the GUI, the device 1000 may request the cloud storage providing server 2000 to store the selected recommendation content in the cloud storage of the user while providing the cloud storage providing server 2000 with an identification value of the selected recommendation content. The cloud storage providing server 2000 may store the recommendation content in the cloud storage of the user in response to a request from the device 1000. The cloud storage providing server 2000 may store the recommendation content in a recommendation folder. In this case, the cloud storage providing server 2000 may distinguish the recommendation content stored in the recommendation folder from recommendation content that is not stored in the recommendation folder. For example, if recommendation content A is stored in the recommendation folder, the cloud storage providing server 2000 may emphasize the recommendation content A on the recommendation content list. For example, the cloud storage providing server 2000 may display, around the recommendation content A, an object indicating that the recommendation content A of the recommendation content list is stored. The object indicating that the recommendation content A is stored may include, for example, at least one of text, an image, and an icon.

Alternatively, the cloud storage providing server 2000 may store the recommendation content in another folder. In this case, an identification value of the recommendation content stored in another folder may be deleted from the recommendation content list.

When the recommendation content is stored in cloud storage of another user included in the cloud storage providing server 2000, the recommendation content may not be stored in the cloud storage of the user but is not limited thereto. When the recommendation content is stored in the cloud storage of another user included in the cloud storage providing server 2000, the cloud storage providing server 2000 may copy the content stored in the cloud storage of another user to the cloud storage of the user.

When the recommendation content is provided by the content providing server 3000 that the user is registered to, the cloud storage providing server 2000 may receive the recommendation content from the content providing server 3000 by using membership information of the user and may store the received recommendation content in the cloud storage of the user.

In operation S430, since the device 1000 selects the recommendation content by the user input through the GUI, the cloud storage providing server 2000 may stream the selected recommendation content to the device 1000 of the user. The cloud storage providing server 2000 may stream the recommendation content to the device 1000 while storing the recommendation content in the cloud storage of the user.

When the recommendation content is stored in the cloud storage of another user, the cloud storage providing server 2000 may stream the recommendation content to the device 1000 while copying the recommendation content stored in the cloud storage of another user to the cloud storage of the user.

When the recommendation content is provided by the content providing server 3000 that the user is registered to, the cloud storage providing server 2000 may stream the recommendation content to the device 1000 while storing the recommendation content received from the content providing server 3000 in the cloud storage of the user.

Figure 5:
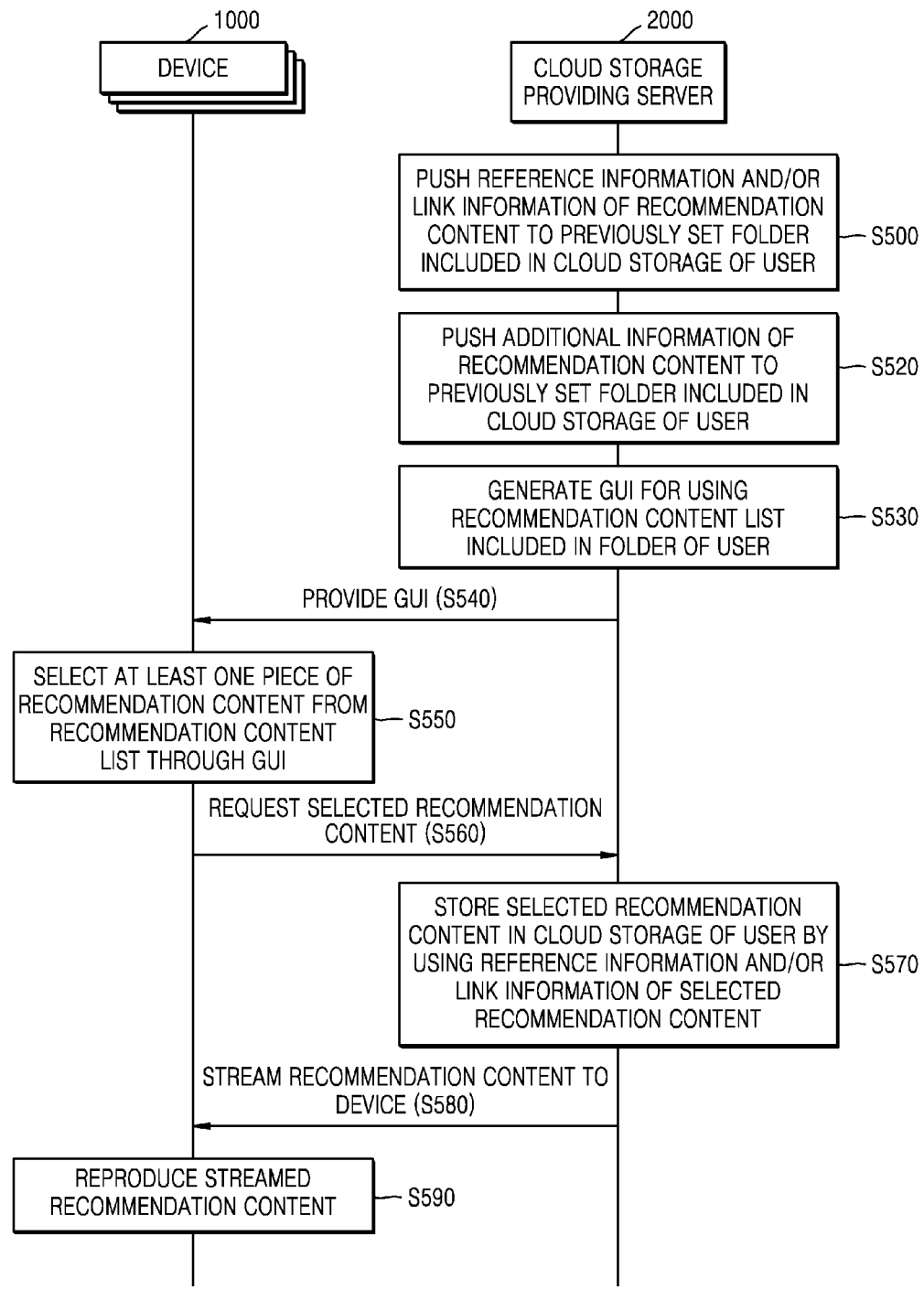
FIG. 5 is a flowchart of a method in which a cloud storage providing server stores recommendation content in cloud storage of a user and provides a device with the recommendation content, according to various example embodiments.

FIG. 5 is a flowchart of a method in which the cloud storage providing server 2000 stores recommendation content in cloud storage of a user and provides the device 1000 with the recommendation content, according to various example embodiments.

In operation S500, the cloud storage providing server 2000 may push reference information and/or link information of the recommendation content to a previously set folder included in the cloud storage of the user.

In operation S520, the cloud storage providing server 2000 may push additional information of the recommendation content to the previously set folder included in the cloud storage of the user.

The additional information of the recommendation content may include, for example, abstract information of content, information indicating whether the user is authorized to use the recommendation content, an identification value of the content providing server 3000 providing the recommendation content, information regarding use fees of the recommendation content, etc.

In operation S530, the cloud storage providing server 2000 may generate a GUI for using a recommendation content list. The GUI for using the recommendation content list may display a folder list included in the cloud storage of the user, a subfolder of each folder, and a content list. The GUI for using the recommendation content list may include an object (for example, an icon, a menu, etc.) for selecting specific recommendation content from the recommendation content list and store the selected recommendation content in the cloud storage and in the device 1000. The GUI may be executed based on a web, and may be displayed through a web browser included in the device 1000. The GUI may be executed based on an application and may be displayed through a specific service application installed in the device 1000. In this case, the specific service application may be an application capable of using a service of the cloud storage providing server 2000 and may be manufactured and distributed by the cloud storage providing server 2000.

In operation S540, the cloud storage providing server 2000 may provide the device 1000 with the generated GUI. The device 1000 may access the cloud storage providing server 2000 and may request a service provided by the cloud storage providing server 2000 from the cloud storage providing server 2000. The cloud storage providing server 2000 may provide the device 1000 with the GUI generated in operation S530 in response to a request from the device 1000.

In operation S550, the device 1000 may select at least one piece of recommendation content from the recommendation content list through the GUI. The device 1000 may display the folder list included in the cloud storage of the user through the GUI, and, according to a user selection input, may read a recommendation folder included in the cloud storage of the user. Since the recommendation folder is read, the device 1000 may display the recommendation content list through the GUI. Accordingly, the user may check a file name of the recommendation content included in the recommendation content list, the abstract information, the additional information, etc. The device 1000 may select specific recommendation content from the recommendation content list based on the user selection input through the GUI.

In operation S560, the device 1000 may request the selected recommendation content from the cloud storage providing server 2000. The device 1000 may request that the cloud storage providing server 2000 provide the device 1000 with the selected recommendation content and store the selected recommendation content in the cloud storage of the user.

In operation S570, the cloud storage providing server 2000 may store the selected recommendation content in the cloud storage of the user by using reference information and/or link information of the selected recommendation content. When the recommendation content is stored in cloud storage of another user, the cloud storage providing server 2000 may store the recommendation content stored in cloud storage of another user in the cloud storage of the user. When the recommendation content is provided by the content providing server 3000 that the user is registered to, the cloud storage providing server 2000 may access the content providing server 3000 by using the link information of the recommendation content. The cloud storage providing server 2000 may receive the recommendation content from the content providing server 3000 by using a service ID and a password of the user with respect to the content providing server 3000 and may store the received recommendation content in the cloud storage of the user.

When the recommendation content is provided by the content providing server 3000 that the user is not registered to, the cloud storage providing server 2000 may receive the recommendation content from the device 1000 and may store the received recommendation content in the cloud storage of the user. In this case, the device 1000 may access the content providing server 3000 that the user is not registered to by using the link information of the recommendation content, enable the user to be registered to the content providing server 3000 that the user is not registered to, and receive the recommendation content from the content providing server 3000 that the user is not registered to. The device 1000 may provide the cloud storage providing server 2000 with the received recommendation content.

The cloud storage providing server 2000 may store the recommendation content in the previously set folder included in the cloud storage of the user. The previously set folder may be, for example, the recommendation folder but is not limited thereto.

In operation S580, the cloud storage providing server 2000 may stream the selected recommendation content to the device 1000. When the recommendation content is stored in the cloud storage of another user, the cloud storage providing server 2000 may stream the recommendation content stored in the cloud storage of another user to the device 1000 while copying the recommendation content stored in the cloud storage of another user to the cloud storage of the user.

When the recommendation content is provided by the content providing server 3000 that the user is registered to, the cloud storage providing server 2000 may receive the recommendation content from the content providing server 3000 by using membership information of the user and stream the received recommendation content to the device 1000 while storing the received recommendation content in the cloud storage of the user.

In operation S590, the device 1000 may reproduce the streamed recommendation content.

Figure 6:
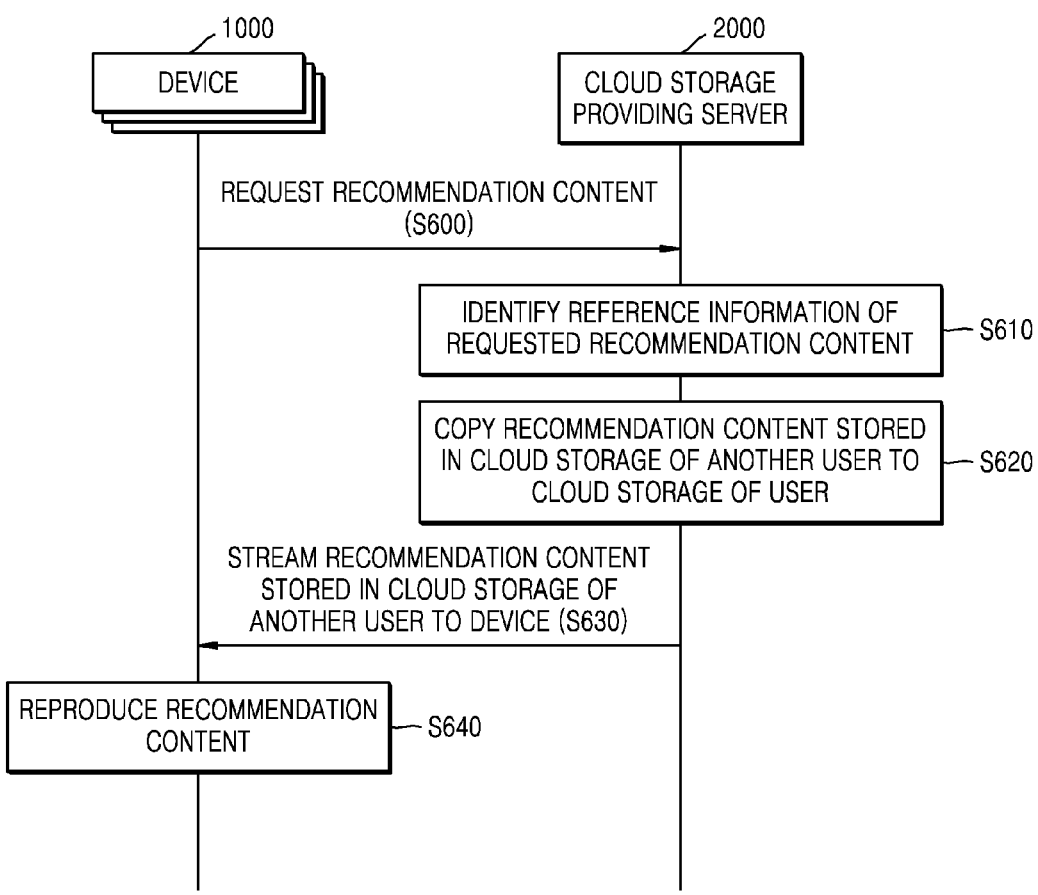
FIG. 6 is a flowchart of a method in which a cloud storage providing server stores recommendation content in cloud storage of a user and streams the recommendation content to a device when the recommendation content is stored in cloud storage of another user, according to various example embodiments.

FIG. 6 is a flowchart of a method in which the cloud storage providing server 2000 stores recommendation content in cloud storage of a user and streams the recommendation content to the device 1000 when the recommendation content is stored in cloud storage of another user, according to various example embodiments.

In operation S600, the device 1000 may request the recommendation content from the cloud storage providing server 2000. The device 1000 may select specific recommendation content from a recommendation content list based on a user input and request the selected recommendation content from the cloud storage providing server 2000.

In operation S610, the cloud storage providing server 2000 may identify reference information of the requested recommendation content. When the recommendation content is content stored in the cloud storage of another user, the cloud storage providing server 2000 may identify an ID of another user and a name of a folder in which the recommendation content is stored. In this case, the recommendation content may be content that may be shared with the user among contents stored in the cloud storage of another user. Whether the content stored in the cloud storage of the another user is shared with the user may be set by another user or the cloud storage providing server 2000 in advance.

In operation S620, the cloud storage providing server 2000 may copy the recommendation content stored in the cloud storage of another user to the cloud storage of the user. The cloud storage providing server 2000 may store the recommendation content in a recommendation folder included in the cloud storage of the user but is not limited thereto.

In operation S630, the cloud storage providing server 2000 may stream the recommendation content stored in the cloud storage of another user to the device 1000. The cloud storage providing server 2000 may stream the recommendation content to the device 1000 while storing the recommendation content in the cloud storage of the user.

In operation S640, the device 1000 may reproduce the streamed recommendation content.

Meanwhile, the cloud storage providing server 2000 may not copy the recommendation content to the cloud storage of the user by not performing operation S620. In this case, the cloud storage providing server 2000 may stream the recommendation content to the device 1000 without storing the recommendation content in the cloud storage of the user.

Figure 7:
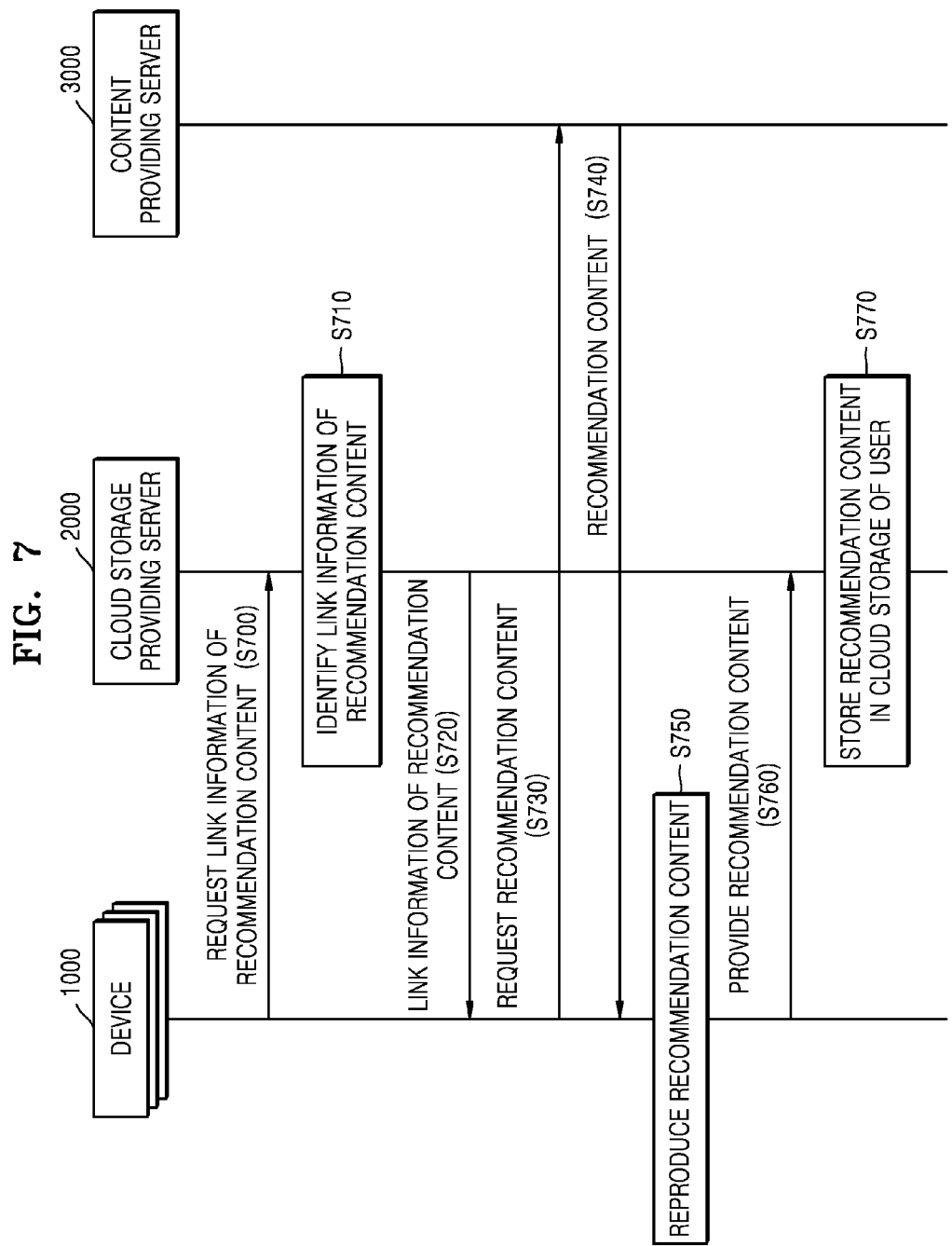
FIG. 7 is a flowchart of a method in which a device receives recommendation content from a content providing server and stores the received recommendation content in cloud storage of a user included in a cloud storage providing server when the recommendation content is provided by the content providing server, according to various example embodiments.

FIG. 7 is a flowchart of a method in which the device 1000 receives recommendation content from the content providing server 3000 and stores the received recommendation content in cloud storage of a user included in the cloud storage providing server 2000 when the recommendation content is provided by the content providing server 3000, according to various example embodiments.

In operation S700, the device 1000 may request link information of the recommendation content from the cloud storage providing server 2000. The device 1000 may select specific recommendation content from a recommendation content list based on a user input and request the selected recommendation content from the cloud storage providing server 2000.

In operation S710, the cloud storage providing server 2000 may, for example, identify link information of the recommendation content. When the recommendation content is content by the content providing server 3000, the cloud storage providing server 2000 may identify address information for accessing the content providing server 3000. The cloud storage providing server 2000 may identify address information for directly accessing the recommendation content included in the content providing server 3000. The cloud storage providing server 2000 may acquire information regarding whether the user is authorized to use the recommendation content that is to be provided by the content providing server 2000. For example, the cloud storage providing server 2000 may acquire information regarding whether the user is able to use the recommendation content that is to be provided by the content providing server 2000 free of charge or for a fee by using an ID of the user with respect to the content providing server 3000.

In operation S720, the cloud storage providing server 2000 may provide the device 1000 with link information of the recommendation content. The cloud storage providing server 2000 may provide the device 1000 with the address information for accessing the content providing server 3000 and/or information regarding whether the user is authorized to use the recommendation content. Alternatively, the cloud storage providing server 2000 may provide the device 1000 with the address information for directly accessing the recommendation content included in the content providing server 3000. However, the exemplary embodiments are not limited thereto.

Meanwhile, the cloud storage providing server 2000 provides the device 1000 with the link information of the recommendation content in response to a request from the device 1000 in operations S700 through S720 but is not limited thereto. The cloud storage providing server 2000 may provide the device the link information of the recommendation content and additional information while providing the device 1000 with a GUI for using a recommendation content list.

In operation S730, the device 1000 may request the recommendation content from the content providing server 3000. The device 1000 may access the content providing server 3000 by using the link information of the recommendation content and request the recommendation content from the content providing server 3000. For example, if the device 1000 accesses the content providing server 3000 using the address information for directly accessing the recommendation content, a GUI including information such as a name of the recommendation content, a genre, a price, etc. and a button for receiving the recommendation content and a GUI for inputting a service ID and a password of the content providing server 3000 on a screen of the device 1000. If an ID and a password of the user are input and the button for receiving the recommendation content is selected, the device 1000 may request the recommendation content from the content providing server 3000.

The device 1000 may request the recommendation content from the content providing server 3000 using an application for using a service of the content providing server 3000. If the recommendation content is selected from the recommendation content list received from the cloud storage providing server 2000, the device 1000 may execute the application for using the service of the content providing server 3000 and request the recommendation content from the content providing server 3000 by using a GUI of the executed application.

In operation S740, the content providing server 3000 may provide the device 1000 with the recommendation content. The content providing server 3000 may authenticate the user by using the ID and the password of the user and may stream the recommendation content to the device 1000.

In operation S750, the device 1000 may reproduce the recommendation content. In operation S760, the device 1000 may provide the cloud storage providing server 2000 with the recommendation content. The device 1000 may transmit the recommendation content to the cloud storage providing server 2000 while receiving the recommendation content from the content providing server 3000.

In operation S770, the cloud storage providing server 2000 may store the recommendation content in cloud storage of the user. The cloud storage providing server 2000 may store the recommendation content in a recommendation folder included in the cloud storage of the user. In this case, the cloud storage providing server 2000 may display an object indicating that the recommendation content selected from the recommendation content list is stored in the GUI for using the recommendation content list around a file name of the selected recommendation content.

Figure 8:
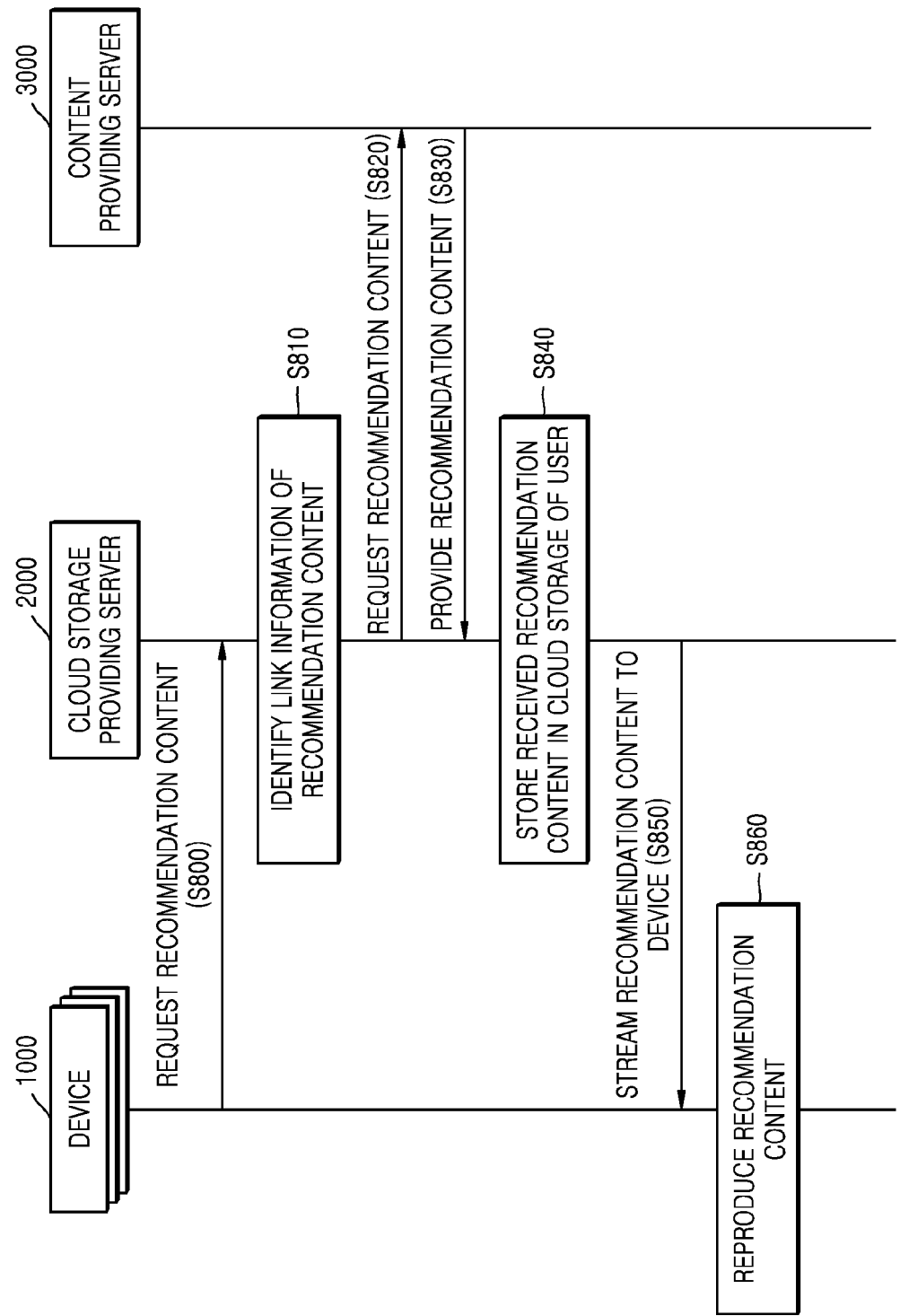
FIG. 8 is a flowchart of a method in which a cloud storage providing server receives recommendation content from a content providing server, stores the received recommendation content, and provides a device with the received recommendation content when the recommendation content is provided by the content providing server, according to various example embodiments.

FIG. 8 is a flowchart of a method in which the cloud storage providing server 2000 receives recommendation content from the content providing server 3000, stores the received recommendation content, and provides the device 1000 with the received recommendation content when the recommendation content is provided by the content providing server 3000, according to various example embodiments.

In operation S800, the device 1000 may request the recommendation content from the cloud storage providing server 2000. In operation S810, the cloud storage providing server 2000 may identify link information of the recommendation content. When the recommendation content is provided by the content providing server 3000, the cloud storage providing server 2000 may identify address information for accessing the content providing server 3000. The cloud storage providing server 2000 may identify address information for directly accessing the recommendation content included in the content providing server 3000. The cloud storage providing server 2000 may acquire membership information (for example, an ID and a password) of a user with respect to the content providing server 3000 so as to acquire the recommendation content provided by the content providing server 3000.

In operation S820, the cloud storage providing server 2000 may request the recommendation content from the content providing server 3000. The cloud storage providing server 2000 may request the recommendation content from the content providing server 3000 by providing the content providing server 3000 with an identification value of the recommendation content and the ID and the password of the user of the device 1000 that requests the recommendation content.

In operation S830, the content providing server 3000 may provide the cloud storage providing server 2000 with the recommendation content. The content providing server 3000 may, for example, authenticate the user by using the ID and the password of the user received from the cloud storage providing server 2000 and provide the cloud storage providing server 2000 with the recommendation content.

In operation S840, the cloud storage providing server 2000 may store the received recommendation content in cloud storage of the user. The cloud storage providing server 2000 may store the recommendation content received from the content providing server 3000 in a recommendation folder. However, the example embodiments are not limited thereto. The cloud storage providing server 2000 may store the received recommendation content in another previously set folder.

In operation S850, the cloud storage providing server 2000 may stream the recommendation content to the device 1000. The cloud storage providing server 2000 may stream the recommendation content received from the content providing server 3000 to the device 100 while storing the recommendation content.

In operation S860, the device 1000 may reproduce the recommendation content.

Figure 9:
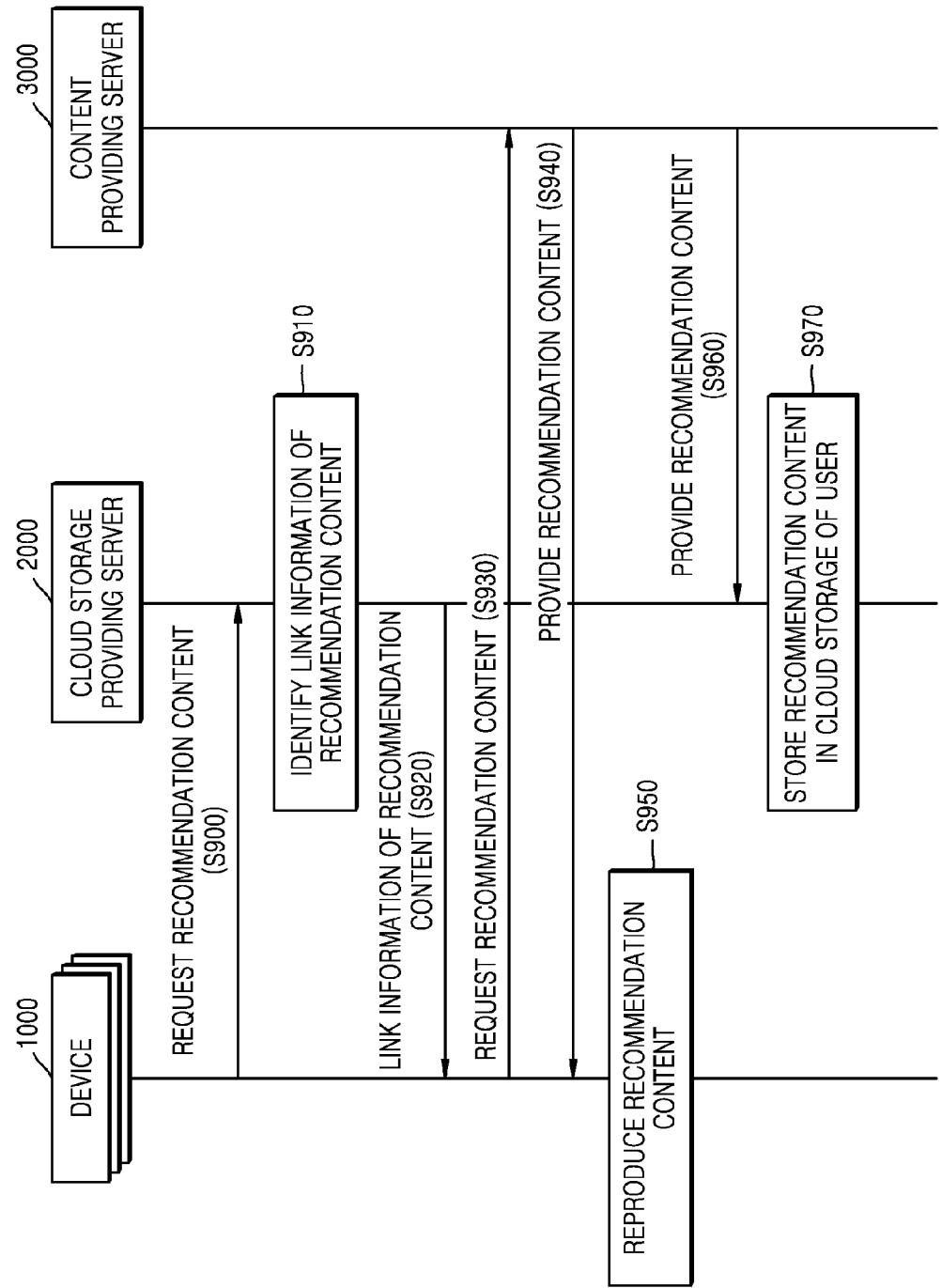
FIG. 9 is a flowchart of a method in which a cloud storage providing server provides a device and the cloud storage providing server with recommendation content when the recommendation content is provided by a content providing server, according to various example embodiments.

FIG. 9 is a flowchart of a method in which the cloud storage providing server 2000 provides the device 1000 and the cloud storage providing server 2000 with recommendation content when the recommendation content is provided by the content providing server 3000, according to various example embodiments.

Operations S900 through S950 respectively correspond to operations S700 through S750 of FIG. 7, and thus detailed descriptions thereof are omitted for convenience.

However, in operation S930, the device 1000 may request the content providing server 3000 to provide the cloud storage providing server 2000 with the recommendation content, unlike operation S730. The device 1000 may request the content providing server 3000 to provide the cloud storage providing server 2000 with the recommendation content by providing the content providing server 3000 with an identification value of the cloud storage providing server 2000 and an ID of a user with respect to a service of the cloud storage providing server 2000.

In operation S960, the content providing server 3000 may provide the cloud storage providing server 2000 with the recommendation content. The content providing server 3000 may authenticate the user by using an ID and a password of the user with respect to a service of the content providing server 3000. If the user is authenticated, the content providing server 3000 may provide the cloud storage providing server 2000 with the recommendation content from the device 1000. The content providing server 3000 may provide the ID of the user with respect to the service of the cloud storage providing server 2000 with the cloud storage providing server 2000 while providing the recommendation content with the cloud storage providing server 2000. The content providing server 3000 may simultaneously perform operations S940 and S960.

In operation S970, the cloud storage providing server 2000 may store the recommendation content in cloud storage of the user. The cloud storage providing server 2000 may identify the user by using the ID of the user with respect to the service of the cloud storage providing server 2000 and store the recommendation content in the cloud storage of the identified user.

Figure 10:
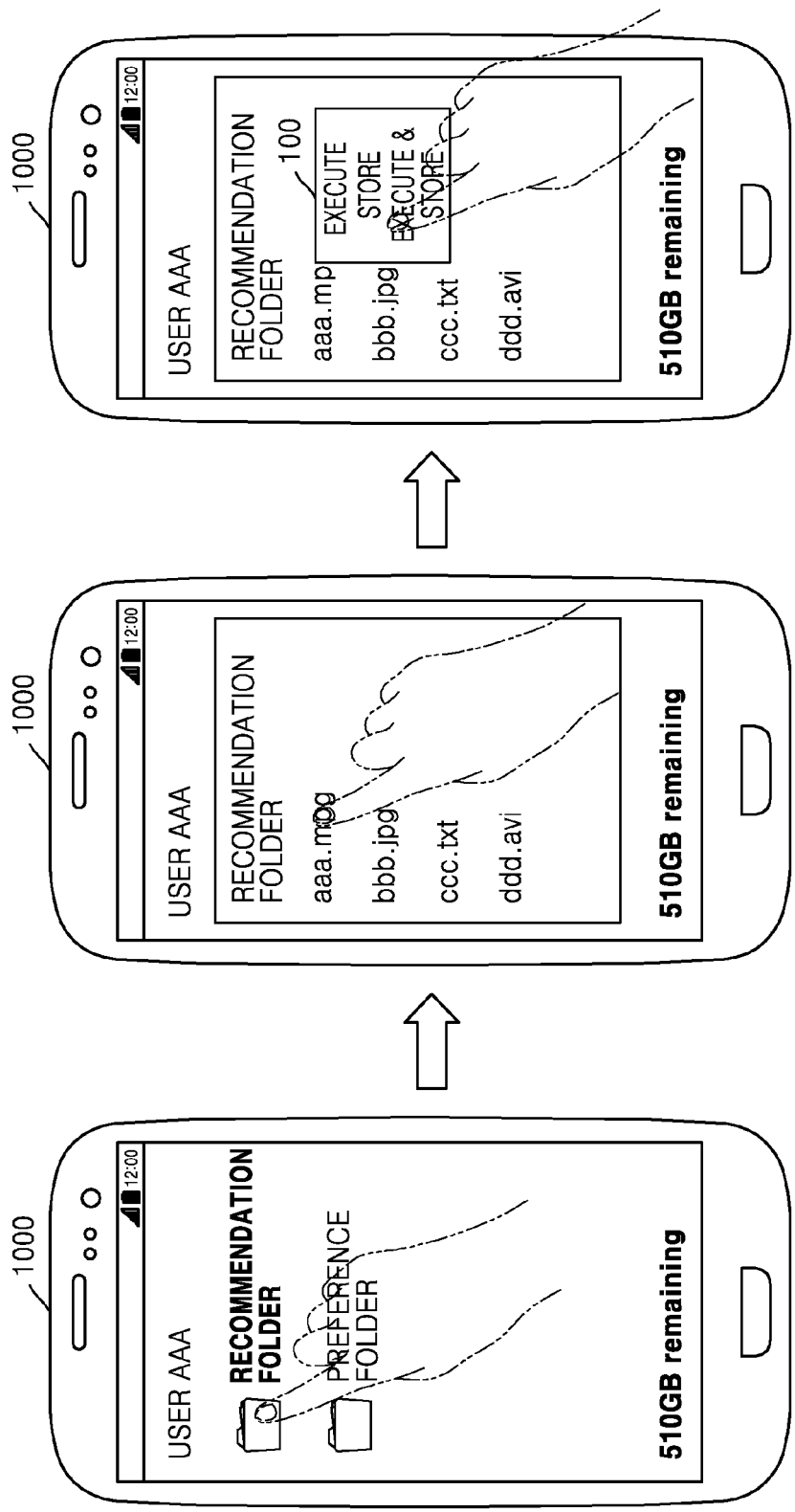
FIGS. 10A through 10C illustrate an example in which a device displays a graphic user interface (GUI) for using a recommendation content list and selects recommendation content from the recommendation content list based on a user input, according to various example embodiments.

FIGS. 10A through 10C illustrate an example in which the device 1000 displays a GUI for using a recommendation content list and selects recommendation content from the recommendation content list based on a user input, according to some exemplary embodiments.

Referring to FIG. 10A, the device 1000 may display a GUI for using a service of the cloud storage providing server 2000 on a screen of the device 1000. The GUI for using the service of the cloud storage providing server 2000 may be the GUI for using the recommendation content list recommended by the cloud storage providing server 2000. The GUI for using the recommendation content list may include, for example, a recommendation folder and a preference folder included in cloud storage of a user. The user may select the recommendation folder.

The device 1000 may display the GUI illustrated in FIG. 10A on the screen of the device 1000 by accessing the cloud storage providing server 2000 through a web browser but is not limited thereto. The device 1000 may display the GUI illustrated in FIG. 10A on the screen of the device 1000 by executing an application provided by the cloud storage providing server 2000 and for using the service of the cloud storage providing server 2000.

Referring to FIG. 10B, since the user selects the recommendation folder, the device 1000 may display the recommendation content list included in the recommendation folder. The recommendation content may be determined by the cloud storage providing server 2000. Reference information and/or link information of the recommendation content may be pushed to the recommendation folder included in the cloud storage of the user. The recommendation content corresponding to the recommendation content list displayed on the recommendation folder of FIG. 10B may not be stored in the recommendation folder. The user may select recommendation content aaa.mpg from the recommendation content list.

Referring to FIG. 10C, since the user selects the recommendation content aaa.mpg, the device 1000 may display a menu 100 for selecting whether to execute, store, or execute & store the recommendation content aaa.mpg. If "execute" is selected from the menu 100, the device 1000 may receive and reproduce streamed recommendation content. If "store" is selected from the menu 100, the device 1000 may allow the recommendation content to be stored in the cloud storage of the user. If "execute & store" is selected from the menu 100, the device 1000 may receive the streamed recommendation content and allow the recommendation content to be stored in the cloud storage of the user.

FIGS. 11 through 14 illustrate an example in which the device 1000 receives recommendation content selected through a GUI, according to some exemplary embodiments.

Figure 11:
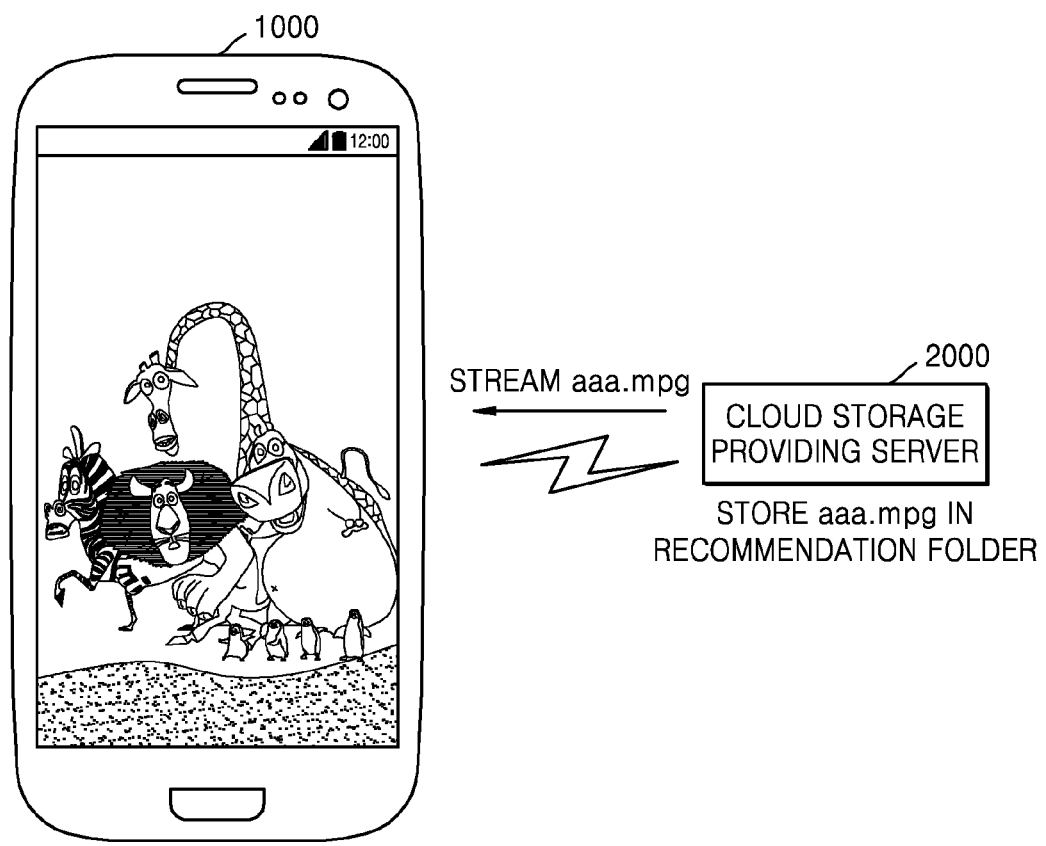
FIGS. 11 through 14 illustrate an example in which a device receives recommendation content selected through a GUI, according to various example embodiments.

Referring to FIG. 11, the cloud storage providing server 2000 may identify the recommendation content stored in cloud storage of another user. The device 1000 may receive the recommendation content from the cloud storage. If a user of the device 1000 selects the recommendation content aaa.mpg from a recommendation content list of FIG. 10 and selects "execute & store" from the menu 100, the cloud storage providing server 2000 may stream the recommendation content aaa.mpg stored in the cloud storage of another user to the device 1000. The cloud storage providing server 2000 may copy the recommendation content aaa.mpg to a recommendation folder included in cloud storage of the user while streaming the recommendation content aaa.mpg to the device 1000 but is not limited thereto. The cloud storage providing server 2000 may, for example, only stream the recommendation content aaa.mpg to the device 1000 without copying the recommendation content aaa.mpg to the recommendation folder included in the cloud storage of the user.

Figure 12:
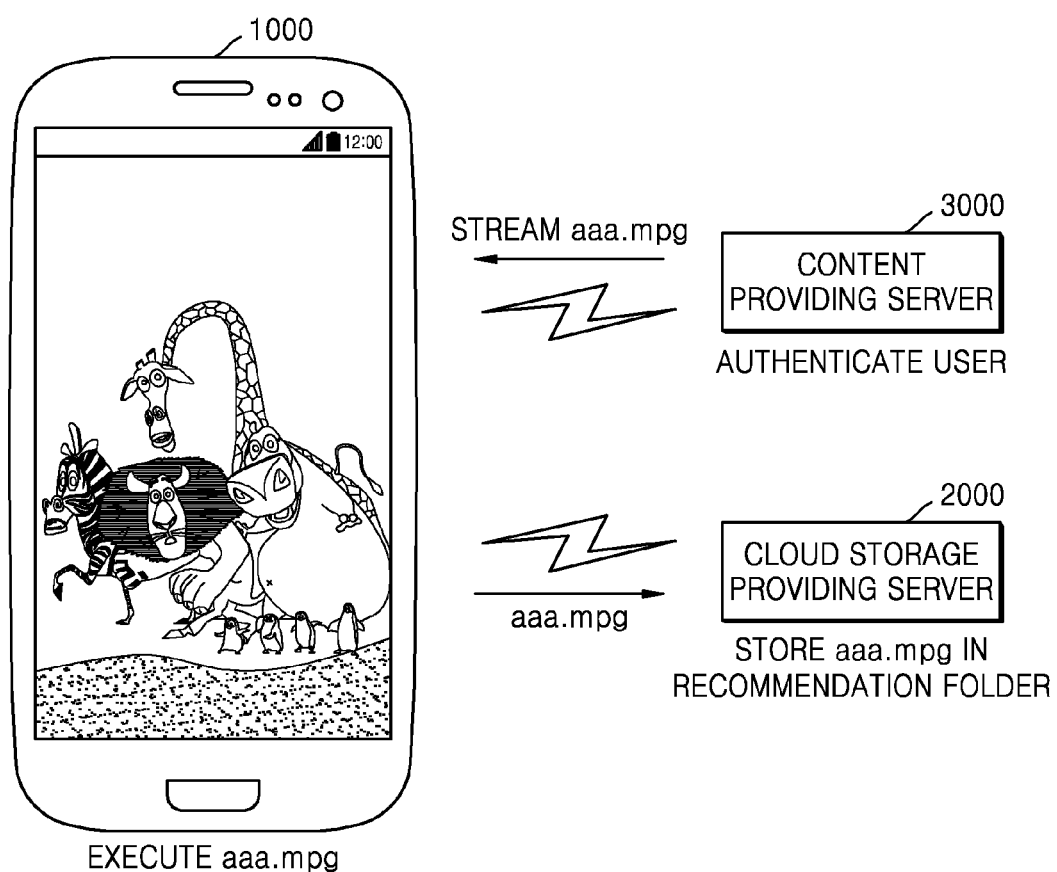

Referring to FIG. 12, the device may receive the recommendation content from the content providing server 3000. The cloud storage providing server 2000 may receive and store the recommendation content from the device 1000. If a user of the device 1000 selects the recommendation content aaa.mpg from a recommendation content list of FIG. 10 and selects "execute & store" from the menu 100, the device 1000 may acquire link information for receiving the recommendation content aaa.mpg. The link information for receiving the recommendation content aaa.mpg may include at least one of address information for accessing the content providing server 3000 and address information for directly accessing the recommendation content aaa.mpg that is to be provided by the content providing server 3000.

The device 1000 may access the content providing server 3000 by using the acquired link information and request the recommendation content aaa.mpg from the content providing server 3000. In this case, the device 1000 may provide the content providing server 3000 with an ID and a password of the user with respect to a service of the content providing server 3000. The content providing server 3000 may authenticate the user. The device 1000 may receive streamed recommendation content aaa.mpg from the content providing server 3000.

The device 1000 may provide the cloud storage providing server 20000 with the recommendation content aaa.mpg that is streaming. The cloud storage providing server 2000 may store the recommendation content aaa.mpg received from the device 1000 in a recommendation folder of the user.

Figure 13:
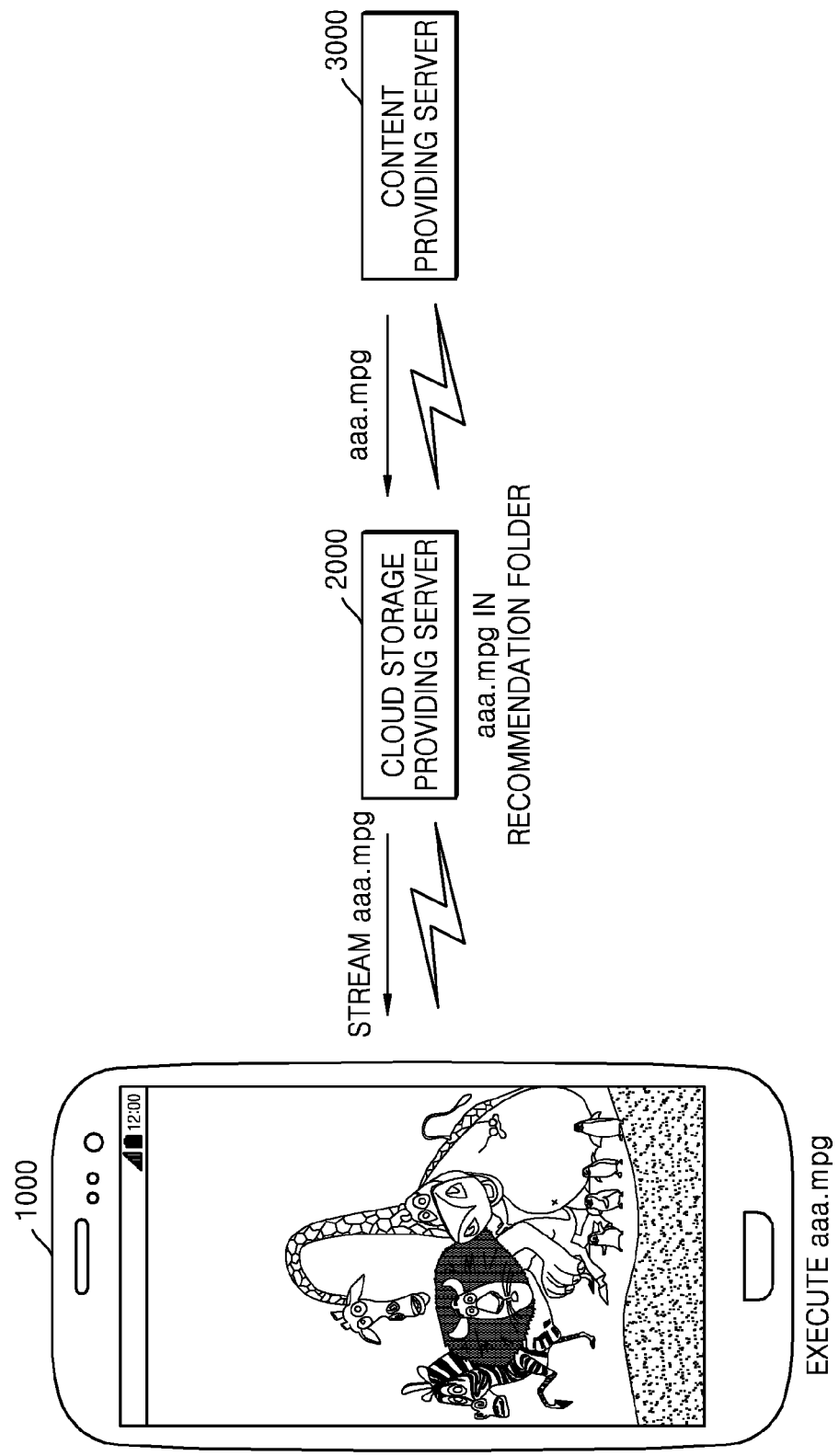

Referring to FIG. 13, the cloud storage providing server 2000 may receive the recommendation content from the content providing server 3000. The device 1000 may receive the recommendation content from the cloud storage providing server 2000. If the user of the device 1000 selects the recommendation content aaa.mpg from a recommendation content list of FIG. 10 and selects "execute & store" from the menu 100, the cloud storage providing server 2000 may receive the recommendation content aaa.mpg from the content providing server 3000. In this case, the cloud storage providing server 2000 may access the content providing server 3000 and provide the content providing server 3000 with an ID and a password of the user with respect to a service of the content providing server 3000. The content providing server 3000 may authenticate the user.

The cloud storage providing server 2000 may stream the recommendation content aaa.mpg to the device 1000 while storing the recommendation content aaa.mpg in the recommendation folder included in the cloud storage of the user.

Figure 14:
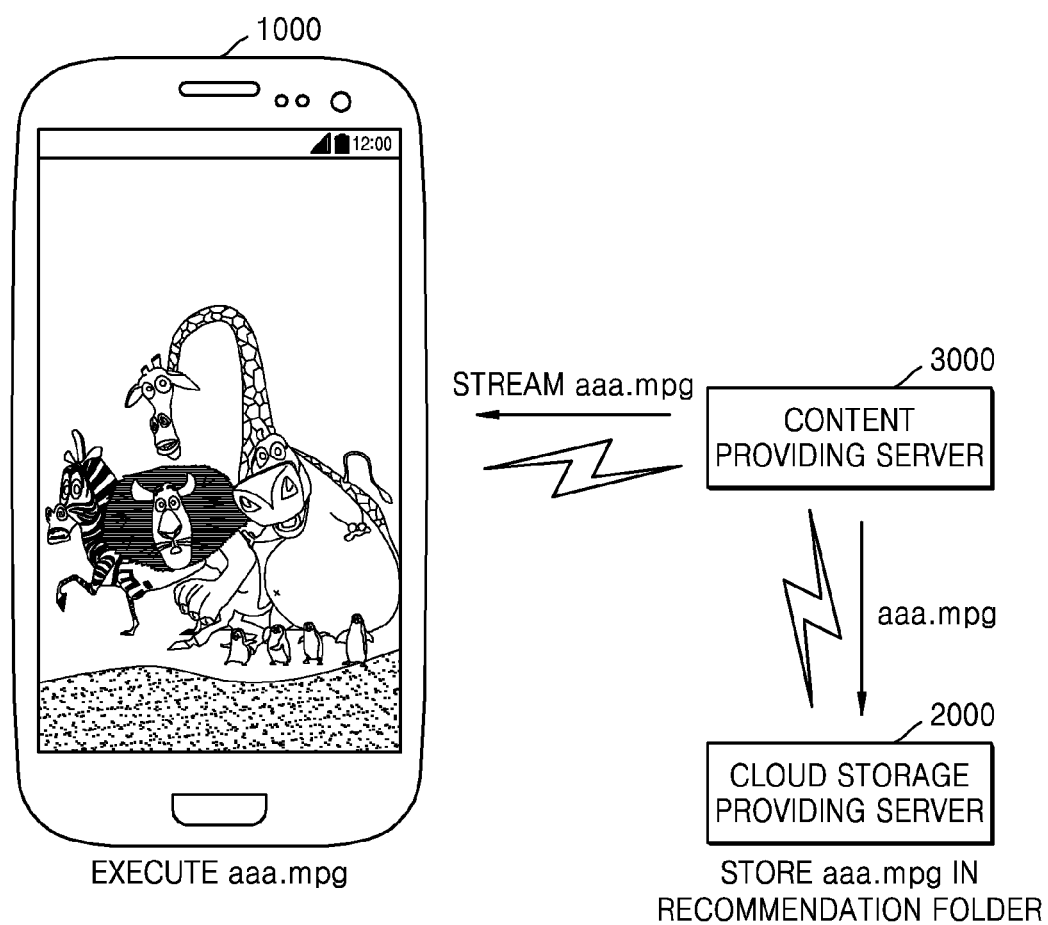

Referring to FIG. 14, the cloud storage providing server 2000 and the device 1000 may receive the recommendation content from the content providing server 3000. If the user of the device 1000 selects the recommendation content aaa.mpg from a recommendation content list of FIG. 10 and selects "execute & store" from the menu 100, the device 1000 may acquire link information for receiving the recommendation content aaa.mpg. The device 1000 may access the content providing server 3000 by using the acquired link information and request the recommendation content aaa.mpg from the content providing server 3000. In this case, the device 1000 may provide the content providing server 3000 with an ID and a password of the user with respect to the service of the content providing server 3000. The content providing server 3000 may authenticate the user. The device 1000 may receive streamed recommendation content aaa.mpg from the content providing server 3000.

The device 1000 may request the content providing server 3000 to provide the cloud storage providing server 2000 with the recommendation content by providing the content providing server 3000 with an identification value of the cloud storage providing server 2000 and an ID of the user with respect to the service of the cloud storage providing server 2000. The content providing server 3000 may provide the cloud storage providing server 2000 with the recommendation content aaa.mpg. The cloud storage providing server 2000 may store the recommendation content aaa.mpg in the recommendation folder included in the cloud storage of the user.

Figure 15A:
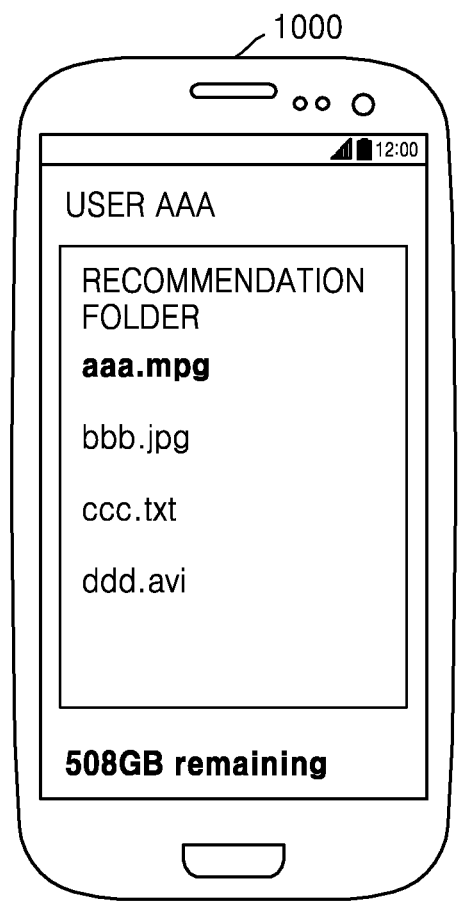
FIG. 15A illustrates an example of storing recommendation content in cloud storage of a user, according to various example embodiments.

FIG. 15A illustrates an example of storing recommendation content in cloud storage of a user, according to various example embodiments.

Referring to FIG. 15A, since the recommendation content aaa.mpg is stored in a recommendation folder of the cloud storage of the user, "aaa.mpg" may be displayed in bold on a recommendation content list. However, the example embodiments are not limited thereto. For example, an object indicating that the recommendation content aaa.mpg is stored may be displayed around "aaa.mpg".

Since the recommendation content aaa.mpg is stored in the recommendation folder of the cloud storage of the user, an available space of the cloud storage of the user may be reduced, for example, from 510 GB to 508 GB.

Figure 15B:
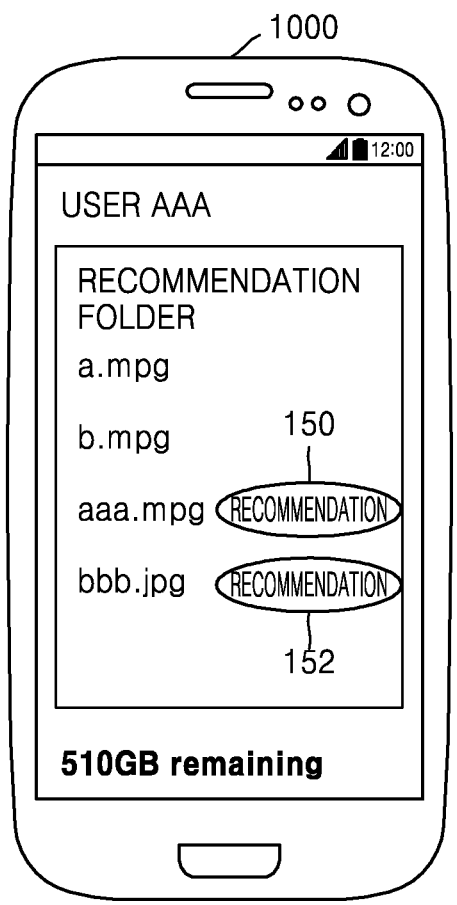
FIG. 15B illustrates an example of simultaneously displaying a content list owned by a user and a recommendation content list recommended to the user through a GUI, according to various example embodiments.

FIG. 15B illustrates an example of simultaneously displaying a content list owned by a user and a recommendation content list recommended to the user through a GUI, according to various example embodiments.

Referring to FIG. 15B, contents a.mpg and b.mpg that are owned by the user of the device 1000 and recommendation contents aaa.mpg and bbb.jpg that are recommended to the user may be displayed on a screen of the device 1000 through the GUI. The contents a.mpg and b.mpg that are owned by the user may be contents stored in cloud storage of the user. The recommendation contents aaa.mpg and bbb.jpg that are recommended to the user may not be stored in the cloud storage of the user and reference information and/or link information of the recommendation contents aaa.mpg and bbb.jpg may be stored in cloud storage of the user.

In this case, the device 1000 may differently display the contents a.mpg and b.mpg that are owned by the user and the recommendation contents aaa.mpg and bbb.jpg that are recommended to the user. The device 1000 may display, for example, icons 150 and 152 next to names of the recommendation contents aaa.mpg and bbb.jpg that are recommended to the user so that the contents a.mpg and b.mpg that are owned by the user and the recommendation contents aaa.mpg and bbb.jpg that are recommended to the user may be differently displayed.

Figure 16:
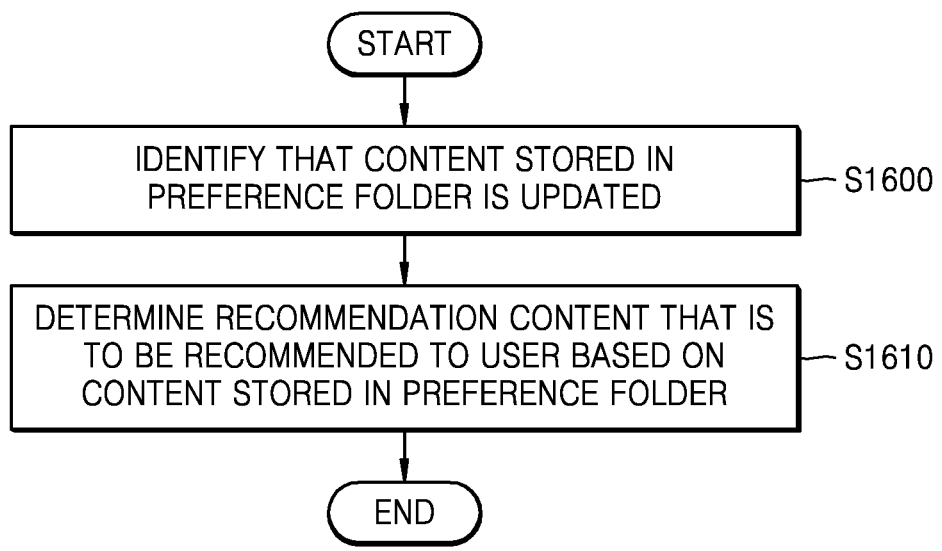
FIG. 16 is a flowchart of a method in which a cloud storage providing server determines recommendation content based on which content stored in a preference folder of a user has been updated, according to various example embodiments.

FIG. 16 is a flowchart of a method in which the cloud storage providing server 2000 determines recommendation content based on which content stored in a preference folder of a user has been updated, according to some exemplary embodiments.

In operation S1600, the cloud storage providing server 2000 may identify which content stored in the preference folder of the user has been updated. The user may store content preferred by the user in the preference folder or delete the content stored in the preference folder, and accordingly, the cloud storage providing server 2000 may identify the content stored in the preference folder of the user is updated.

In operation S1610, the cloud storage providing server 2000 may determine the recommendation content that is to be recommended to the user based on the content stored in the preference folder. The cloud storage providing server 2000 may identify a type of the content stored in the preference folder, such as, for example, a genre, a writer, characters, capacity, or the like and may determine content similar to the content stored in the preference folder as the recommendation content.

Meanwhile, the cloud storage providing server 2000 may determine the recommendation content since the content stored in the preference folder of the user is updated in FIG. 16 but is not limited thereto. The cloud storage providing server 2000 may determine the recommendation content since content stored in at least one previously set folder is updated.

Figure 17:
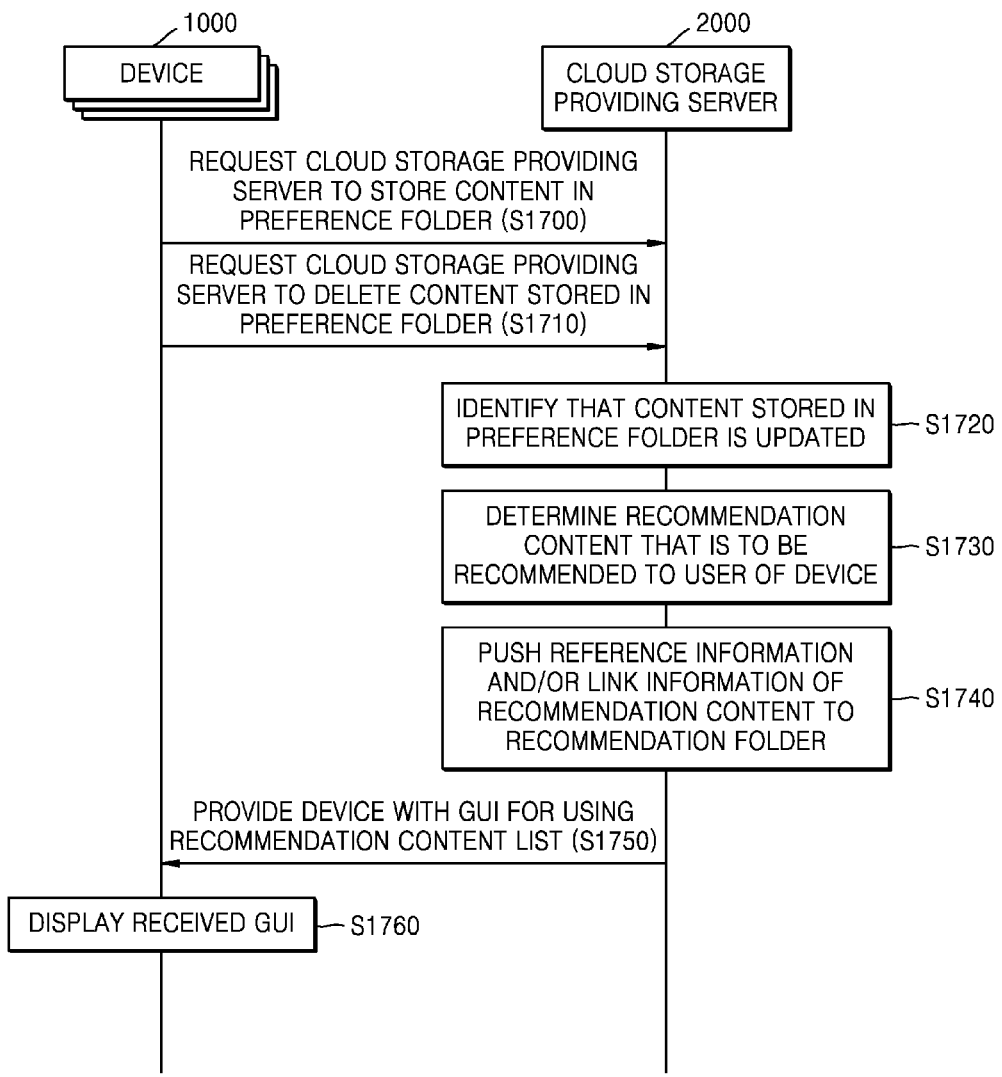
FIG. 17 is a flowchart of a method in which a cloud storage providing server determines recommendation content based on content stored in a preference folder, according to various example embodiments.

FIG. 17 is a flowchart of a method in which the cloud storage providing server 2000 determines recommendation content based on content stored in a preference folder, according to various example embodiments.

In operation S1700, the device 1000 may request the cloud storage providing server 2000 to store the content in the preference folder. The device 1000 may request cloud storage to store the recommendation content selected from a recommendation content list in the preference folder. The device 1000 may provide the cloud storage providing server 2000 with specific content, thereby requesting the cloud storage providing server 2000 to store the provided content in the preference folder. However, the example embodiments are not limited thereto.

In operation S1710, the device 1000 may request the cloud storage providing server 2000 to delete content stored in the preference folder.

In operation S1720, the cloud storage providing server 2000 may identify that the content stored in the preference folder is updated. The cloud storage providing server 2000 may monitor the content stored in the preference folder and may identify in real time that the content stored in the preference folder is updated.

In operation S1730, the cloud storage providing server 2000 may determine the recommendation content that is to be recommended to a user. The cloud storage providing server 2000 may determine the recommendation content that is to be recommended to the user based on at least one piece of the content stored in the preference folder of the user and content stored in a preference folder of another user. The cloud storage providing server 2000 may, for example, determine the recommendation content from at least one piece of content stored in cloud storage provided by the cloud storage providing server 2000, content provided by the content providing server 3000 that the user is registered to, and content provided by the content providing server 3000 that the user is not registered to.

In operation S1740, the cloud storage providing server 2000 may push reference information and/or link information of the recommendation content to a recommendation folder. In operation S1750, the cloud storage providing server 2000 may provide the device 1000 with a GUI for using the recommendation content list. In operation S1760, the device 1000 may display the received GUI on a screen of the device 1000. The user may check various types of information regarding the recommendation content and select the recommendation content that is to be executed or stored, through a list for using the recommendation content list.

Figure 18:
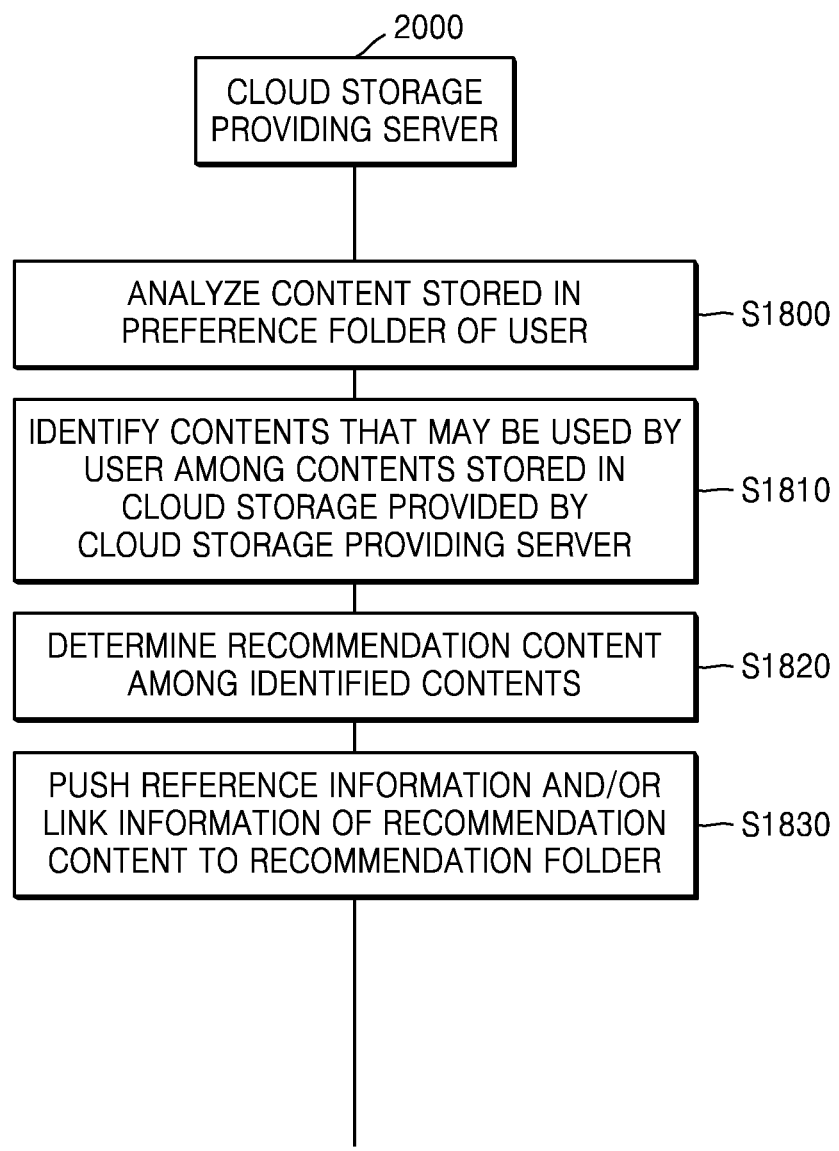
FIG. 18 is a flowchart of a method in which a cloud storage providing server determines recommendation content among contents stored in cloud storage provided by the cloud storage providing server based on content stored in a preference folder of a user, according to various example embodiments.

FIG. 18 is a flowchart of a method in which the cloud storage providing server 2000 determines recommendation content among contents stored in cloud storage provided by the cloud storage providing server 2000 based on content stored in a preference folder of a user, according to various example embodiments.

In operation S1800, the cloud storage providing server 2000 may analyze the content stored in the preference folder of the user. The cloud storage providing server 2000 may, for example, acquire information regarding an identification value of the content stored in the preference folder of the user, a type, a genre, a writer, characters, a number of use, capacity, or the like, and analyze the content stored in the preference folder based on the acquired information.

In operation S1810, the cloud storage providing server 2000 may identify contents that may be used by the user among the contents stored in the cloud storage provided by the cloud storage providing server 2000. The cloud storage providing server 2000 may identify contents that may be shared with the user among the contents stored in the cloud storage provided by the cloud storage providing server 2000. In this case, contents that may be shared with the user among contents stored in cloud storage of another user may be previously set by the user or the cloud storage providing server 2000. For example, contents that may be freely used by users who are registered to a service of the cloud storage providing server 2000 among the contents stored in the cloud storage of another user may be contents that may be shared with another user and the user of the device 1000. For example, contents that are set to be shared with another user and the user of the device 1000 among contents generated by another user may be contents that may be shared with another user and the user of the device 1000. However, the example embodiments are not limited thereto.

In operation S1820, the cloud storage providing server 2000 may determine the recommendation content among the identified contents. In operation S1830, the cloud storage providing server 2000 may push reference information and/or link information of the determined recommendation content to a recommendation folder of the user.

Figure 19:
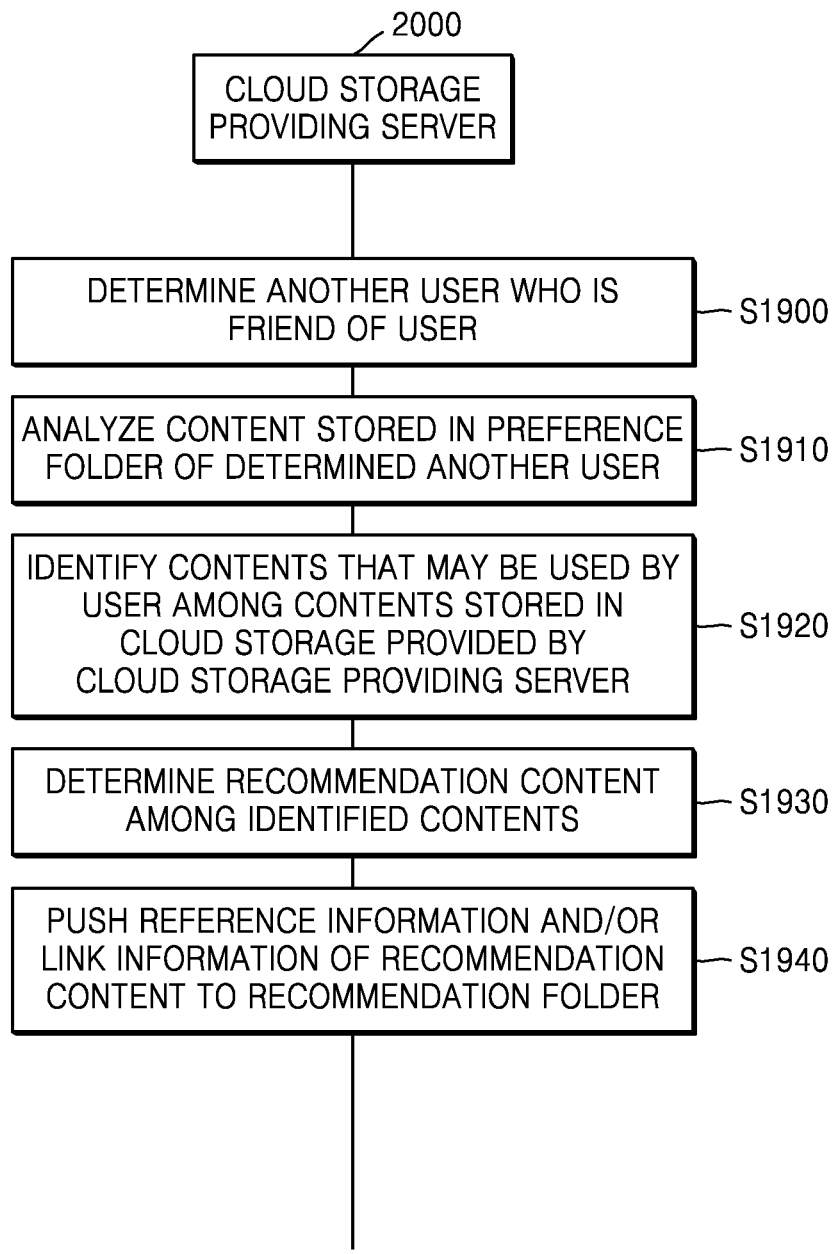
FIG. 19 is a flowchart of a method in which a cloud storage providing server determines recommendation content among contents stored in cloud storage provided by the cloud storage providing server based on content stored in a preference folder of another user, according to various example embodiments.

FIG. 19 is a flowchart of a method in which the cloud storage providing server 2000 determines recommendation content among contents stored in cloud storage provided by the cloud storage providing server 2000 based on content stored in a preference folder of another user, according to various example embodiments.

In operation S1900, the cloud storage providing server 2000 may identify another user who may, for example, be a friend of a user of the device 1000. Another user who is the friend of the user of the device 1000 may be, for example, another user who is set as a friend of the user of the device 1000, another user who belongs to the same user group as the user of the device 1000, and/or another user included in a contact list of the user of the device but is not limited thereto.

In operation S1910, the cloud storage providing server 2000 may analyze the content stored in the preference folder of the determined another user. The cloud storage providing server 2000 may acquire information regarding, for example, an identification value of the content stored in the preference folder of another user, a type, a genre, a writer, characters, a number of use, capacity, or the like, and analyze the content stored in the preference folder based on the acquired information.

In operation S1920, the cloud storage providing server 2000 may identify contents that may be used by the user among the contents stored in the cloud storage provided by the cloud storage providing server 2000.

In operation S1930, the cloud storage providing server 2000 may determine the recommendation content among the identified contents. In operation S1940, the cloud storage providing server 2000 may push reference information and/or link information of the determined recommendation content to a recommendation folder of the user. In this case, the recommendation folder may be a folder for displaying a recommendation content list recommended to a group to which the user belongs but is not limited thereto.

Figure 20:
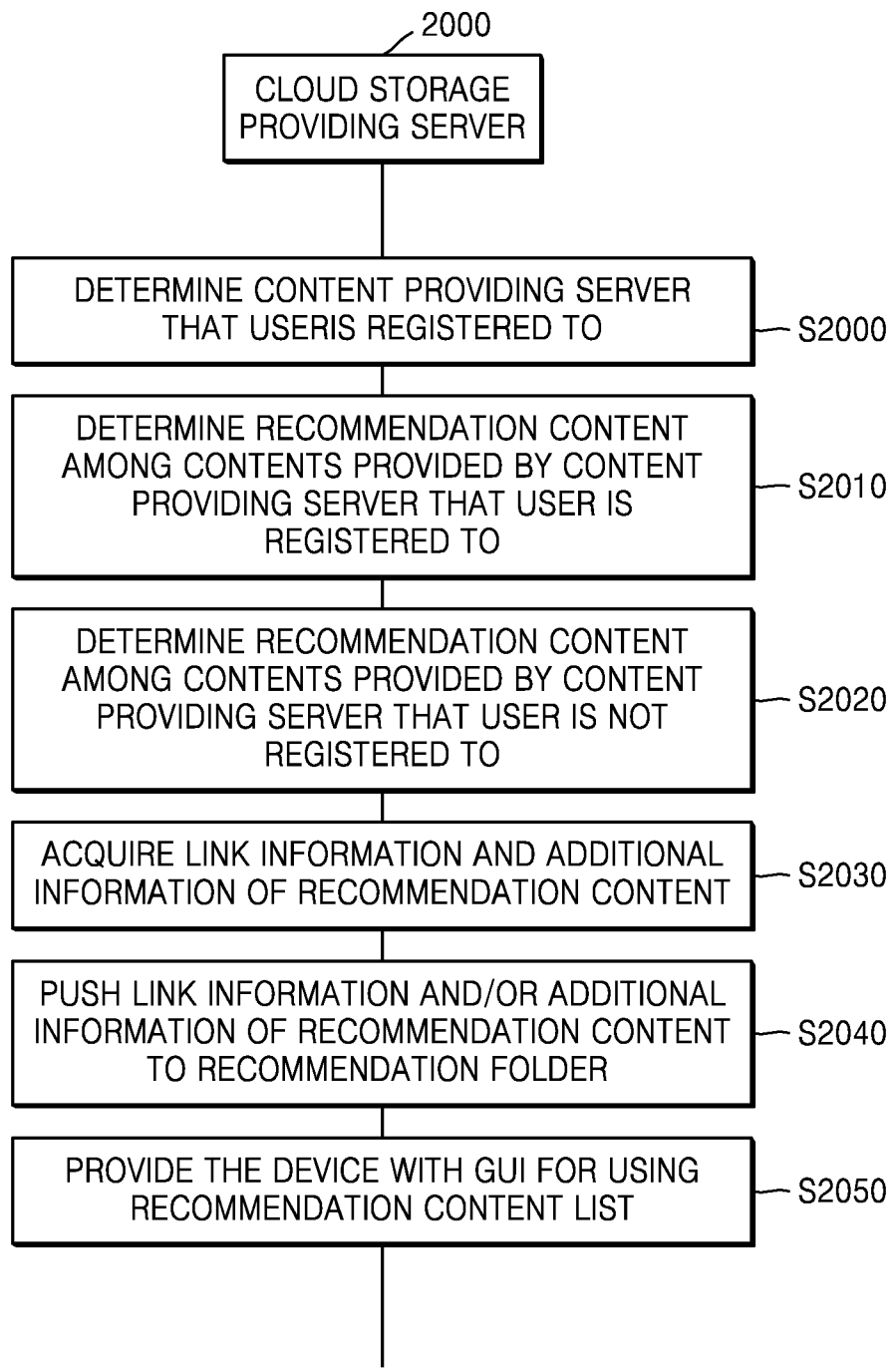
FIG. 20 is a flowchart of a method in which a cloud storage providing server determines recommendation content among contents provided by a content providing server, according to various example embodiments.

FIG. 20 is a flowchart of a method in which the cloud storage providing server 2000 determines recommendation content among contents provided by the content providing server 3000, according to various example embodiments.

In operation S2000, the cloud storage providing server 2000 may determine the content providing server 3000 that a user is registered to. The cloud storage providing server 2000 may previously store and determine an identification value of the content providing server 300 that the user of the device 1000 is registered to. The identification value of the content providing server 3000 may include, for example, a name of a service of the content providing server 3000, an address value of a domain providing the service of the content providing server 3000, etc. but is not limited thereto.

The cloud storage providing server 2000 may previously store and manage an ID and a password of the user with respect to the service of the content providing server 3000 that the user of the device 1000 is registered to.

In operation S2010, the cloud storage providing server 2000 may determine the recommendation content among the contents provided by the content providing server 3000 that the user is registered to. The cloud storage providing server 2000 may classify the contents provided by the content providing server 3000 that the user is registered to as contents that may be used by the user after paying a fee and contents that may be used by the user free of charge. The recommendation content may be determined among the contents that may be used by the user after paying for a fee and the contents that may be used by the user free of charge.

In operation S2020, the cloud storage providing server 2000 may determine the recommendation content among the contents provided by the content providing server 3000 that the user is not registered to. The cloud storage providing server 2000 may classify the contents provided by the content providing server 3000 that the user is not registered to as contents that may be used by the user who logs in and content that may be used by the user who does not log in. The cloud storage providing server 2000 may classify the contents provided by the content providing server 3000 that the user is not registered to as contents that may be used by the user after paying a fee and contents that may be used by the user free of charge.

In operation S2030, the cloud storage providing server 2000 may acquire link information and additional information of the recommendation content. The cloud storage providing server 2000 may generate a recommendation content list based on the recommendation content determined in operations S2010 and S2020 and may acquire link information and additional information for each piece of the recommendation content. The link information of the recommendation content may include address information for accessing the content providing server 3000 and address information for directly accessing the recommendation content included in the content providing server 3000 but is not limited thereto. The cloud storage providing server 2000 may acquire link information for accessing preview content of the recommendation content or pre-listen content.

The additional information of the recommendation content may include information regarding if the recommendation content is provided by the content providing server 3000 that the user is registered to, if the recommendation content is provided by the content providing server 3000 that the user is not registered to, if the recommendation content is used after paying for a fee, and if the recommendation content is used free of charge but is not limited thereto.

In operation S2040, the cloud storage providing server 2000 may push the link information and the additional information of the recommendation content to a recommendation folder of the user. The cloud storage providing server 2000 may push the recommendation content including the link information and the additional information of the recommendation content to the recommendation folder of the user.

In operation S2050, the cloud storage providing server 2000 may provide the device 1000 with a GUI for using the recommendation content list. The recommendation content list displayed on the GUI for using the recommendation content list may, for example, be an object indicating if the recommendation content is provided by the content providing server 3000 that the user is registered to, if the recommendation content is provided by the content providing server 3000 that the user is not registered to, if the recommendation content is used after paying for a fee, if the recommendation content is used free of charge for each piece of the recommendation content, etc.

Figure 21:
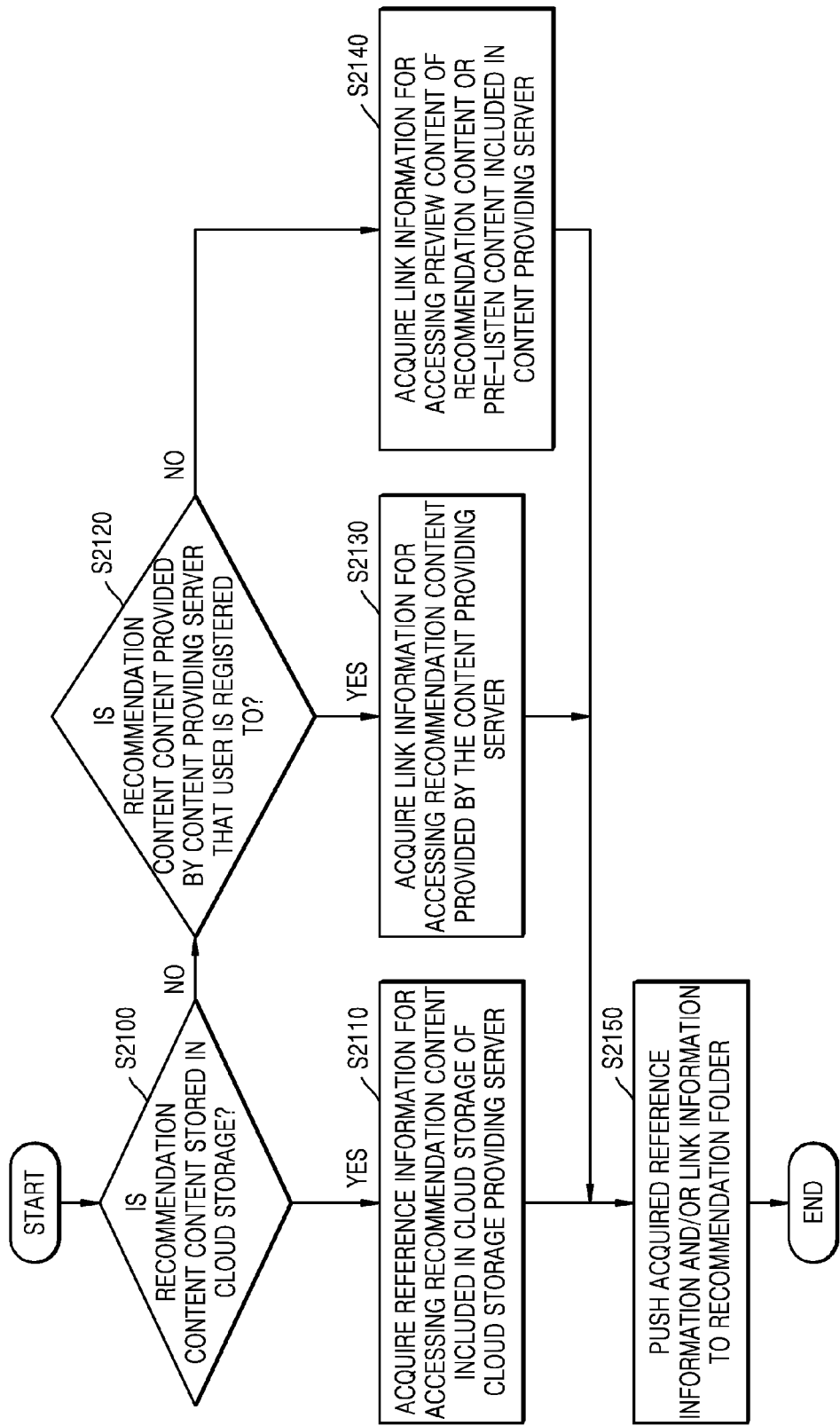
FIG. 21 is a flowchart of a method in which a cloud storage providing server acquires reference information and/or link information of recommendation content, according to various example embodiments.

FIG. 21 is a flowchart of a method in which the cloud storage providing server 2000 acquires reference information and/or link information of recommendation content, according to various example embodiments.

In operation S2100, the cloud storage providing server 2000 may determine if recommendation content is content stored in cloud storage provided by the cloud storage providing server 2000.

If the cloud storage providing server 2000 determines that the recommendation content is the content stored in the cloud storage in operation S2100, in operation S2110, the cloud storage providing server 2000 may acquire the reference information for accessing the recommendation content included in the cloud storage of the cloud storage providing server 2000.

Alternatively, if the cloud storage providing server 2000 determines that the recommendation content is not the content stored in the cloud storage in operation S2100, in operation S2120, the cloud storage providing server 2000 may determine if the recommendation content is content provided by the content providing server 3000 that a user is registered to.

If the cloud storage providing server 2000 determines that the recommendation content is the content provided by the content providing server 3000 that the user is registered to in operation S2120, in operation S2130, the cloud storage providing server 2000 may acquire the link information for accessing the recommendation content provided by the content providing server 3000 that the user is registered to.

Alternatively, if the cloud storage providing server 2000 determines that the recommendation content is content provided by the content providing server 3000 that the user is not registered to in operation S2120, in operation S2140, the cloud storage providing server 2000 may acquire the link information for accessing preview content of the recommendation content or pre-listen content. For example, when the recommendation content is a moving image, the preview content of the recommendation content may be an abstract moving image of the recommendation content. For example, when the recommendation content is a photo, the preview content of the recommendation content may be a thumbnail image of the photo. For example, when the recommendation content is music, the pre-listen content of the recommendation content may be a part of the music. However, the example embodiments are not limited thereto.

In operation S2150, the cloud storage providing server 2000 may push the acquired reference information and/or the link information to a recommendation folder of the user. The cloud storage providing server 2000 may push the acquired link information by being included in a recommendation content list but is not limited thereto.

Meanwhile, when the recommendation content is provided by the content providing server 3000 that the user is not registered to, the link information of the preview content of the recommendation content or the pre-listen content may be acquired in FIG. 21 but is not limited thereto. The cloud storage providing server 2000 may determine if the recommendation content is provided to the user free of charge or for a fee. When the recommendation content is provided to the user for a fee, the cloud storage providing server 2000 may acquire the link information of the preview content of the recommendation content or the pre-listen content.

Figure 22:
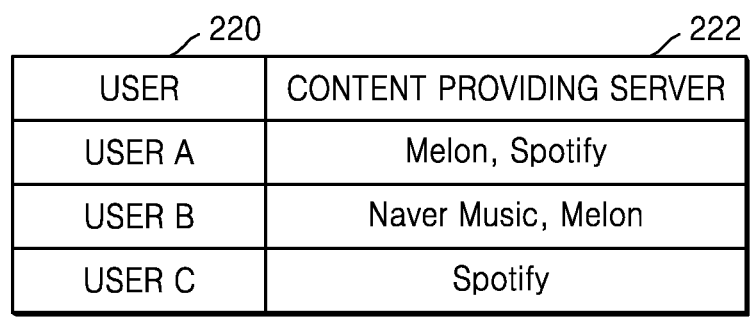

FIGS. 22 and 23 illustrate examples of a membership information table of a user with respect to a service of the content providing server 3000, according to various example embodiments. The membership information table of the user of FIGS. 22 and 23 may be generated and managed by the cloud storage providing server 2000.

Referring to FIG. 22, the cloud storage providing server 2000 may manage only an identification value of the content providing sever 3000 that the user is registered to. In this case, as shown in FIG. 22, the membership information table of the user may include a user field 220 and a content providing server field 222.

An identification value of the user may be recorded on the user field 220. The identification value of the user may be, for example, an ID or a nickname of the user with respect to the service of the content providing server 3000.

The identification value of the content providing sever 3000 that the user is registered to may be recorded on the content providing server field 222. The identification value of the content providing sever 3000 may include, for example, a name of the service of the content providing server 3000 or an address of the content proving server 3000.

When the cloud storage providing server 2000 manages only information regarding the content providing server 3000 that the user is registered to, the cloud storage providing server 2000 may not directly access recommendation content provided by the content providing sever 3000. In this case, the device 1000 may receive the recommendation content from the content providing server 3000 and provide the cloud storage providing server 2000 with the recommendation content to allow the cloud storage providing server 2000 to store the recommendation content in a recommendation folder. Alternatively, the device 1000 may request the content providing server 3000 to provide the cloud storage providing server 2000 with the recommendation content to allow the cloud storage providing server 2000 to store the recommendation content in the recommendation folder.

Referring to FIG. 23, the cloud storage providing server 2000 may, for example, manage the identification value of the content providing server 3000 that the user is registered to, the ID of the user, and a password of the user. In this case, as shown in FIG. 23, the membership information table of the user may include the user field 220, the content providing server field 222, a user ID field 224, and a password field 226.

The ID of the user with respect to the service of the content providing server 3000 may be recorded on the user ID field 224. The password of the user with respect to the service of the content providing server 3000 may be recorded on the password field 226.

Cloud storage may receive the recommendation content from the content providing server 3000 by using the ID and the password of the user and store the received recommendation content in the recommendation folder of the user.

Figure 24:
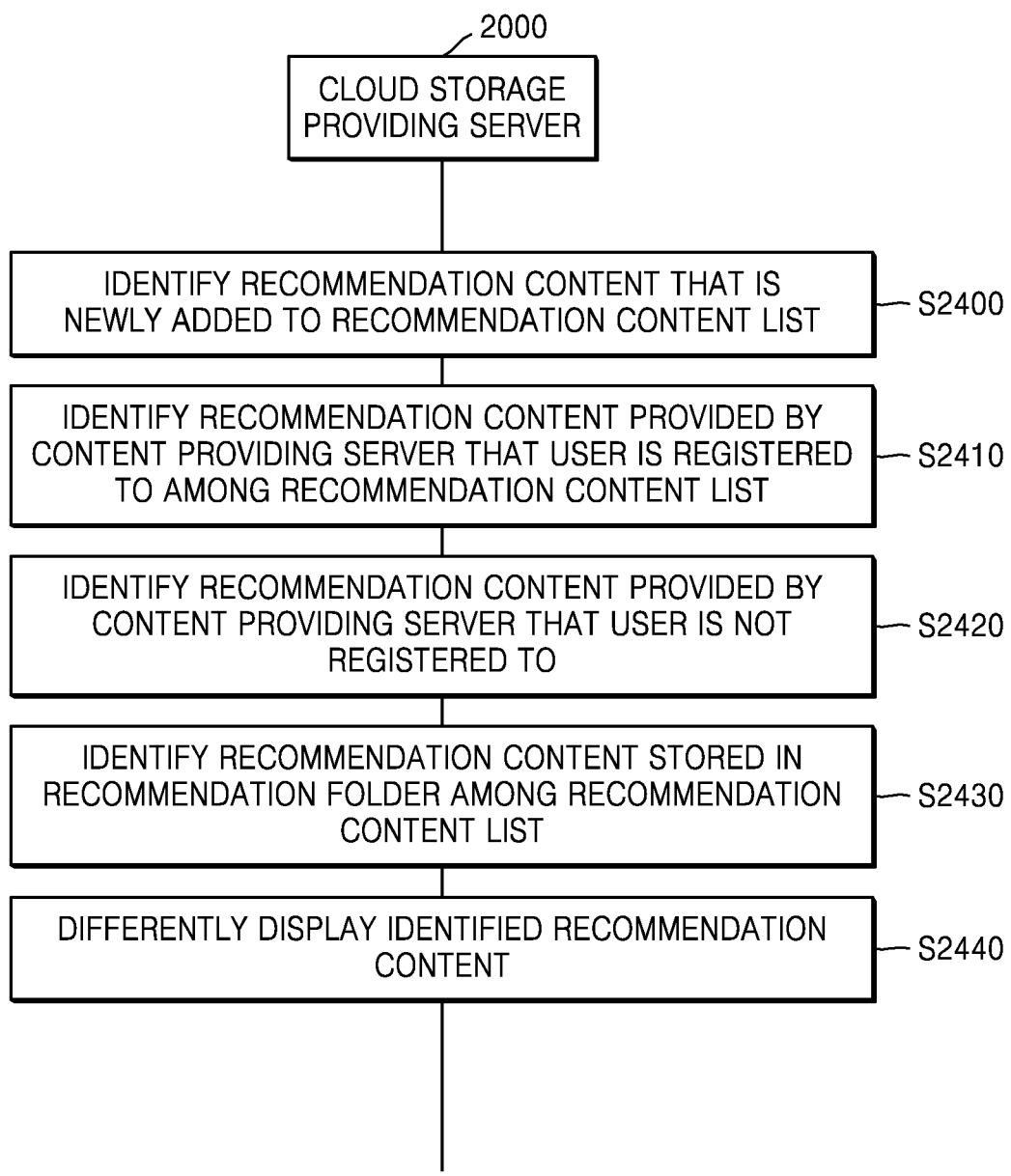
FIG. 24 is a flowchart of a method in which a cloud storage providing server differently displays recommendation contents included in a recommendation content list based on properties of the recommendation contents, according to various example embodiments.

FIG. 24 is a flowchart of a method in which the cloud storage providing server 2000 differently displays recommendation contents included in a recommendation content list based on properties of the recommendation contents, according to various example embodiments.

In operation S2400, the cloud storage providing server 2000 may identify recommendation content that is newly added to the recommendation content list. The cloud storage providing server 2000 may update the recommendation content list since content stored in a preference folder of a user is updated. Since the recommendation content list is updated, the cloud storage providing server 2000 may identify recommendation content that is newly added to the updated recommendation content list.

In operation S2410, the cloud storage providing server 2000 may identify the recommendation content provided by the content providing server 3000 that the user is registered to among the recommendation content list. In operation S2420, the cloud storage providing server 2000 may identify the recommendation content provided by the content providing server 3000 that the user is not registered to among the recommendation content list. The cloud storage providing server 2000 may store and manage user membership information with respect to a service of the content providing server 3000 and determine whether the recommendation content is provided by the content providing server 3000 that the user is registered to based on the user membership information.

In operation S2430, the cloud storage providing server 2000 may identify the recommendation content stored in a recommendation folder of the user among the recommendation content list. The cloud storage providing server 2000 may identify the recommendation content stored in another folder of the user.

In operation S2440, the cloud storage providing server 2000 may differently display the identified recommendation content. The cloud storage providing server 2000 may display an object indicating a property of the recommendation content for each piece of the recommendation content on a recommendation content list included in a GUI for using the recommendation content list. The property of the recommendation content may be identified according to, for example, if the recommendation content is newly added to the recommendation content list, if the recommendation content is provided by the content providing server 3000 that the user is registered to, if the recommendation content is provided by the content providing server 3000 that the user is not registered to, and if the recommendation content is stored in the recommendation folder of the user.

Meanwhile, the cloud storage providing server 2000 may identify whether the recommendation content is provided to the user free of charge or for a fee and display an object indicating whether the recommendation content is provided to the user free of charge or for a fee around the recommendation content.

Figure 25A:
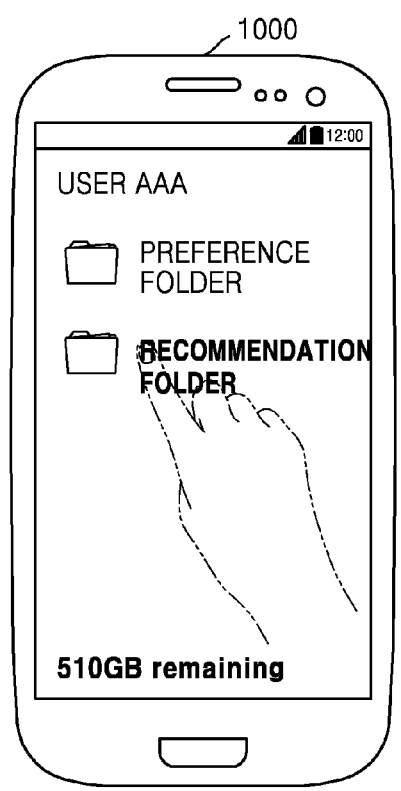
FIGS. 25A and 25B illustrate examples of differently displaying recommendation contents included in a recommendation content list based on properties of the recommendation contents, according to various example embodiments.
Figure 25B:
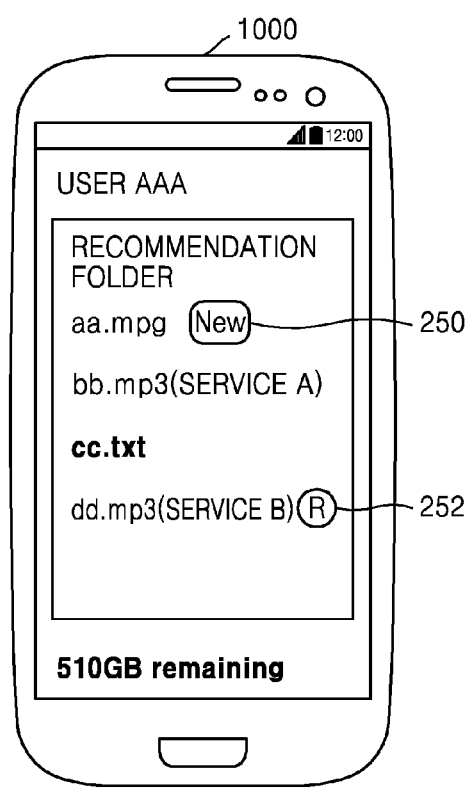

FIGS. 25A and 25B illustrate examples of differently displaying recommendation contents included in a recommendation content list based on properties of the recommendation contents, according to various example embodiments.

Referring to FIG. 25A, the device 1000 may receive a GUI for using the recommendation content list from the cloud storage providing server 2000 and display the received GUI on a screen of the device 1000. The device 1000 may receive a user input for selecting a recommendation folder included in the displayed GUI.

Referring to FIG. 25B, since the user input for selecting the recommendation folder is received, the device 1000 may display the recommendation content list included in the recommendation folder on the screen. The recommendation content list may include, for example, "aa.mpg", "bb.mp3", "cc.txt", and "dd.mp3".

"aa.mpg" may be recommendation content newly added to the recommendation content list. An icon 250 indicating that "aa.mpg" is the newly added recommendation content may be displayed on the right of "aa.mpg".

"bb.mp3" may be recommendation content provided by the content providing server 3000 that a user is not registered to. A "service A" that is a name of a service of the content providing server 3000 that provides "bb.mp3" may be displayed on the right of "bb.mp3".

"cc.txt" may be recommendation content stored in the recommendation folder and may be displayed in bold.

"dd.mp3" may be recommendation content provided by the content providing server 3000 that the user is registered to. A "service B" that is a name of a service of the content providing server 3000 that provides "dd.mp3" may be displayed on the right of "dd.mp3". An icon 252 indicating that "dd.mp3" is recommendation content provided by the content providing server 3000 that the user is registered to may be displayed on the right of "dd.mp3".

FIGS. 26A and 26B illustrate examples of updating a recommendation content list, according to various example embodiments.

Referring to FIG. 26A, the recommendation content list including "aa.mpg", "bb.mp3", "cc.txt", and "dd.mp3" may be displayed on a screen of the device 1000.

Referring to FIG. 26B, since the recommendation content list is updated, "ee.mp3" may be newly added to the recommendation content list. Accordingly, an icon 260 indicating that "ee.mp3" is the newly added recommendation content may be displayed on the right of "ee.mp3" in the recommendation content list.

In one example, only a file name of the recommendation content ee.mp3 is added to the recommendation content list, and content data is not stored in a recommendation folder, and thus an available space of cloud storage that may be used by a user AAA may be maintained as 510 GB.

Figure 27:
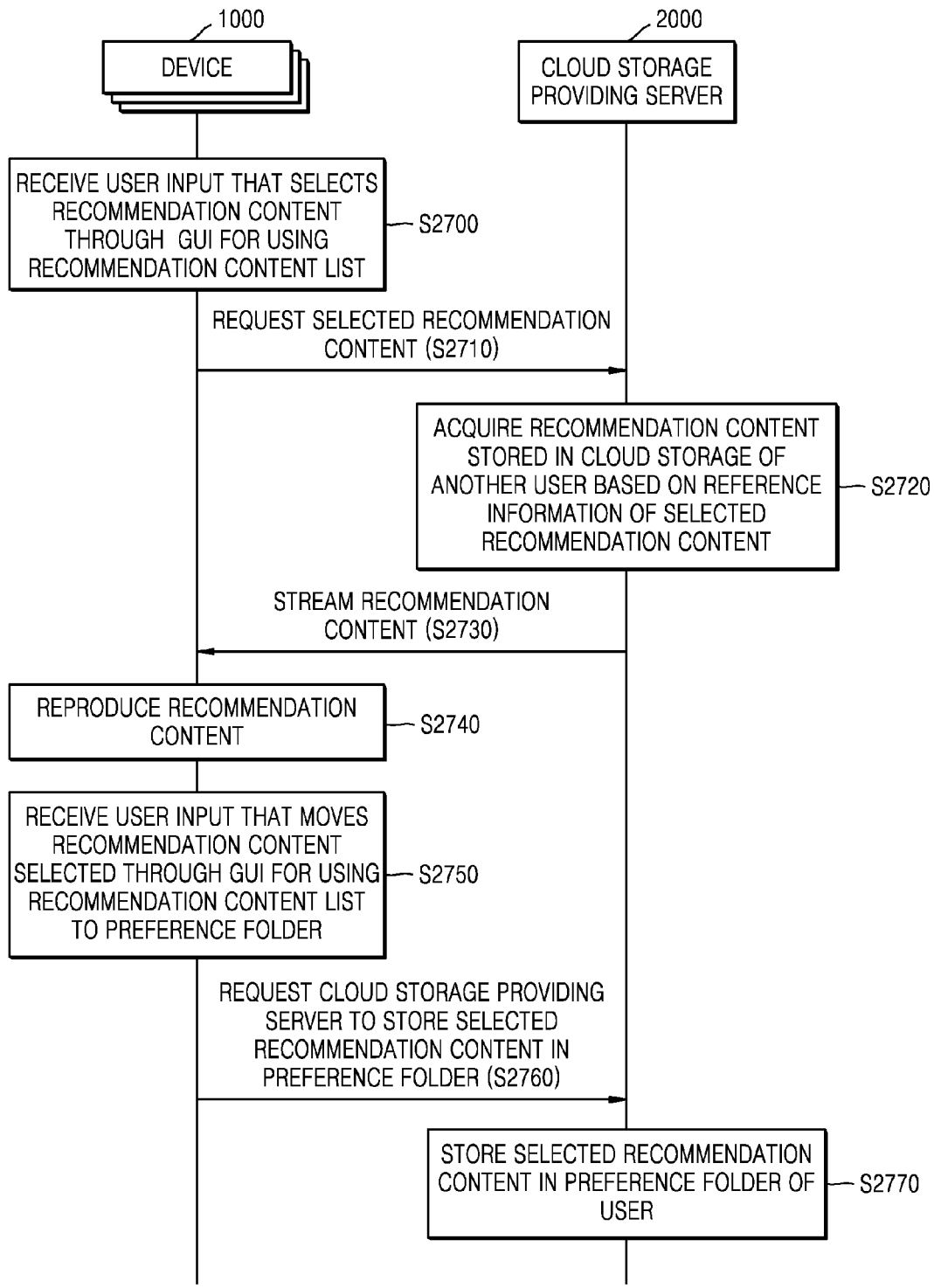
FIG. 27 is a flowchart of a method in which a device requests a cloud storage providing server to store recommendation content selected from a recommendation content list displayed on a recommendation folder in response to a user input for moving the recommendation content to a preference folder, according to various example embodiments.

FIG. 27 is a flowchart of a method in which the device 1000 requests the cloud storage providing server 2000 to store recommendation content selected from a recommendation content list displayed on a recommendation folder in response to a user input for moving the recommendation content to a preference folder, according to various example embodiments.

In operation S2700, the device 1000 may receive a user input for selecting the recommendation content through a GUI for using the recommendation content list. In operation S2710, the device 1000 may request the selected recommendation content from the cloud storage providing server 2000. In operation S2720, the cloud storage providing server 2000 may acquire the recommendation content stored in cloud storage of another user based on reference information of the selected recommendation content. In operation S2730, the cloud storage providing server 2000 may stream the recommendation content to the device 1000. In operation S2740, the device 1000 may reproduce the recommendation content.

In operation S2750, the device 1000 may receive the user input for moving the recommendation content selected through the GUI for using the recommendation content list from the recommendation folder to the preference folder.

In operation S2760, the device 1000 may request the cloud storage providing server 2000 to store the selected recommendation content in the preference folder of the user. In operation S2770, the cloud storage providing server 2000 may store the selected recommendation content in the preference folder of the user.

FIGS. 28A and 28B illustrate examples in which the device 1000 reproduces recommendation content in response to a user input for selecting the recommendation content, according to various example embodiments.

Referring to FIG. 28A, the device 1000 may display a recommendation content list on a screen of the device 1000 and receive a user input for selecting "aa.mpg" from the recommendation content list.

Referring to FIG. 28B, since "aa.mpg" is selected from the recommendation content list, the device 1000 may receive aa.mpg from the cloud storage providing server 2000 and execute the received aa.mpg, thereby displaying, for example, a moving image of aa.mpg on a screen of the device 1000.

Figure 29A:
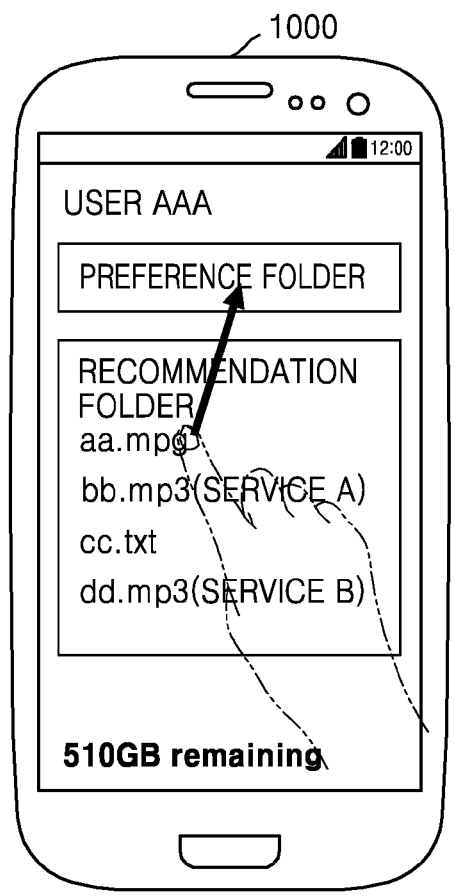
FIGS. 29A and 29B illustrate examples in which a device receives a user input for moving recommendation content selected from a recommendation content list included in a recommendation folder to a preference folder, and a cloud storage providing server stores the selected recommendation content in the preference folder, according to various example embodiments.
Figure 29B:
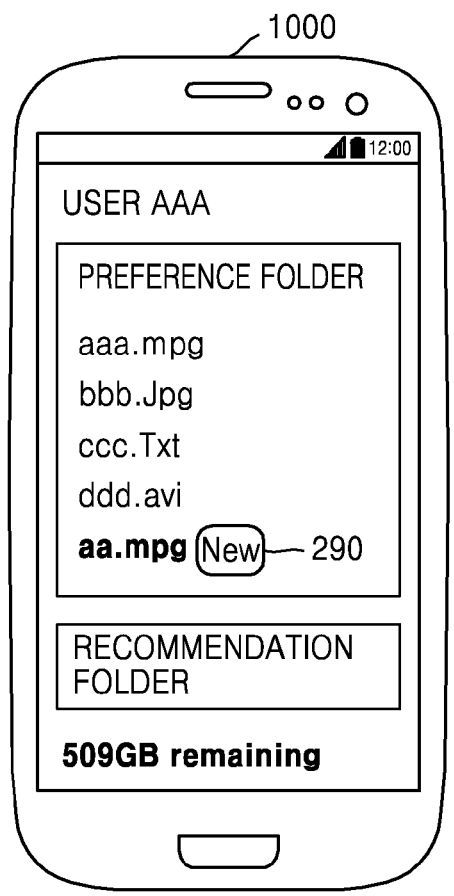

FIGS. 29A and 29B illustrate examples in which the device 1000 receives a user input for moving recommendation content selected from a recommendation content list included in a recommendation folder to a preference folder, and the cloud storage providing server 2000 stores the selected recommendation content in the preference folder, according to various example embodiments.

Referring to FIG. 29A, the device 1000 may display the recommendation content list through a GUI for using the recommendation content list. The device 1000 may receive a user input for selecting "aa.mpg" from the recommendation content list and moves "aa.mpg" from the recommendation folder to the preference folder. Accordingly, the device 1000 may request the cloud storage providing server 2000 to store aa.mpg in the preference folder of a user.

Referring to FIG. 29B, the cloud storage providing server 2000 may delete "aa.mpg" from the recommendation content list in response to a request from the device 1000 and store aa.mpg in the preference folder of the user. Accordingly, "aa.mpg" may be recorded on the preference folder included in the GUI for using the recommendation content list. An icon 290 indicating that aa.mpg is newly stored in the preference folder may be displayed on the right of "aa.mpg".

aa.mpg is stored in the preference folder of the user, and thus an available space of cloud storage that may be used by the user may be changed from 510 GB to 509 GB.

An example of storing the recommendation content in the preference folder of the user is described with reference to FIG. 29 but is not limited thereto. If the device 1000 receives a user input for storing the recommendation content in the recommendation folder of the user, the cloud storage providing server 2000 may store the recommendation content in the recommendation folder of the user.

FIG. 30 is a flowchart of a method in which the device 1000 receives recommendation content from the content providing server 3000 and stores the recommendation content in cloud storage, according to various example embodiments.

In operation S3000, the device 1000 may receive a user input for selecting the recommendation content through a GUI for using a recommendation content list.

In operation S3010, the device 1000 may request the selected recommendation content from the content providing server 3000. The device 1000 may acquire link information of the selected recommendation content and identify the content providing server 3000 that is to provide the selected recommendation content. The device 1000 may access the content providing server 3000 based on the link information of the recommendation content. The device 1000 may access the recommendation content that is to be provided by the content providing server 3000 based on the link information of the recommendation content.

For example, since the recommendation content is selected, the device 1000 may execute an application for using a service of the content providing server 3000 that is to provide the selected recommendation content. The device 1000 may access the content providing server 3000 through the executed application and request the selected recommendation content from the content providing server 3000.

In operation S3020, the device 1000 may log into the content providing server 3000. The device 1000 may, for example, provide the content providing server 3000 with an ID and a password of the user with respect to the service of the content providing server 3000, thereby logging in the content providing server 3000.

For example, since the recommendation content is selected, the device 1000 may execute an application for using the service of the content providing server 3000 that is to provide the selected recommendation content. The device 1000 may log into the content providing server 3000 through the executed application. If the recommendation content is provided after paying a fee, the device 1000 may purchase the recommendation content through the executed application.

In operation S3030, the content providing server 3000 may provide the selected recommendation content. The content providing server 3000 may log in based on the ID and the password of the user received from the device 1000. The content providing server 3000 may stream the recommendation content to the device 1000 but is not limited thereto.

If the selected recommendation content is provided after paying for a fee, the content providing server 3000 may provide the device 1000 with the recommendation content after completely purchasing the recommendation content.

In operation S3040, the device 1000 may reproduce the selected recommendation content.

In operation S3050, the device 1000 may receive a user input for storing the selected recommendation content. In operation S3060, the device 1000 may request the cloud storage providing server 2000 to store the selected recommendation content.

In operation S3070, the device 1000 may provide the cloud storage providing server 2000 with the selected recommendation content. The device 1000 may provide the cloud storage providing server 2000 with the selected recommendation content while requesting the cloud storage providing server 2000 to store the selected recommendation content.

In operation S3080, the cloud storage providing server 2000 may store the selected recommendation content in a recommendation folder of the user.

Meanwhile, the device 1000 receives the recommendation content from the content providing server 3000 and provides the cloud storage providing server 2000 with the received recommendation content in FIG. 30 but is not limited thereto. The device 1000 may request the content providing server 3000 to provide the cloud storage providing server 2000 with the recommendation content. The content providing server 3000 may provide the cloud storage providing server 2000 with the recommendation content in response to a request from the device 1000.

Figure 31:
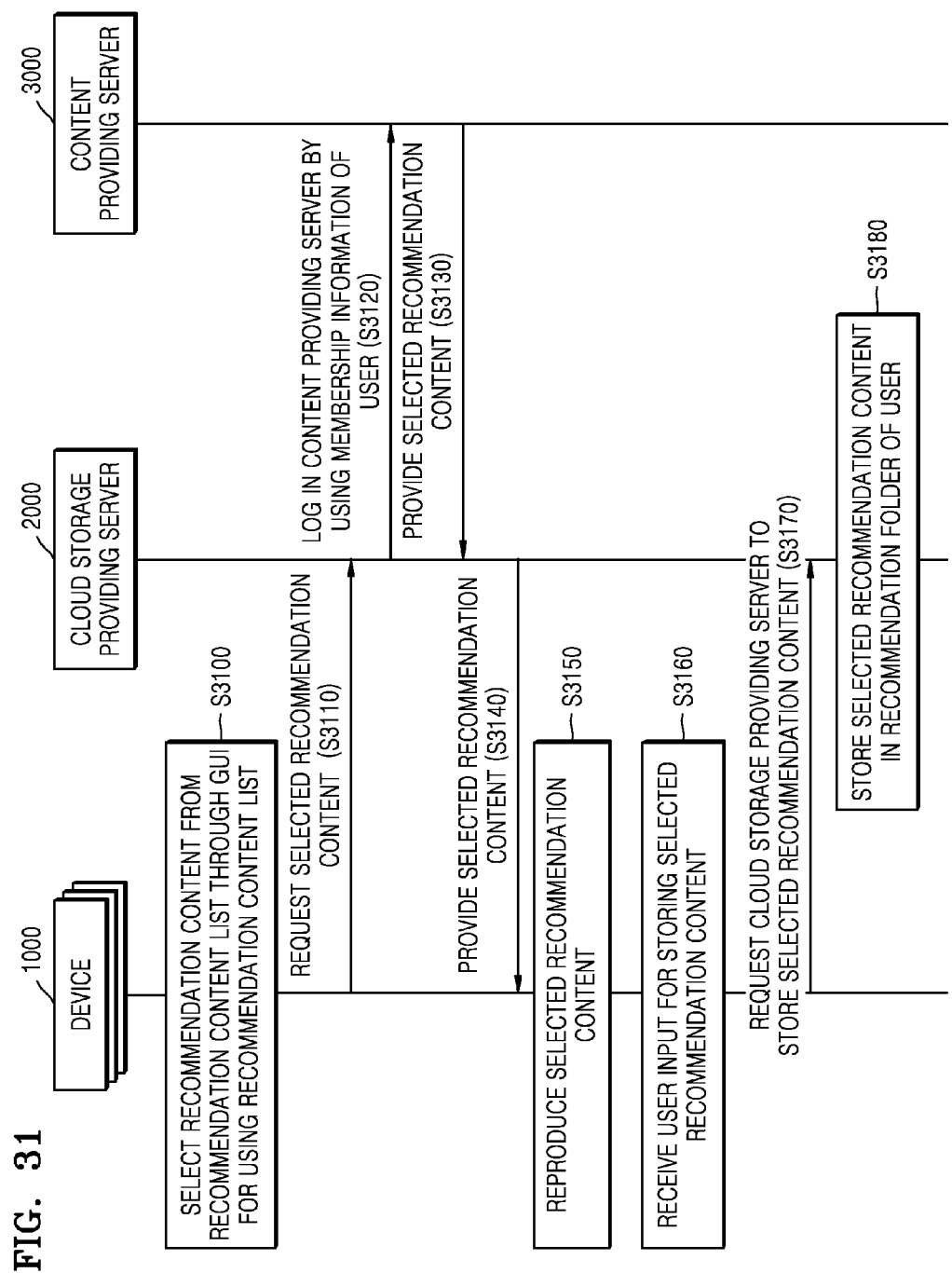
FIG. 31 is a flowchart of a method in which a cloud storage providing server receives recommendation content from a content providing server, and a device receives the recommendation content from the cloud storage providing server, according to various example embodiments.

FIG. 31 is a flowchart of a method in which the cloud storage providing server 2000 receives recommendation content from the content providing server 3000, and the device 1000 receives the recommendation content from the cloud storage providing server 2000, according to various example embodiments.

In operation S3100, the device 1000 may select the recommendation content from a recommendation content list through a GUI for using the recommendation content list. In operation S3110, the device 1000 may request the selected recommendation content from the cloud storage providing server 2000.

In operation S3120, the cloud storage providing server 2000 may log in the content providing server 3000 by using membership information of a user. The cloud storage providing server 2000 may acquire link information of the selected recommendation content and identify the content providing server 3000 that is to provide the selected recommendation content. The cloud storage providing sever 2000 may access the recommendation content that is to be provided by the content providing server 3000 based on the link information of the recommendation content.

The cloud storage providing server 2000 may provide the content providing server 3000 with an ID and a password of a user with respect to a service of the content providing server 3000, thereby logging into the content providing server 3000.

If the recommendation content is provided for a fee, the cloud storage providing server 2000 may send a purchase request to the device 1000, requesting whether to purchase the recommendation content. If the device 1000 confirms the purchase request, the cloud storage providing sever 2000 may purchase the recommendation content provided by the content providing server 3000.

In operation S3130, the content providing server 3000 may provide the cloud storage providing server 2000 with the recommendation content. The content providing server 3000 may log in based on the ID and the password of the user received from the cloud storage providing server 2000. If the selected recommendation content is provided for a fee, the content providing server 3000 may provide the cloud storage providing server 2000 with the recommendation content after completing the purchase of the recommendation content.

In operation S3140, the cloud storage providing server 2000 may provide the device 1000 with the selected recommendation content. In operation S3150, the device 1000 may reproduce the selected recommendation content.

In operation S3160, the device 1000 may receive a user input for storing the selected recommendation content. In operation S3170, the device 1000 may request the cloud storage providing server 2000 to store the selected recommendation content.

In operation S3180, the cloud storage providing server 2000 may store the selected recommendation content in the recommendation folder of the user.

Meanwhile, the cloud storage providing server 2000 receives the recommendation content from the content providing server 3000 and provides the device 1000 with the received recommendation content in FIG. 31 but is not limited thereto. The cloud storage providing server 2000 may, for example, request the content providing server 3000 to provide the device 1000 with the recommendation content. In this case, the content providing server 3000 may provide the device 1000 with the recommendation content in response to a request from the cloud storage providing server 2000.

FIGS. 32A through 33D illustrate examples in which the device 1000 uses recommendation content provided by the content providing server 3000, according to various example embodiments;

FIGS. 32A through 32D illustrate examples in which the device 1000 receives and reproduces recommendation content from the content providing server 3000 that the user is registered to, according to some exemplary embodiments.

Referring to FIG. 32A, the device 1000 may select "dd.mp3" from a recommendation content list based on, for example, a user touch input. dd.mp3 may be recommendation content provided through a service A of the content providing server 3000 that the user is registered to.

Referring to FIG. 32B, since "dd.mp3" is selected, the device 1000 may execute an application for the service A and directly access the content providing server 3000 that the user is registered to through the executed application. The device 1000 may input an ID and a password of the user with respect to the service A through an execution screen of the executed application.

Referring to FIG. 32C, if the user logs into the service A, the device 1000 may display a screen for purchasing dd.mp3 and select a purchase of dd.mp3 based on a user input. If dd.mp3 is content that may be used free of charge or that has been already purchased, FIG. 32C may be omitted.

Referring to FIG. 32D, since dd.mp3 is purchased, the device 1000 may receive and reproduce dd.mp3 from the content providing server 3000.

Meanwhile, if the user selects "dd.mp3" from the recommendation content list of FIG. 32A, the device 1000 may not display the screens of FIGS. 32B and 32C and directly reproduce the selected content "dd.mp3" as shown in FIG. 32D.

In more detail, for example, when the device 1000 has logged into the service A, the device 1000 may not display a log-in screen of FIG. 32B. Alternatively, for example, the device 1000 may not display the log-in screen of FIG. 32B by automatically logging into the service A on the background. In this case, the device 1000 may previously store an ID and a password of the user of the service A. The user of the device 1000 may set the device 1000 in advance to automatically log in the service A if the recommendation content provided by the service A is selected from a recommendation folder.

For example, when "dd.mp3" selected by the user is recommendation content already purchased by the user, the device 1000 may not display a content purchase screen of FIG. 32C. Alternatively, for example, the device 1000 may not display the content purchase screen of FIG. 32C by automatically purchasing "dd.mp3" on the background. In this case, the device 1000 may set a condition for automatically purchasing the recommendation content in advance. The condition may be, for example, a type of the recommendation content, a purchase price of the recommendation content, a recommendation level of the recommendation content, etc. and the device 1000 may be set to automatically purchase the recommendation content when the determined condition is satisfied. The recommendation level of the recommendation content may indicate a level for recommending the recommendation content to the user. The device 1000 may set a payment method that is to be used to automatically purchase the recommendation content. The device 1000 may select the payment method such as a credit card payment, a point payment, a mobile phone payment, etc. as the payment method of automatically purchasing the recommendation content. The device 1000 may be set to automatically purchase the recommendation content only through the point payment. However, the example embodiments are not limited thereto.

FIGS. 33A through 33D illustrate examples in which the device 1000 receives and reproduces recommendation content from the content providing server 3000 that the user is not registered to, according to various example embodiments.

Figure 33A:
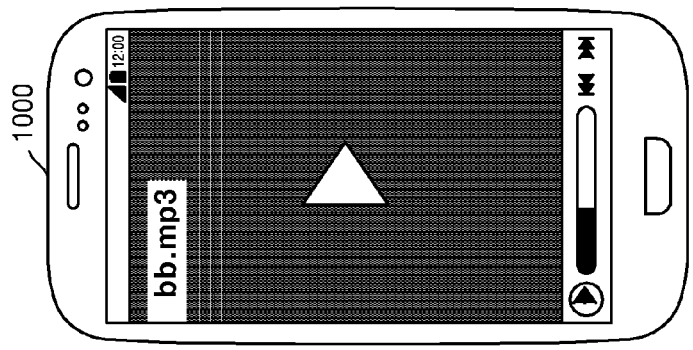
FIGS. 33A through 33D illustrate examples in which a device receives and reproduces recommendation content from a content providing server that a user is not registered to, according to various example embodiments.

Referring to FIG. 33A, the device 1000 may select "bb.mp3" from a recommendation content list based on, for example, a user touch input. bb.mp3 may be recommendation content provided through a service B of the content providing server 3000 that the user is not registered to.

Figure 33B:
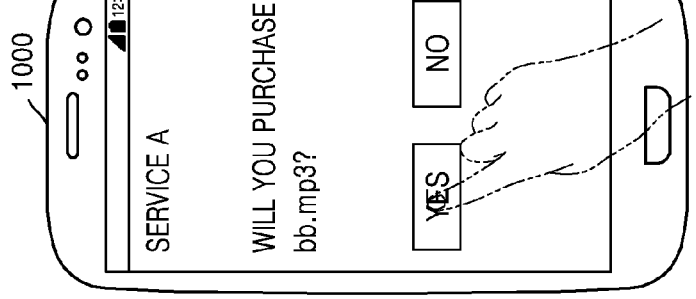

Referring to FIG. 33B, since "bb.mp3" is selected, the device 1000 may execute an application for the service B and directly access the content providing server 3000 that the user is not registered to through the executed application. The user may be registered to the service B through an execution screen of the executed application.

Figure 33C:
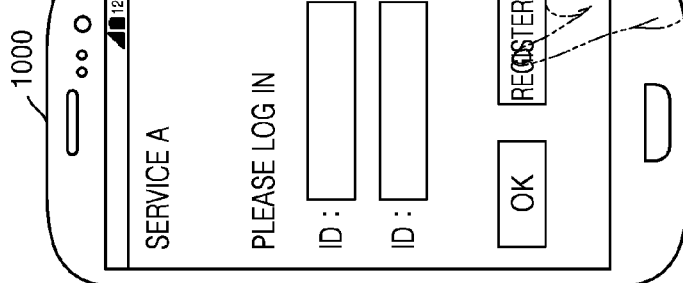

Referring to FIG. 33C, if the user has been registered to the service B, the device 1000 may display a screen for purchasing bb.mp3 and select a purchase of bb.mp3 based on a user input. If bb.mp3 is content that may be used free of charge, FIG. 33C may be omitted.

Figure 33D:
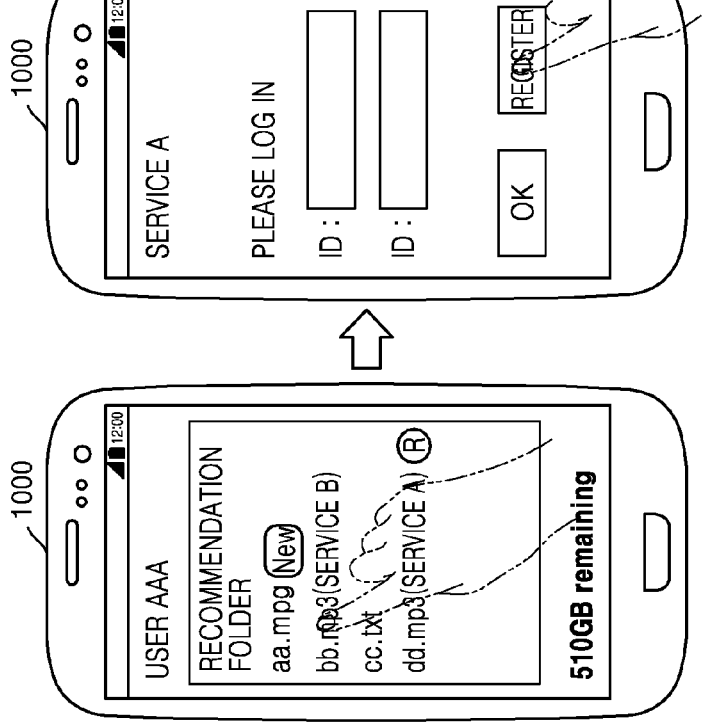

Referring to FIG. 33D, since bb.mp3 is purchased, the device 1000 may receive and reproduce bb.mp3 from the content providing server 3000.

Meanwhile, if the user selects "bb.mp3" from the recommendation content list of FIG. 33A, the device 1000 may not display the screens of FIGS. 33B and 33C and directly reproduce the selected content "bb.mp3" as shown in FIG. 33D.

In more detail, for example, the device 1000 may not display the screen of FIG. 33B by automatically subscribing to and logging into the service B on the background. In this case, the device 1000 may previously store user information for membership to the service B, and automatically register the user to the service B by using the stored user information. The user information for membership may include, for example, a name of the user, a nickname, an email address, an ID, a password, etc. The user of the device 1000 may set the device 1000 in advance to automatically join to a service that provides the recommendation content included in a recommendation folder. In this case, the device 1000 may set a condition for automatically subscribing to the service that provides the recommendation content in advance. The device 1000 may set the condition, for example, a name of the service that provides the recommendation content, a type of personal information necessary for membership, a name of a business provider of the service that provides the recommendation content, a reliability level of the business provider of the service that provides the recommendation content, etc. in advance. However, the example embodiments are not limited thereto.

For example, the device 1000 may not display a content purchase screen of FIG. 33C by automatically purchasing "bb.mp3" in the background. In this case, the device 1000 may set a condition for automatically purchasing the recommendation content in advance. The device 1000 may determine the condition, for example, a type of the recommendation content, a purchase price of the recommendation content, a recommendation level of the recommendation content, etc. and may be set to automatically purchase the recommendation content when the determined condition is satisfied. The recommendation level of the recommendation content may indicate a level for recommending the recommendation content to the user. The device 1000 may set a payment method that is to be used to automatically purchase the recommendation content. The device 1000 may select the payment method such as a credit card payment, a point payment, a mobile phone payment, etc. as the payment method of automatically purchasing the recommendation content. The device 1000 may be set to automatically purchase the recommendation content only through the point payment. However, the example embodiments are not limited thereto.

FIG. 34 is a flowchart of a method in which the device 1000 receives preview content or pre-listen content of recommendation content from the content providing server 3000 and purchases the recommendation content, according to various example embodiments.

In operation S3400, the device 1000 may select the recommendation content from a recommendation content list. The device 1000 may select the recommendation content that is to be provided by the content providing server 3000.

In operation S3410, the device 1000 may access the content providing server 3000. The device 1000 may acquire link information of the selected recommendation content and access the content providing server 3000 by using the acquired link information. For example, the device 1000 may identify the content providing server 3000 that provides the selected recommendation content and execute an application for using a service of the content providing server 3000. The device 1000 may access the content providing server 3000 through the executed application. For example, the device 1000 may execute a web browser and access the content providing server 3000 by using a web address of the content providing server 3000 that provides the selected recommendation content. However, the example embodiments are not limited thereto.

In operation S3420, the device 1000 may request the preview content or the pre-listen content of the selected recommendation content from the content providing server 3000. For example, when the recommendation content is a moving image, preview content of the recommendation content may be an abstract moving image of the recommendation content. For example, when the recommendation content is a photo, the preview content of the recommendation content may be a thumbnail image of the photo. For example, when the recommendation content is music, pre-listen content of the recommendation content may be a part of music. However, the example embodiments are not limited thereto.

In operation S3430, the content providing server 3000 may provide the device 1000 with the preview content or the pre-listen content of the recommendation content. The content providing server 3000 may stream the preview content or the pre-listen content of the recommendation content to the device 1000.

In operation S3440, the device 1000 may reproduce the preview content or the pre-listen content of the recommendation content.

Meanwhile, if the recommendation content is selected according to a user input in operation S3400, operations S3410 through S3440 may be automatically performed without an additional user input.

In operation S3450, the device 1000 may provide the content providing server 3000 with information used to allow the user to be registered to a service of the content providing server 3000. The device 1000 may receive a user input for inputting the information used to allow the user to be registered to the service of the content providing server 3000 and provide the content providing server 3000 with the received information, thereby enabling the user to be registered to the service of the content providing server 3000.

If the user has been already registered to the service of the content providing server 3000, operation S3450 may be omitted.

In operation S3460, the device 1000 may provide the content providing server 3000 with payment information for purchasing the recommendation content. The payment information for purchasing the recommendation content may include, for example, information regarding a type of a payment method and payment authentication information but is not limited thereto.

In operation S3470, the content providing server 3000 may provide the device 1000 with the purchased recommendation content. The device 1000 may provide the recommendation content.

In operation S3480, the device 1000 may reproduce the purchased recommendation content.

Meanwhile, operations S3410 through S3480 may be performed based on a user input through a GUI provided by the content providing server 3000 to the device 1000. When the recommendation content is selected in operation S3400, the device 1000 may execute a service application of the content providing server 3000 or execute a web browser to access the content providing server 3000, and display the GUI received from the content providing server 3000 through the executed service application or the web browser.

Figure 35A:
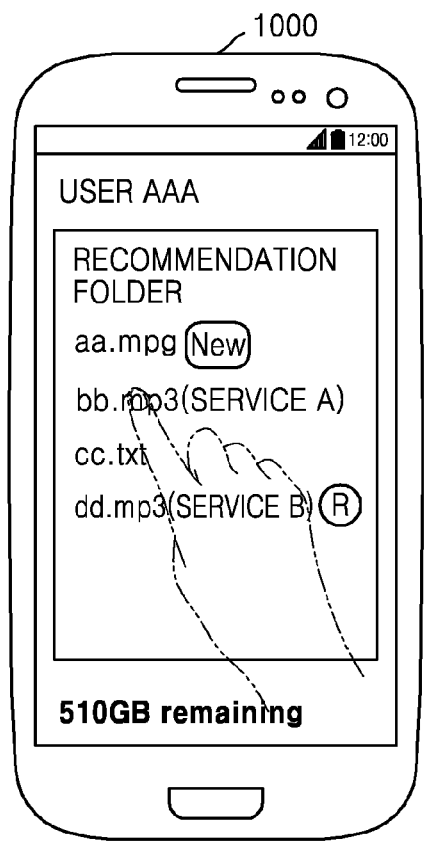
FIGS. 35A and 35B illustrate examples in which a device receives and reproduces pre-listen content of recommendation content from a content providing server, according to various example embodiments.
Figure 35B:
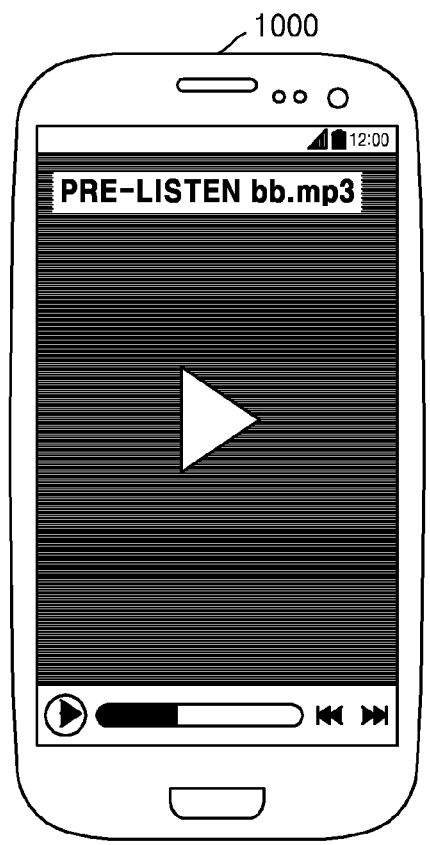

FIGS. 35A and 35B illustrate examples in which the device 1000 receives and reproduces pre-listen content of recommendation content from the content providing server 3000, according to various example embodiments.

Referring to FIG. 35A, the device 1000 may select "bb.mp3" from a recommendation content list based on, for example, a user touch input. bb.mp3 may be recommendation content provided through a service of the content providing server 3000.

Referring to FIG. 35B, since "bb.mp3" is selected, the device 1000 may reproduce pre-listen content of bb.mp3. Since "bb.mp3" is selected, the device 1000 may execute an application for the service of the content providing server 3000 and directly access the content providing server 3000 through the executed application. The device 1000 may receive and reproduce the pre-listen content of bb.mp3 from the content providing server 3000 through the executed application.

Thereafter, as shown in FIG. 32 or 33, the device 1000 may log in or be registered to the content providing server 3000 and purchase and reproduce bb.mp3.

Figure 36:
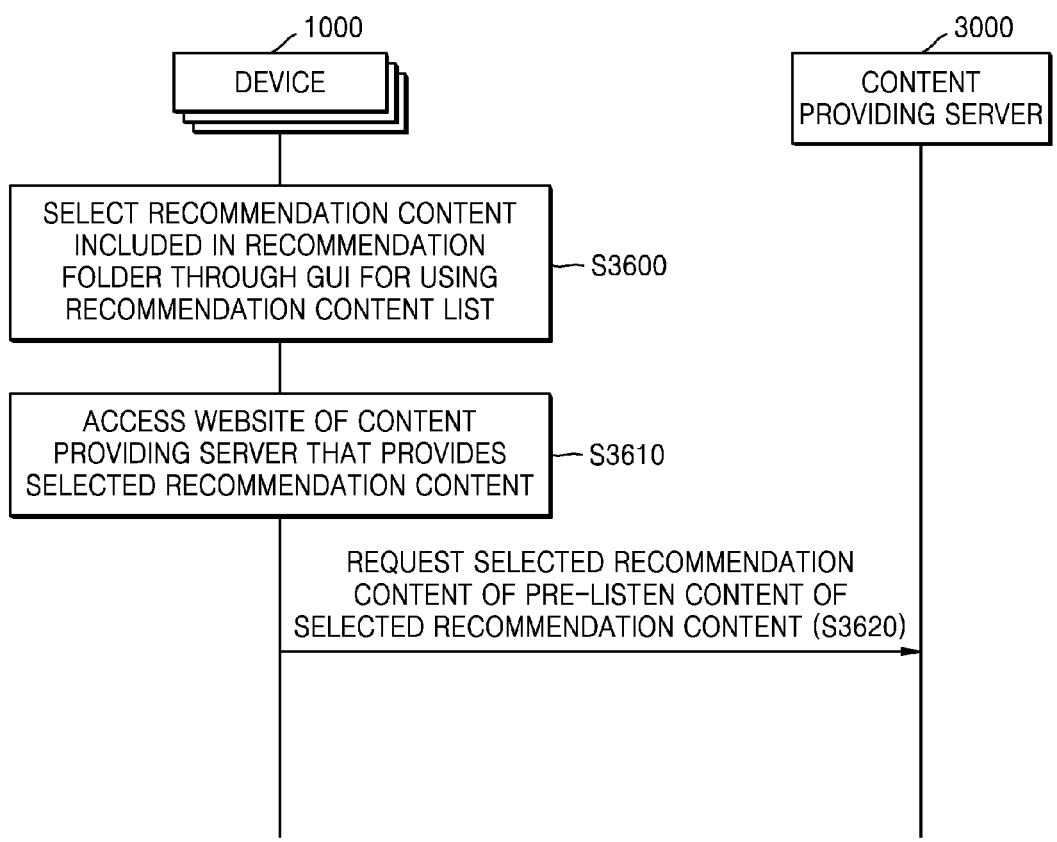
FIG. 36 is a flowchart of a method in which a device accesses a website of a content providing server and requests recommendation content or pre-listen content of the recommendation content from the content providing server, according to various example embodiments.

FIG. 36 is a flowchart of a method in which the device 1000 accesses a website of the content providing server 3000 and requests recommendation content or pre-listen content of the recommendation content from the content providing server 3000, according to various example embodiments.

In operation S3600, the device 1000 may select recommendation content from a recommendation content list. The device 1000 may select the recommendation content that is to be provided by the content providing server 3000.

In operation S3610, the device 1000 may access the website of the content providing server 3000 that provides the selected recommendation content. The device 1000 may acquire a web address of the content providing server 3000 that provides the selected recommendation content. Since the recommendation content is selected, the device 1000 may access the website of the content providing server 3000 by executing a web browser and inputting the acquired web address into the web browser. The web address may be an address of a web page that provides the recommendation content in the website of the content providing server 3000. In this case, the device 1000 may directly access the web page that provides the recommendation content in the website of the content providing server 3000.

In operation S3620, the device 1000 may request the selected recommendation content or the pre-listen content of the selected recommendation content from the content providing server 3000. The device 1000 may receive a user input through a GUI providing the web page accessed in operation S3610 and request the selected recommendation content or the pre-listen content of the selected recommendation content from the content providing server 3000 according to the user input.

Figure 37:
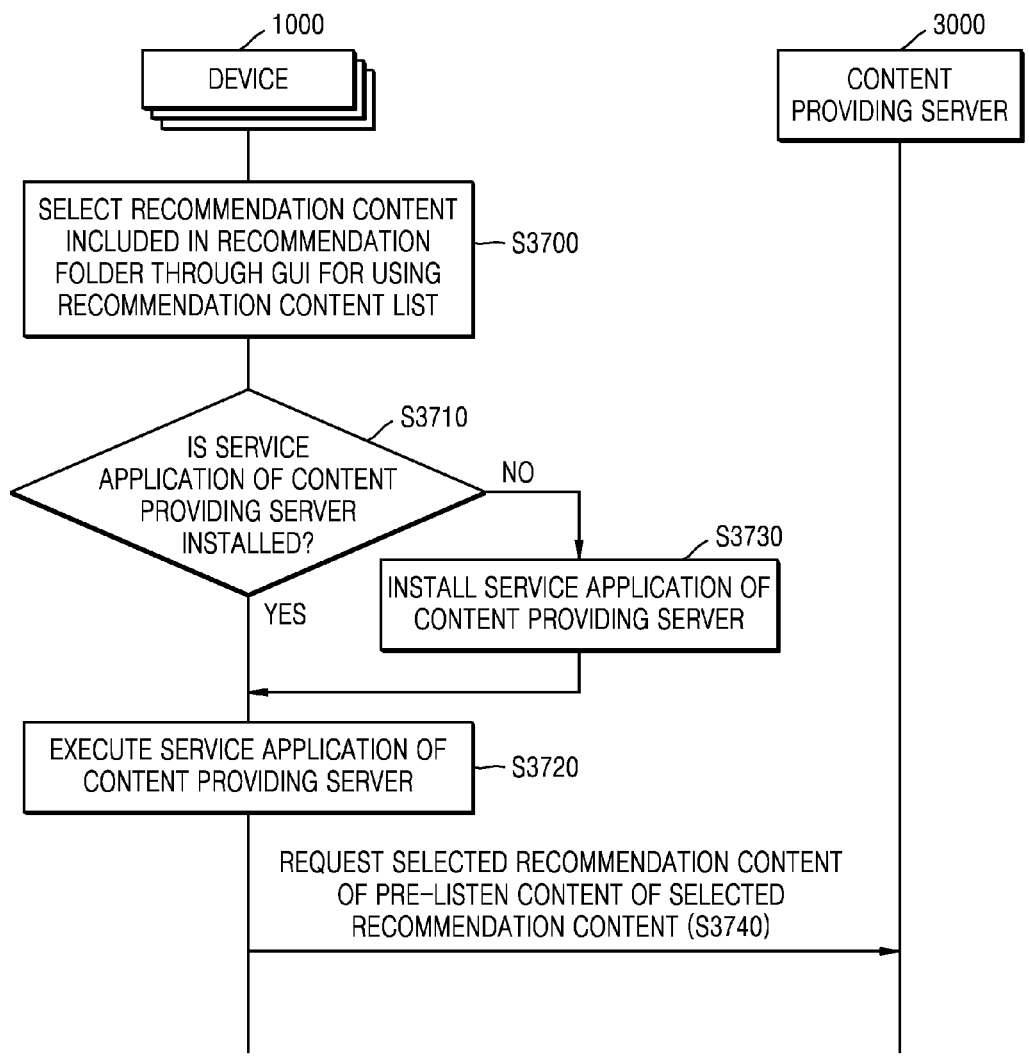
FIG. 37 is a flowchart of a method in which a device executes a service application of a content providing server and requests recommendation content or pre-listen content of the recommendation content from the content providing server, according to various example embodiments.

FIG. 37 is a flowchart of a method in which the device 1000 executes a service application of the content providing server 3000 and requests recommendation content or pre-listen content of the recommendation content from the content providing server 3000, according to various example embodiments.

In operation S3700, the device 1000 may select the recommendation content from a recommendation content list. The device 100 may select the recommendation content that is to be provided by the content providing server 3000.

In operation S3710, the device 1000 may determine whether a service application of the content providing server 3000 that provides the selected recommendation content is installed. The service application of the content providing server 3000 is an application for using a service of the content providing server 3000 and may be generated or distributed by a business provider of the content providing server 3000. Since the recommendation content is selected, the device 1000 may acquire an identification value of the content providing server 3000 that provides the selected recommendation content and determine whether the service application of the content providing server 3000 is installed based on the acquired identification value.

If the device 1000 determines that the service application of the content providing server 3000 is installed in operation S3710, in operation S3720, the device 1000 may execute the service application of the content providing server 3000.

If the device 1000 determines that the service application of the content providing server 3000 is not installed in operation S3710, in operation S3730, the device 1000 may install the service application of the content providing server 3000. The device 1000 may download the service application of the content providing server 3000 from an application market by using the identification value of the content providing server 3000. In this case, an application for using the application market may be executed without an additional user input. Thereafter, the device 1000 may perform operation S3720.

In operation S3740, the device 1000 may request the selected recommendation content or the pre-listen content of the selected recommendation content from the content providing server 3000. The device 1000 may receive a user input through a GUI providing the executed service application and request the selected recommendation content or the pre-listen content of the selected recommendation content from the content providing server 3000 according to the user input.

Figure 38:
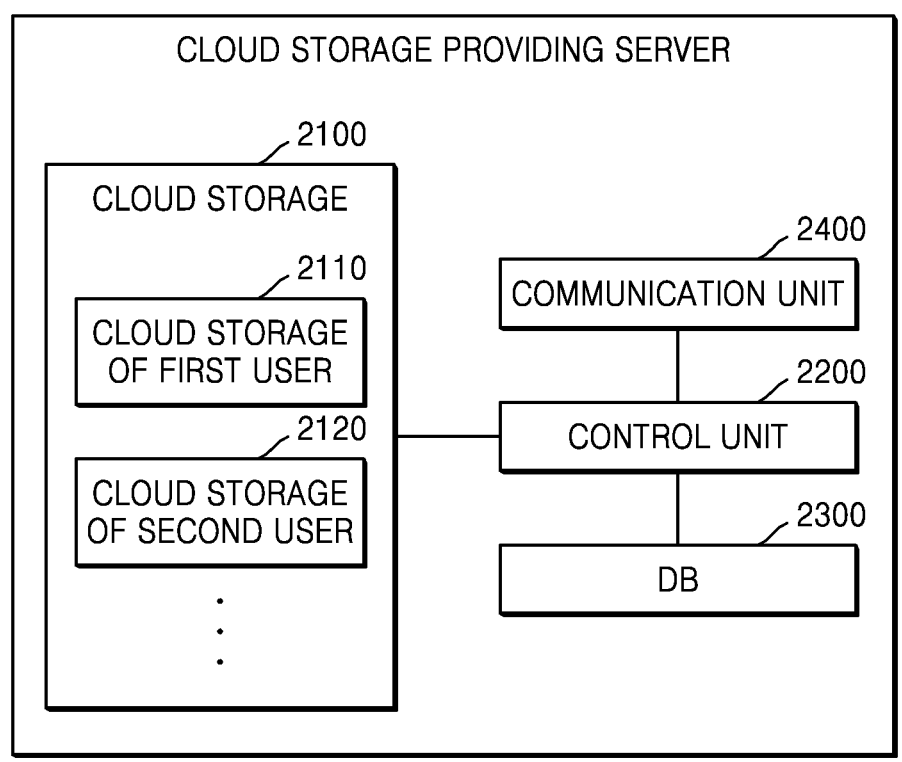
FIG. 38 is a block diagram of a cloud storage providing server, according to various example embodiments.

FIG. 38 is a block diagram of the cloud storage providing server 2000, according to various example embodiments.

Referring to FIG. 38, the cloud storage providing server 2000 may include cloud storage 2100, a control unit 2200, a DB (e.g., database) 2300, and a communication unit 2400.

The cloud storage 2100 may, for example, store preference content of a user, reference information of recommendation content, link information of the recommendation content, the recommendation content, or the like. The content stored in the cloud storage 2100 may be classified and displayed in a preference folder and a recommendation folder displayed on a GUI for selecting from a list of recommendation content. The cloud storage 2100 may include cloud storage 2110 of a first user allocated to the first user and cloud storage 2120 of a second user allocated to the second user. The preference content of the user may be displayed on the preference folder. The recommendation content list recommended to the user and the recommendation content that is selected from the recommendation content list and stored in the cloud storage 2100 may be displayed on the recommendation folder.

The control unit 2200 may control an overall operation of the cloud storage providing server 2000. The control unit 2200 may control the cloud storage 2100, the DB 2300, and the communication unit 2400 to control operations of the cloud storage providing server 2000 of FIGS. 1 through 37.

In more detail, the control unit 2200 may determine the recommendation content that is to be recommended to the user of the device 1000 by using content stored in at least one cloud storage provided by the cloud storage providing server 2000. The control unit 2200 may determine the recommendation content based on content stored in cloud storage of the user of the device 1000. The control unit 2200 may determine the recommendation content based on the content stored in the preference folder included in the cloud storage of the user. For example, the control unit 2200 may identify content executed by the user more than a preset number of times among the contents stored in the cloud storage of the user, and determine the recommendation content preferred by the user in consideration of a genre and capacity of the identified content. However, the example embodiments are not limited thereto.

The control unit 2200 may determine the recommendation content based on content stored in cloud storage of another user. For example, the control unit 2200 may determine the recommended content based on content which is accessed or requested more than a preset number of times by a user's acquaintance or a user having preferences similar to those of the user and stored in the cloud storage of the user's acquaintance or the user having preferences similar to those of the user. However, the example embodiments are not limited thereto.

The control unit 2200 may, for example, generate recommendation ranking information of the content based on content used by a plurality of users or may collect recommendation ranking information of the content generated by another server (not shown) from another server (not shown). The control unit 2200 may determine the recommendation content that is to be recommended to the user by using the generated recommendation ranking information or the collected recommendation ranking information.

However, a recommendation reference for determining the recommendation content is not limited thereto, and may be set by the user or the control unit 2200 in various ways.

The control unit 2200 may push reference information and/or link information of the determined recommendation content to a previously set folder included in the cloud storage of the user. The control unit 2200 may automatically store the reference information and/or the link information of the recommendation content in the previously set folder of the cloud storage of the user of the device 1000 by pushing the reference information and/or the link information of the recommendation content. The previously set folder to which the reference information and/or the link information of the recommendation content is pushed may be, for example, the recommendation folder of the user.

The control unit 2200 may push additional information of the recommendation content to the previously set folder of the user. The additional information of the recommendation content may include, for example, a genre of the recommendation content, a writer, a generation date, and abstract information including characters of the recommendation content, capacity of the recommendation content, etc. The additional information of the recommendation content may include, for example, information indicating whether the user is authorized to use the recommendation content, an identification value of the content providing server 3000 providing the recommendation content, and information regarding use fare of the recommendation content, etc. However, the example embodiments are not limited thereto.

The control unit 2200 may provide the device 1000 with a GUI for using a recommendation content list. The GUI for using the recommendation content list may be a GUI for using a service provided by the cloud storage providing server 2000 or a GUI for browsing and using data included in the cloud storage of the user. For example, the GUI for using the recommendation content list may be implemented as a browser for browsing a folder and a file.

The device 1000 may select the recommendation content by a user input through the GUI, and thus the control unit 2200 may store the selected recommendation content in the cloud storage of the user. If the recommendation content is selected through the GUI, the device 1000 may request the cloud storage providing server 2000 to store the selected recommendation content in the cloud storage of the user while providing the cloud storage providing server 2000 with an identification value of the selected recommendation content. The control unit 2200 may store the recommendation content in the cloud storage of the user in response to a request from the device 1000. The control unit 2200 may store the recommendation content in the recommendation folder. In this case, the control unit 2200 may differently display the recommendation content stored in the recommendation folder and the recommendation content that is not stored in the recommendation folder. For example, if recommendation content A is stored in the recommendation folder, the control unit 2200 may emphasize the recommendation content A on the recommendation content list. For example, the control unit 2200 may display around the recommendation content A an object indicating that the recommendation content A of the recommendation content list is stored. The object indicating that the recommendation content A is stored may include, for example, at least one of text, an image, and an icon.

Alternatively, the control unit 2200 may store the recommendation content in another folder. In this case, an identification value of the recommendation content stored in another folder may be deleted from the recommendation content list.

When the recommendation content is content stored in the cloud storage of another user included in the cloud storage providing server 2000, the control unit 2200 may copy the content stored in the cloud storage of another user to the cloud storage of the user. When the recommendation content is content stored in cloud storage of another user included in the cloud storage providing server 2000, the control unit 2200 may not copy the content stored in the cloud storage of another user to the cloud storage of the user.

When the recommendation content is provided by the content providing server 3000 that the user is registered to, the control unit 2200 may receive the recommendation content from the content providing server 3000 by using membership information of the user and may store the received recommendation content in the cloud storage of the user.

Since the device 1000 selects the recommendation content by the user input through the GUI, the device 1000 may stream the selected recommendation content to the device 1000 of the user. The device 1000 may stream the recommendation content to the device 1000 while storing the recommendation content in the cloud storage of the user.

The DB 2300 may store information necessary for providing the service of the cloud storage providing server 2000. The DB 2300 may store user information of the user who is registered to the cloud storage providing server 2000. The DB 2300 may store membership information of the user with respect to a service of the content providing server 3000. The DB 2300 may store information for determining the recommendation content that is to be recommended to the user and information for generating the recommendation content list.

The communication unit 2400 may provide the device 1000 with the recommendation content list and the recommendation content and transmit and receive information necessary for storing the recommendation content in the cloud storage of the user and/or and data to and from the device 1000 and/or the content providing server 3000.

Figure 39:
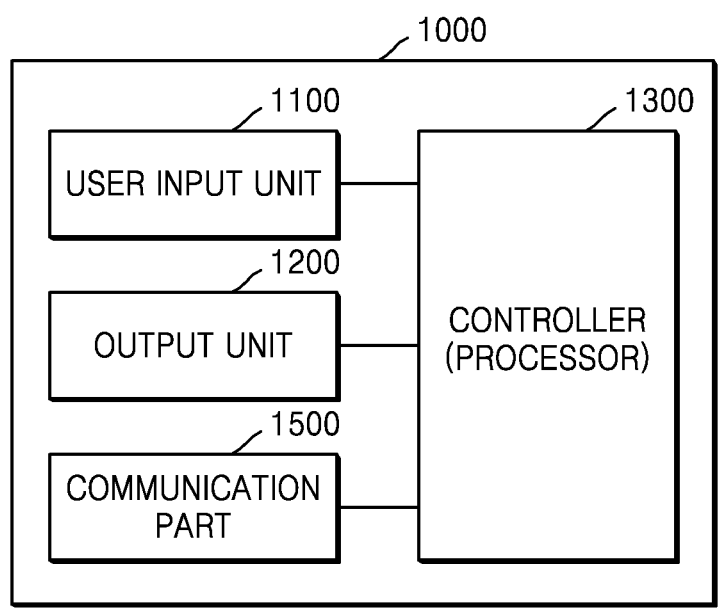
FIGS. 39 and 40 are block diagrams of a device, according to various example embodiments.
Figure 40:
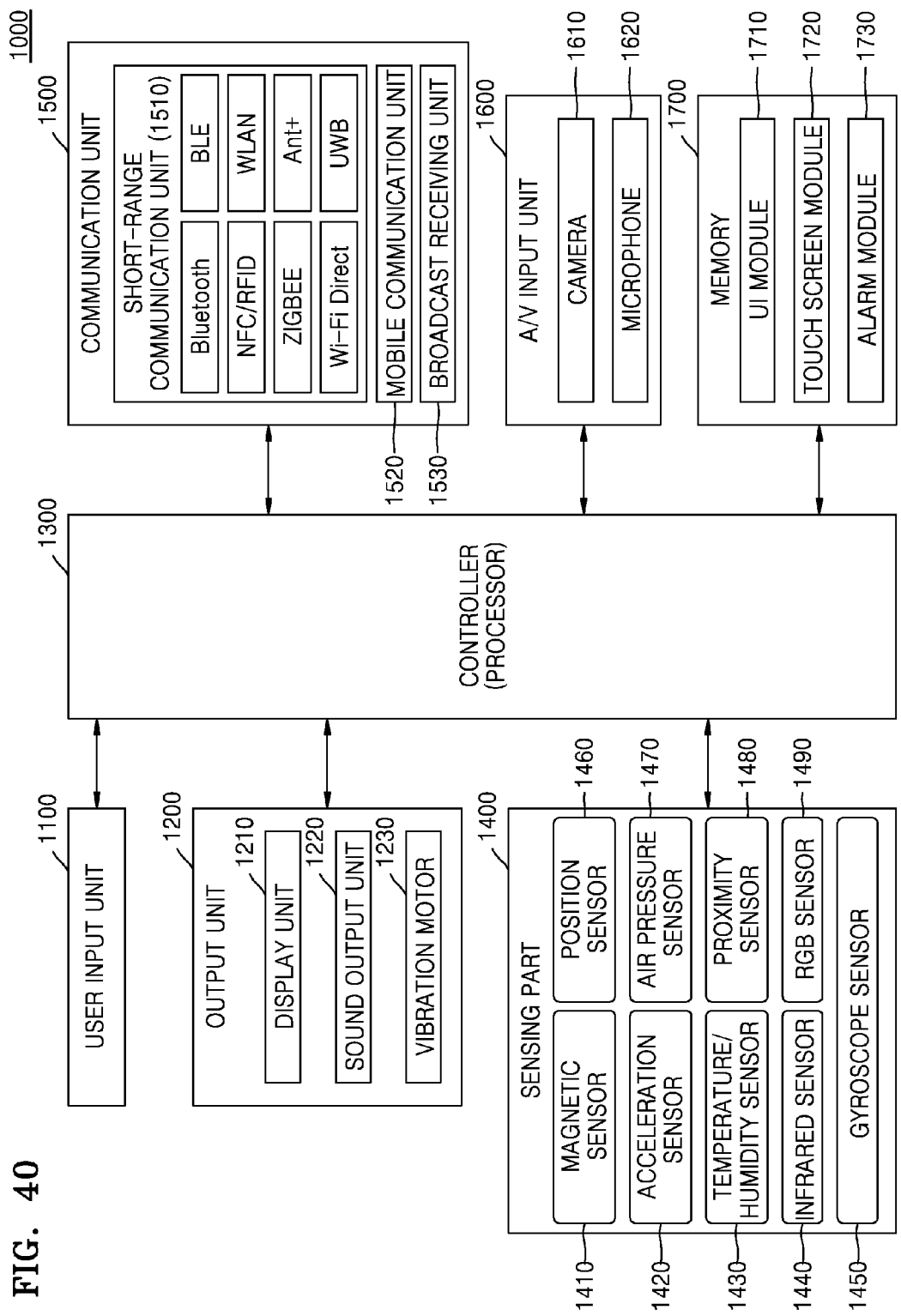

FIGS. 39 and 40 are block diagrams of the device 1000, according to various example embodiments.

As illustrated in FIG. 39, the device 1000 may include a user input unit 1100, an output unit 1200, a controller 1300, and a communication unit 1500.

However, not all elements shown in FIG. 39 are necessary elements of the device 1000. That is, the device 1000 may be embodied with more or less elements than the elements shown in FIG. 39.

For example, as illustrated in FIG. 40, in one or more example embodiments, the device 1000 may further include a sensing unit 1400, an audio/video (NV) input unit 1600, and a memory 1700, as well as the user input unit 1100, the output unit 1200, the controller 1300, and the communication unit 1500.

The user input unit 1100 may be a unit by which a user inputs data so as to control the device 1000. For example, the user input unit 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, a jog switch, etc., but one or more example embodiments are not limited thereto.

The user input unit 1100 may receive a user input of selecting an encryption target folder and a user input of receiving an encrypted folder. Also, the user input unit 1100 may receive a user input of authentication data.

The output unit 1200 may output an audio signal, a video signal, or a vibration signal and may include a display unit 1210, a sound output unit 1220, a vibration motor 1230, or the like.

The display unit 1210 displays and outputs information that is processed in the device 1000. For example, the display unit 1210 may display a folder, an encrypted folder, a window indicating data in a folder, a GUI for receiving an input of authentication data, or the like.

When the display unit 1210 and a touch pad form a mutual layer structure and then are formed as a touch screen, the display unit 1210 may be used as both an output device and input device. The display unit 1210 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the device 1000, the device 1000 may include at least two display parts 1210. Here, the at least two display parts 1210 may be disposed to face each other by using a hinge.

The sound output unit 1220 may output audio data that is received from the communication unit 1500 or is stored in the memory 1700. The sound output unit 1220 may also output a sound signal (e.g., a call signal receiving sound, a message receiving sound, a notifying sound, or the like) related to capabilities performed by the device 1000. The sound output unit 1220 may include a speaker, a buzzer, or the like.

The vibration motor 1230 may output a vibration signal. For example, the vibration motor 1230 may output the vibration signal that corresponds to an output of the audio data (e.g., the call signal receiving sound, the message receiving sound, or the like) or video data. Also, when a touch is input to the touch screen, the vibration motor 1230 may output a vibration signal.

The controller 1300 may generally control all operations of the device 1000. The controller 1300 may control the device 1000 to perform operations of the device 1000 of FIGS. 1 through 27. For example, the controller 1300 may control the user input unit 1100, the output unit 1200, the sensing unit 1400, the communication unit 1500, the A/V input unit 1600, etc. by executing programs stored in the memory 1700.

The controller 1300 may receive a GUI for using a recommendation content list from the cloud storage providing server 2000. The controller 1300 may access the cloud storage providing server 2000 and request a service provided by the cloud storage providing server 2000 from the cloud storage providing server 2000. The controller 1300 may receive the GUI provided by the cloud storage providing server 2000 in response to a request.

The controller 1300 may select at least one piece of recommendation content from the recommendation content list through the GUI. The controller 1300 may display a folder list included in cloud storage of a user through the GUI and read a recommendation folder included in the cloud storage of the user according to a user selection input. Since the recommendation folder is read, the controller 1300 may display the recommendation content list through the GUI. Accordingly, the user may check a file name of the recommendation content included in the recommendation content list, abstract information, and additional information. The controller 1300 may select specific recommendation content from the recommendation content list based on the user selection input through the GUI.

The controller 1300 may request the selected recommendation content from the cloud storage providing server 2000. The controller 1300 may request the cloud storage providing server 2000 to provide the device 1000 with the selected recommendation content and store the selected recommendation content in the cloud storage of the user.

The controller 1300 may receive the selected recommendation content from the cloud storage providing server 2000. The controller 1300 may receive streaming of the selected recommendation content from the cloud storage providing server 2000. When the recommendation content is stored in cloud storage of another user, the cloud storage providing server 2000 may stream the recommendation content to the device 1000 while copying the recommendation content stored in cloud storage of another user to cloud storage of the user.

When the recommendation content is provided by the content providing server 3000 to which the user subscribes, the cloud storage providing server 2000 may receive the recommendation content from the content providing server 3000 by using membership information of the user and stream the recommendation content to the device 1000 while storing the received recommendation content in the cloud storage of the user.

The controller 1300 may reproduce the streamed recommendation content.

Meanwhile, the control unit 1300 may request link information of the recommendation content from the cloud storage providing server 2000. The controller 1300 may select specific recommendation content from the recommendation content list based on a user input and request the selected recommendation content from the cloud storage providing server 2000.

The controller 1300 may receive the link information of the recommendation content from the cloud storage providing server 2000. The controller 1300 may receive address information for accessing the content providing server 3000 and/or information regarding whether the user is authorized to use the recommendation content from the cloud storage providing server 2000. Alternatively, the controller 1300 may receive address information for directly accessing the recommendation content included in the content providing server 3000 from the cloud storage providing server 2000. However, the exemplary embodiments are not limited thereto.

The cloud storage providing server 2000 provides the device 1000 with the link information of the recommendation content in response to a request from the device but is not limited thereto. The cloud storage providing server 2000 may provide the device 1000 with both the link information and the recommendation content and the additional information while providing the device 1000 with the GUI for using the recommendation content list.

The controller 1300 may request the recommendation content from the content providing server 3000. The controller 1300 may access the content providing server 3000 by using the link information of the recommendation content and request the recommendation content from the content providing server 3000. For example, if the controller 1300 accesses the content providing server 3000 by using the address information for directly accessing the recommendation content, a GUI including information such as a name of the recommendation content, a genre, a price, etc. and a button for receiving the recommendation content and a GUI for inputting a service ID and a password of the content providing server 3000 on a screen of the device 1000. If an ID and a password of the user are input and the button for receiving the recommendation content is selected, the controller 1300 may request the recommendation content from the content providing server 3000.

The controller 1300 may request the recommendation content from the content providing server 3000 by using an application for using a service of the content providing server 3000. If the recommendation content is selected from the recommendation content list received from the cloud storage providing server 2000, the controller 1300 may execute the application for using the service of the content providing server 3000 and request the recommendation content from the content providing server 3000 by using a GUI of the executed application.

The content providing server 3000 may authenticate the user by using the ID and the password of the user and may stream the recommendation content to the device 1000. The controller 1300 may receive the streamed recommendation content. The controller 1300 may reproduce the recommendation content and provide the cloud storage providing server 2000 with the recommendation content. The controller 1300 may transmit the recommendation content to the cloud storage providing server 2000. The controller 1300 may transmit the recommendation content to the cloud storage providing server 2000 while receiving the recommendation content from the content providing server 3000.

Meanwhile, the controller 1300 may request the content providing server 3000 to provide the cloud storage providing server 2000 with the recommendation content. The controller 1300 may request the content providing server 3000 to provide the cloud storage providing server 2000 with the recommendation content by providing the content providing server 3000 with an identification value of the cloud storage providing server 2000 and the ID of the user with respect to the service of the cloud storage providing server 2000.

Meanwhile, the controller 1300 may request a specific folder included in the cloud storage of the user to store, delete, or move content.

The sensing unit 1400 may sense a state of the device 1000 or a status around the device 1000 and may transfer sensed information to the controller 1300.

The sensing unit 1400 may include at least one selected from a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480 and an RGB sensor (i.e., a luminance sensor) 1490, but one or more exemplary embodiments are not limited thereto. Functions of the sensors may be intuitionally deduced by one of ordinary skill in the art by referring to names of the sensors, and thus, detailed descriptions thereof are omitted here.

The communication unit 1500 may include one or more elements to communicate with the cloud storage providing server 2000 and/or the content providing server 3000. For example, the communication unit 1500 may include a short-range communication unit 1510, a mobile communication unit 1520, and a broadcast receiving unit 1530.

The short-range communication unit 1510 may include, but is not limited thereto, a Bluetooth communication part, a Bluetooth Low Energy (BLE) communication part, a near field wireless communication part, a wireless local area network (WLAN) communication part, a ZigBee communication part, an infrared Data Association (IrDA) communication part, a Wi-Fi Direct (WFD) communication part, an ultra wideband (UWB) communication part, an Ant+ communication part, or the like.

The mobile communication unit 1520 exchanges a wireless signal with at least one selected from a base station, an external terminal, and a server on a mobile communication network. The wireless signal may include various types of data according to communication in regard to a sound call signal, a video call signal, or a text/multimedia message.

The broadcast receiving unit 1530 receives a broadcast signal and/or information related to broadcast from the outside through a broadcast channel. The broadcast channel may include a satellite channel and a ground wave channel. According to an embodiment, the device 1000 may not include the broadcast receiving unit 1530.

The communication unit 1500 may exchange information with the server 2000 and the external device 4000, wherein the information is used in encrypting and decrypting a folder and in authenticating execution of the folder.

The A/V input unit 1600 may receive an input of an audio signal or a video signal and may include a camera 1610 and a microphone 1620. The camera 1610 may obtain an image frame such as a still image or a moving picture via an image sensor during a video call mode or an image-capturing mode. An image that is captured via the image sensor may be processed by the controller 1300 or a separate image processing unit (not shown).

The image frame that is processed by the camera 1610 may be stored in the memory 1700 or may be transmitted to an external source via the communication unit 1500. According to a configuration of the device 1000, two or more cameras 1610 may be arranged.

The microphone 1620 receives an input of an external sound signal and processes the received sound signal into electrical voice data. For example, the microphone 1620 may receive a sound signal from the external device 4000 or a speaker. In order to remove noise that occurs while the sound signal is externally input, the microphone 1620 may use various noise removing algorithms.

The memory 1700 may store a program for processing and controlling the controller 1300, and may store a plurality of pieces of data that are input to the device 1000 or output from the device 1000.

The memory 1700 may include a storage medium of at least one type selected from a flash memory, a hard disk, a multimedia card type memory, a card type memory such as an SD or XD card memory, a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, or the like.

The programs stored in the memory 1700 may be classified into a plurality of modules according to their functions, for example, a user interface (UI) module 1710, a touch screen module 1720, an alarm module 1730, etc.

The UI module 1710 may provide a specialized UI or a GUI in connection with the device 1000 for each application. The touch screen module 1720 may detect a user's touch gesture on a touch screen and transmit information related to the touch gesture to the controller 1300. In one or more exemplary embodiments, the touch screen module 1720 may recognize and analyze a touch code. The touch screen module 1720 may be configured by using additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or exists nearby by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture (i.e., an input) of the user may include a tap gesture, a touch & hold gesture, a double tap gesture, a drag gesture, a panning gesture, a flick gesture, a drag & drop gesture, a swipe gesture, or the like.

The alarm module 1730 may generate a signal for notifying the user of an occurrence of an event in the device 1000. Examples of the event that occurs in the device 1000 may include a call signal reception, a message reception, a key signal input, schedule notification, or the like. The alarm module 1730 may output a video-format alarm signal via a display unit 1210, may output an audio-format alarm signal via the sound output unit 1220, or a vibration signal via the vibration motor 1230.

The one or more example embodiments may be embodied as computer readable code/instructions on a recording medium, e.g., a program module to be executed in computers, the program module including computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium stores computer-readable commands, data structures, program modules, other data as modulation-type data signals such as carrier signals, or other transmission mechanisms, and may include other information transmission mediums.

Throughout the specification, a term "unit" or "module" indicates a hardware component such as a processor or a circuit, and/or a software component that is executed by a hardware component such as a processor.

It should be understood that the example embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While one or more example embodiments have been described with reference to the figures, it will be understood by those of ordinary skill in the art that various changes in form and details may be made therein without departing from the spirit and scope as defined by the following claims.

What is claimed is:

1. A cloud storage server for recommending content, the cloud storage server comprising:
   a storage configured to store content in the cloud storage server, the storage comprising a preference folder for a user and a recommendation folder for the user;
   a communication circuit configured to provide a device with information regarding the content stored in the folders;
   a controller configured to determine recommendation content that is to be recommended among contents in the cloud storage server based on the content stored in the preference folder, to store reference information for accessing the determined recommendation content in the recommendation folder included in the cloud storage server, to update recommendation content in the recommendation folder absent a request to do so from the user, and to control the communication circuit to provide the device with the reference information of the recommendation content such that the device can access the recommendation content;
   wherein the communication circuit is configured to receive membership information from the device, and wherein the controller is configured to identify a content providing server based on the received membership information and to determine the recommendation content among the contents that are provided by the identified content providing server and which is authorized for use; and
   wherein the controller is further configured so that when recommendation content is selected from a recommendation content list displayed on a graphic user interface (GUI) provided on the device, and the selected recommendation content is the recommendation content determined among the contents provided by the content providing server, the controller is configured to store the selected recommendation content in the recommendation folder of the user.

2. The cloud storage server of claim 1, wherein the reference information indicates a path for accessing the recommendation content in the cloud storage server and is newly generated with respect to the recommendation folder.

3. The cloud storage server of claim 1, wherein the reference information comprises link information for downloading or streaming the recommendation content, wherein the controller is configured to store the link information in the recommendation folder.

4. The cloud storage server of claim 3, wherein, when the link information comprises address information of the content providing server.

5. The cloud storage server of claim 1, wherein the controller is configured to receive the recommendation content determined among the contents provided by the content providing server from the content providing server and stores the recommendation content in the recommendation folder.

6. The cloud storage server of claim 5, wherein the controller is configured to stream the recommendation content determined among the contents provided by the content providing server to the device while storing the recommendation content in the recommendation folder.

7. The cloud storage server of claim 1, wherein the reference information of the recommendation content determined among the contents in the cloud storage server is stored in the recommendation folder, and an available space in the cloud storage server is maintained.

8. The cloud storage server of claim 1, wherein link information of the recommendation content determined among the contents provided by the content providing server is stored in the cloud storage server, and an available space in the cloud storage server is maintained.

9. A content recommending method performed by a cloud storage server comprising a storage configured to store content in the cloud storage server, the storage comprising a first preference folder for a first user, a different first recommendation folder for the first user, a second preference folder for a second user, a different second recommendation folder for the second user, the content recommending method comprising:

determining recommendation content that is to be recommended to the first user among contents in the cloud storage server based on the content stored in a first preference folder of the cloud storage server;

storing reference information for accessing the determined recommendation content in the first recommendation folder of the first user included in the cloud storage server, wherein the reference information comprises link information for downloading or streaming the recommendation content, wherein the link information is stored in the first recommendation folder;

updating recommendation content in the first recommendation folder absent a request to do so from the first user;

providing a device of the first user with the reference information of the recommendation content such that the device of the first user can access the recommendation content;

receiving membership information of the first user from the device, and wherein the determining of the recommendation content comprises identifying a content providing server for which the first user is registered based on the received membership information and determining the recommendation content among the contents that are provided by the identified content providing server and which the first user is authorized to use;

wherein when recommendation content is selected from a recommendation content list displayed on a graphic user interface (GUI) provided on the device, and the selected recommendation content is the recommendation content determined among the contents provided by the content providing server, the storing step further comprises storing the selected recommendation content in the recommendation folder of the first user.

10. The content recommending method of claim 9, wherein the reference information indicates a path for accessing the recommendation content in the cloud storage server and is newly generated with respect to the first user.

11. The content recommending method of claim 9, wherein, when the link information comprises address information of the content providing server.

12. The content recommending method of claim 9, wherein storing further comprises receiving the recommendation content determined among the contents provided by the content providing server from the content providing server and storing the recommendation content in the recommendation folder of the first user.

13. The content recommending method of claim 12, further comprising: streaming the recommendation content determined among the contents provided by the content providing server to the device while storing the recommendation content in the recommendation folder of the first user.

14. The content recommending method of claim 9, wherein the reference information of the recommendation content determined among the contents stored in the cloud storage server is stored in the recommendation folder of the first user, and an available space in the cloud storage server for the user is maintained.

15. A non-transitory computer-readable recording medium having recorded thereon a program, which, when executed by a computer, performs the method of claim 9, by using a computer.

* * * * *